(12) United States Patent
Mashitani et al.

(10) Patent No.: US 12,185,031 B2
(45) Date of Patent: Dec. 31, 2024

(54) INSTALLATION INFORMATION ACQUISITION METHOD, CORRECTION METHOD, PROGRAM, AND INSTALLATION INFORMATION ACQUISITION SYSTEM

(71) Applicant: Panasonic Intellectual Property Management Co., Ltd., Osaka (JP)

(72) Inventors: Ken Mashitani, Osaka (JP); Takaaki Abe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 81 days.

(21) Appl. No.: 18/132,559

(22) Filed: Apr. 10, 2023

(65) Prior Publication Data

US 2023/0247184 A1 Aug. 3, 2023

Related U.S. Application Data

(63) Continuation of application No. PCT/JP2021/037377, filed on Oct. 8, 2021.

(30) Foreign Application Priority Data

Oct. 13, 2020 (JP) ................................ 2020-172853
Apr. 28, 2021 (JP) ................................ 2021-076773

(51) Int. Cl.
 *H04N 9/31* (2006.01)
 *G03B 21/14* (2006.01)
 (Continued)

(52) U.S. Cl.
 CPC ........... *H04N 9/3185* (2013.01); *H04N 9/312* (2013.01); *G03B 21/147* (2013.01);
 (Continued)

(58) Field of Classification Search
 CPC .... H04N 9/3185; H04N 9/312; H04N 9/3188; H04N 17/00; H04N 17/04; G03B 21/147; G06V 10/247; G06V 30/1607
 (Continued)

(56) References Cited

U.S. PATENT DOCUMENTS 6,744,565 B1 6/2004 Kashitani et al.
8,845,107 B1 * 9/2014 Coley ...................... H04N 7/18
353/30

(Continued)

FOREIGN PATENT DOCUMENTS

JP 2001-69380 3/2001
JP 2005-115106 4/2005
(Continued)

*Primary Examiner* — John W Miller
*Assistant Examiner* — Omer Khalid
(74) *Attorney, Agent, or Firm* — Wenderoth, Lind & Ponack, L.L.P.

(57) ABSTRACT

A projector in an installation information acquisition method is installed in a real space, has a changeable projection direction, and projects a projection image based on a virtual image. The virtual image is an image in a case where an image arranged at a display position in a virtual space is viewed from a virtual installation position. The method includes first acquisition processing for acquiring positional information of three or more first adjustment points in the virtual space, projection processing for projecting, by the projector, an index image onto the real space, second acquisition processing for acquiring angle information of the projection direction with respect to a reference direction in a state where the index image matches three or more second adjustment points respectively corresponding to the three or more first adjustment points, and third acquisition processing for acquiring installation information based on the positional information and the angle information.

13 Claims, 29 Drawing Sheets

(51) Int. Cl.
*G06V 10/24* (2022.01)
*G06V 30/16* (2022.01)

(52) U.S. Cl.
CPC ........ *G06V 10/247* (2022.01); *G06V 30/1607* (2022.01); *H04N 9/3188* (2013.01)

(58) Field of Classification Search
USPC ............................................ 348/744; 353/69
See application file for complete search history.

(56) References Cited

U.S. PATENT DOCUMENTS

| | | | |
|---|---|---|---|
| 2016/0014385 A1* | 1/2016 | Sano | H04N 9/3185 348/571 |
| 2016/0371884 A1* | 12/2016 | Benko | G06F 3/011 |
| 2018/0014008 A1 | 1/2018 | Sugiura | |
| 2019/0005607 A1 | 1/2019 | Tamai | |
| 2019/0116356 A1* | 4/2019 | Matoba | H04N 9/3147 |
| 2019/0306478 A1 | 10/2019 | Tamura | |

FOREIGN PATENT DOCUMENTS

| | | | |
|---|---|---|---|
| JP | 2015-145890 | 8/2015 | |
| JP | 2016-81497 | 5/2016 | |
| JP | 2018-5115 | 1/2018 | |
| JP | 2018005115 A * | 1/2018 | ............ G03B 21/14 |
| JP | 2019-176356 | 10/2019 | |
| WO | WO-2016014070 A1 * | 1/2016 | ............ G03B 17/54 |
| WO | 2017/038096 | 3/2017 | |
| WO | 2017/179272 | 10/2017 | |
| WO | 2018/167918 | 9/2018 | |

\* cited by examiner

INSTALLATION INFORMATION ACQUISITION METHOD, CORRECTION METHOD, PROGRAM, AND INSTALLATION INFORMATION ACQUISITION SYSTEM

BACKGROUND

1. Technical Field

The present disclosure relates to an installation information acquisition method, a correction method, a program, and an installation information acquisition system for acquiring installation information regarding an installation state of a projector that projects an image in an image projection system.

2. Description of the Related Art

Patent Literature (PTL) 1 discloses a projector including an image projection unit that projects an image onto a screen and a correction processor. In order to eliminate a trapezoidal distortion and a barrel-shaped distortion of a projected image, the correction processor deforms an image to be projected to compensate for the distortions.

In addition, PTL 2 discloses an image display system in which projector means projects an image in a display area of projection mapping. In the image display system described in PTL 2, the projector means projects one image in an image display area, and projects an image in the image display area to follow a movement operation of the image display area. That is, in PTL 2, the image display area can be moved, rotated, and turned in any direction, and the projector (projector means) can also be moved and displaced in any direction. In the image projection system (image display system), when the image display area moves, motion of the image display area is detected, and a projection position where the image is projected in the real space is changed by moving the projector so as to follow the movement operation of the image display area.

PTL 1 is Unexamined Japanese Patent Publication No. 2019-176356.

PTL 2 is Unexamined Japanese Patent Publication No. 2016-81497.

SUMMARY

Since distortions or the like occur in the projected image also depending on a relative positional relationship between the projector and the screen, it is necessary to install the projector in an installed state where the relative positional relationship between the projector and the screen is a predetermined positional relationship.

An object of the present disclosure is to provide an installation information acquisition method, a correction method, a program, and an installation information acquisition system capable of increasing a degree of freedom of an installation state of a projector.

An installation information acquisition method according to one aspect of the present disclosure is an installation information acquisition method of a projector. The projector is installed at an installation position in a real space, has a projection direction changeable with respect to a reference direction, and projects a projection image based on a virtual image onto a projection position in the real space. The virtual image is an image in a case where an image arranged at a display position in a virtual space corresponding to the real space is viewed from a virtual installation position in the virtual space corresponding to the installation position. The installation information acquisition method includes first acquisition processing, projection processing, second acquisition processing, and third acquisition processing. In the first acquisition processing, positional information regarding positions of three or more first adjustment points in the virtual space is acquired. In the projection processing, the projector projects an index image onto the real space. In the second acquisition processing, angle information regarding an angle of the projection direction of the projector with respect to the reference direction in a state where a position of the index image matches each of three or more second adjustment points is acquired. The three or more second adjustment points respectively correspond to the three or more first adjustment points in the virtual space. In the third acquisition processing, installation information regarding an installation state of the projector is acquired based on the positional information and the angle information.

A correction method according to another aspect of the present disclosure is a correction method for correcting the projection image by using the installation information acquired by the installation information acquisition method. The correction method includes a correction processing for correcting the virtual installation position based on the installation information and generating the projection image based on the virtual image in a case of being viewed from the corrected virtual installation position.

A correction method according to still another aspect of the present disclosure is a correction method for correcting a projection direction in which the projection image is projected by the projector by using the angle information acquired by the installation information acquisition method. The correction method includes a correction processing for obtaining the projection direction at any display position other than the three or more second adjustment points by interpolation by using the angle information obtained for each of the three or more second adjustment points in the second acquisition processing.

A program according to still another aspect of the present disclosure is a program causing one or more processors execute the installation information acquisition method.

A program according to still another aspect of the present disclosure is a program causing one or more processors execute the correction method.

An installation information acquisition system according to still another aspect of the present disclosure is an installation information acquisition system of a projector. The projector is installed at an installation position in a real space, has a projection direction changeable with respect to a reference direction, and projects a projection image based on a virtual image onto a projection position in the real space. The virtual image is an image in a case where an image arranged at a display position in a virtual space corresponding to the real space is viewed from a virtual installation position in the virtual space corresponding to the installation position. The installation information acquisition system includes a first acquisition unit, a projection processor, a second acquisition unit, and a third acquisition unit. The first acquisition unit acquires positional information regarding positions of three or more first adjustment points in the virtual space. The projection processor causes the projector to project an index image onto the real space. The second acquisition unit acquires angle information regarding an angle of the projection direction of the projector with respect to the reference direction in a state where a position of the index image matches each of three or more second adjustment points. The three or more second adjustment points respectively correspond to the three or more first adjustment points in the virtual space. The third acquisition unit acquires the installation information regarding an installation state of the projector based on the positional information and the angle information.

According to the present disclosure, it is possible to increase a degree of freedom of the installation state of the projector.

DETAILED DESCRIPTION

Exemplary Embodiment (1) Outline

Hereinafter, an outline of an installation information acquisition method and an image adjustment method of image projection system 100 according to the present exemplary embodiment will be described with reference to FIGS. 1 to 7. As illustrated in FIG. 2, image projection system 100 includes control system 10 and projector 30 controlled by control system 10.

Figure 3A:
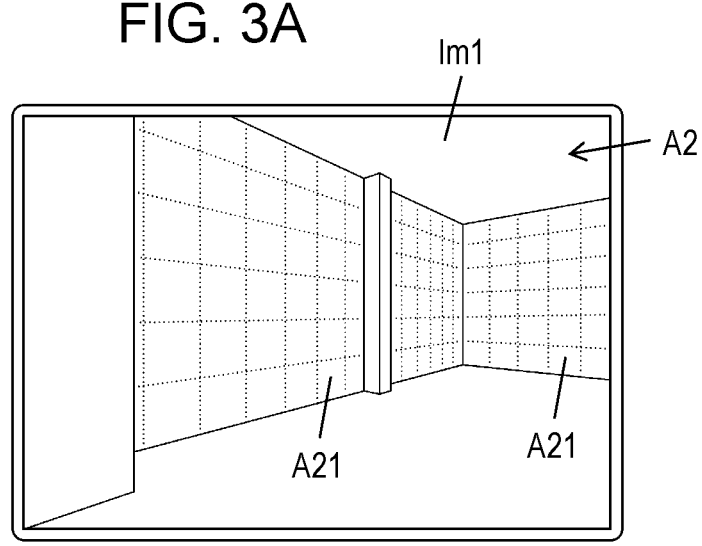
FIG. 3A is an explanatory diagram of a virtual space formed in a generation mode of a control system of the image projection system.
Figure 3C:
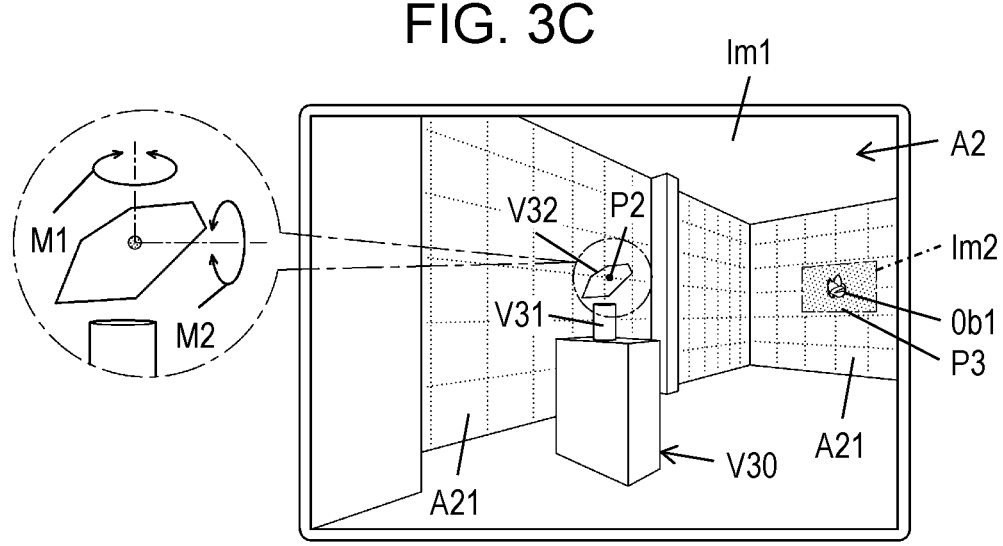
FIG. 3C is an explanatory diagram of a state where a virtual camera is arranged in the virtual space in the generation mode of the control system of the image projection system.
Figure 4:
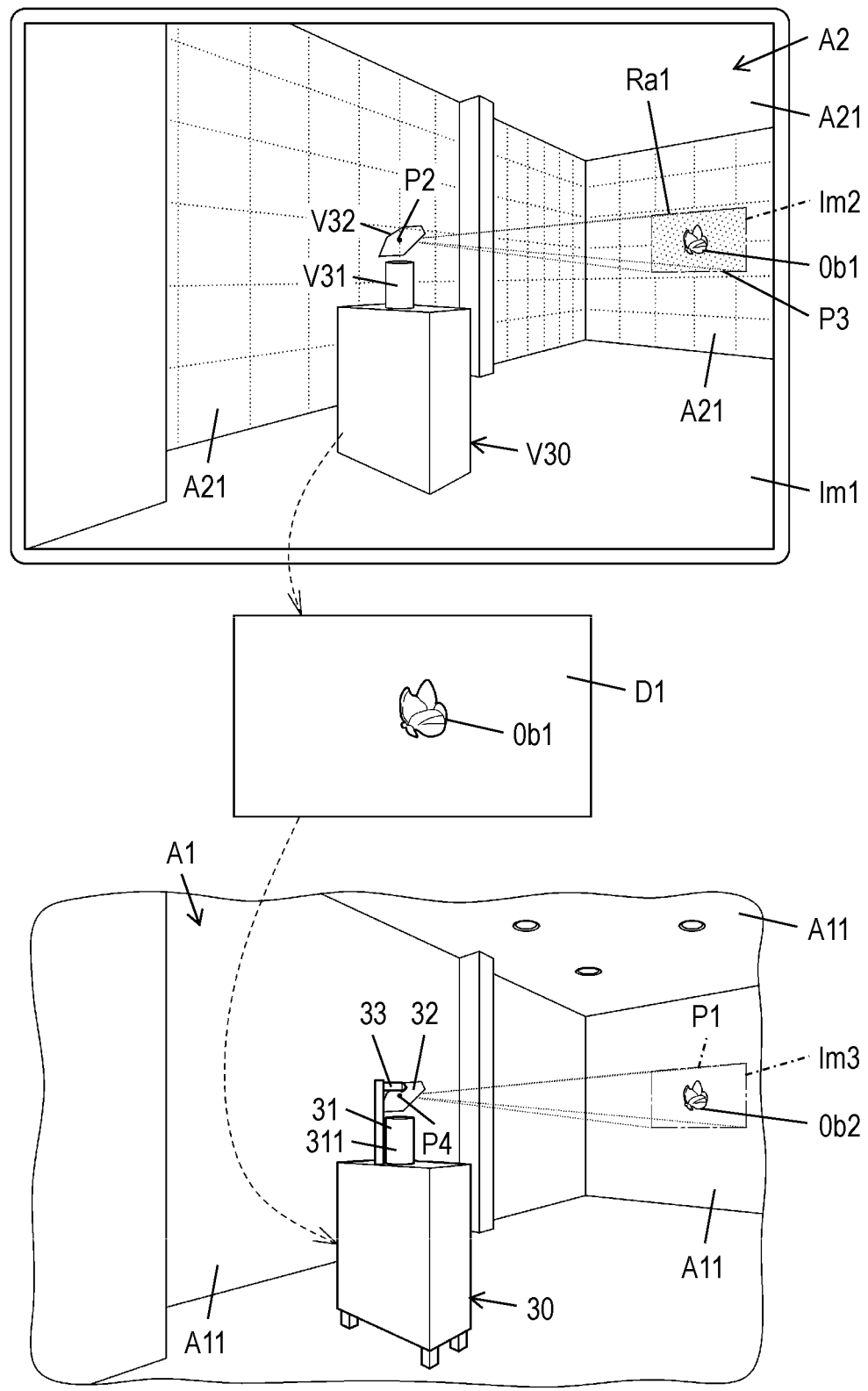
FIG. 4 is an explanatory diagram illustrating a scene in which the control system of the image projection system generates image content and causes a projector to project the image content.

Projector 30 is installed at installation position P4 in real space A1, and can change at least a projection direction. Projector 30 uses image content D1 to project third image Im3 including second object Ob2 onto projection position P1 of projection surface A11, for example, by illuminating, with light, projection surface A11 such as a wall surface, a floor surface, or a ceiling surface presenting in real space A1. As illustrated in FIG. 4, based on second image Im2, projector 30 projects second object Ob2 corresponding to first object Ob1 onto projection position P1 in real space A1 corresponding to a display position of first object Ob1 in virtual space A2. Image content D1 is data representing second image Im2 (virtual image) including first object Ob1 (see FIG. 3C) displayed at display position P3 in virtual space A2. Here, second image Im2 is an image obtained by rendering first image Im1 displayed in virtual space A2 in predetermined rendering region Ra1 with virtual installation position P2 in virtual space A2 corresponding to installation position P4 as a viewpoint. In addition, first image Im1 is an image displayed in virtual space A2 corresponding to real space A1, and is an image including first object Ob1.

Image content D1 in the present disclosure is contents of information (data) forming an image created based on second image Im2, and means contents of information (data) forming third image Im3 projected by projector 30. That is, image content D1 is inputted to projector 30, and thus, projector 30 can use image content D1 to project third image Im3. In other words, contents of third image Im3 are determined by image content D1. As for third image Im3, processing such as trimming, brightness adjustment, or contrast adjustment may be performed on image content D1.

Control system 10 includes, as main configurations, a computer system including one or more processors and one or more memories. In other words, the installation information acquisition method and the image adjustment method according to the present exemplary embodiment are used on the computer system (control system 10). That is, the installation information acquisition method and the image adjustment method can also be embodied by a program. A program according to the present exemplary embodiment is a program for causing one or more processors to execute the installation information acquisition method and the image adjustment method according to the present exemplary embodiment.

(1.1) Installation Information Acquisition Method

Figure 1:
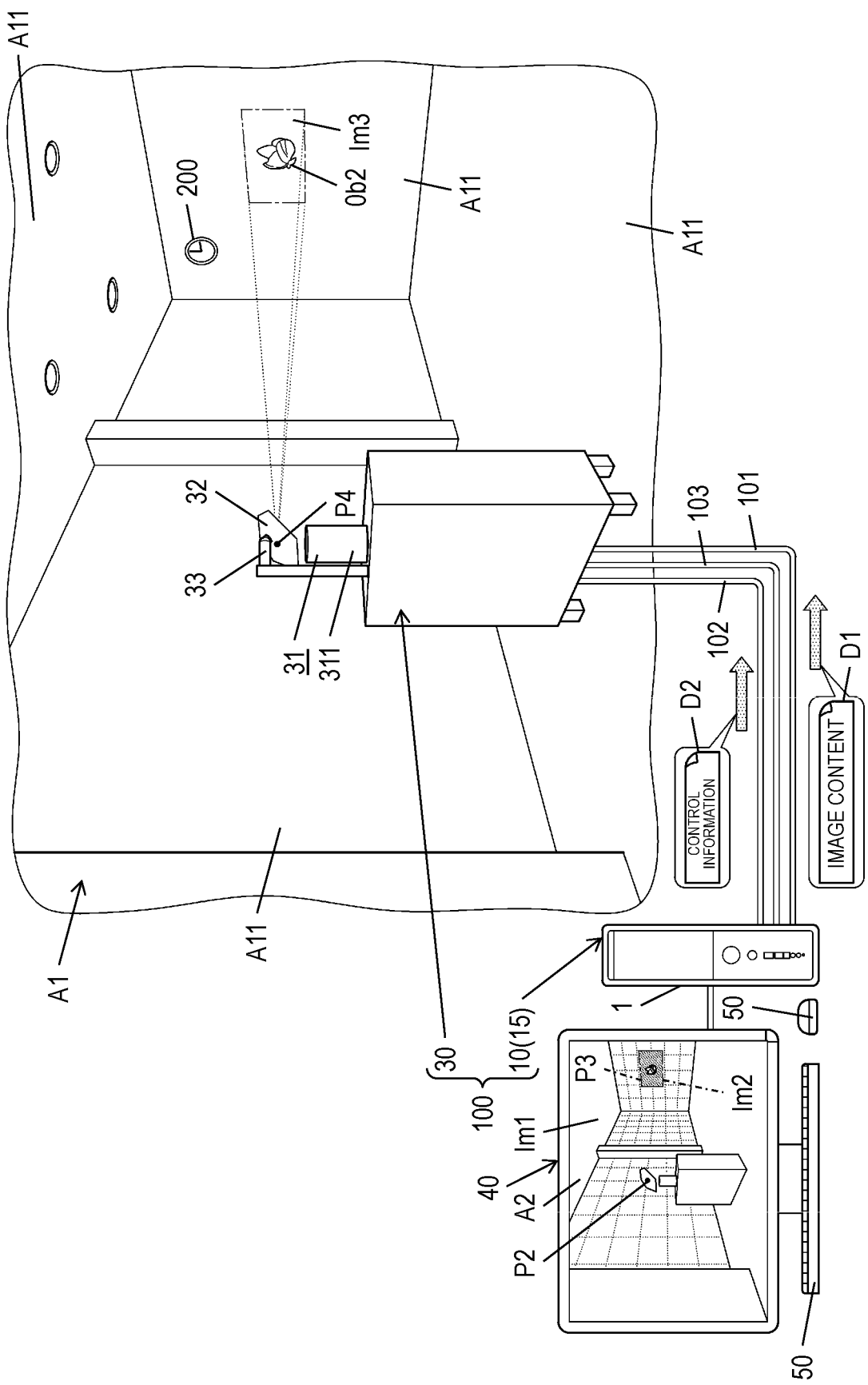
FIG. 1 is a schematic configuration diagram of an image projection system according to one exemplary embodiment.
Figure 2:
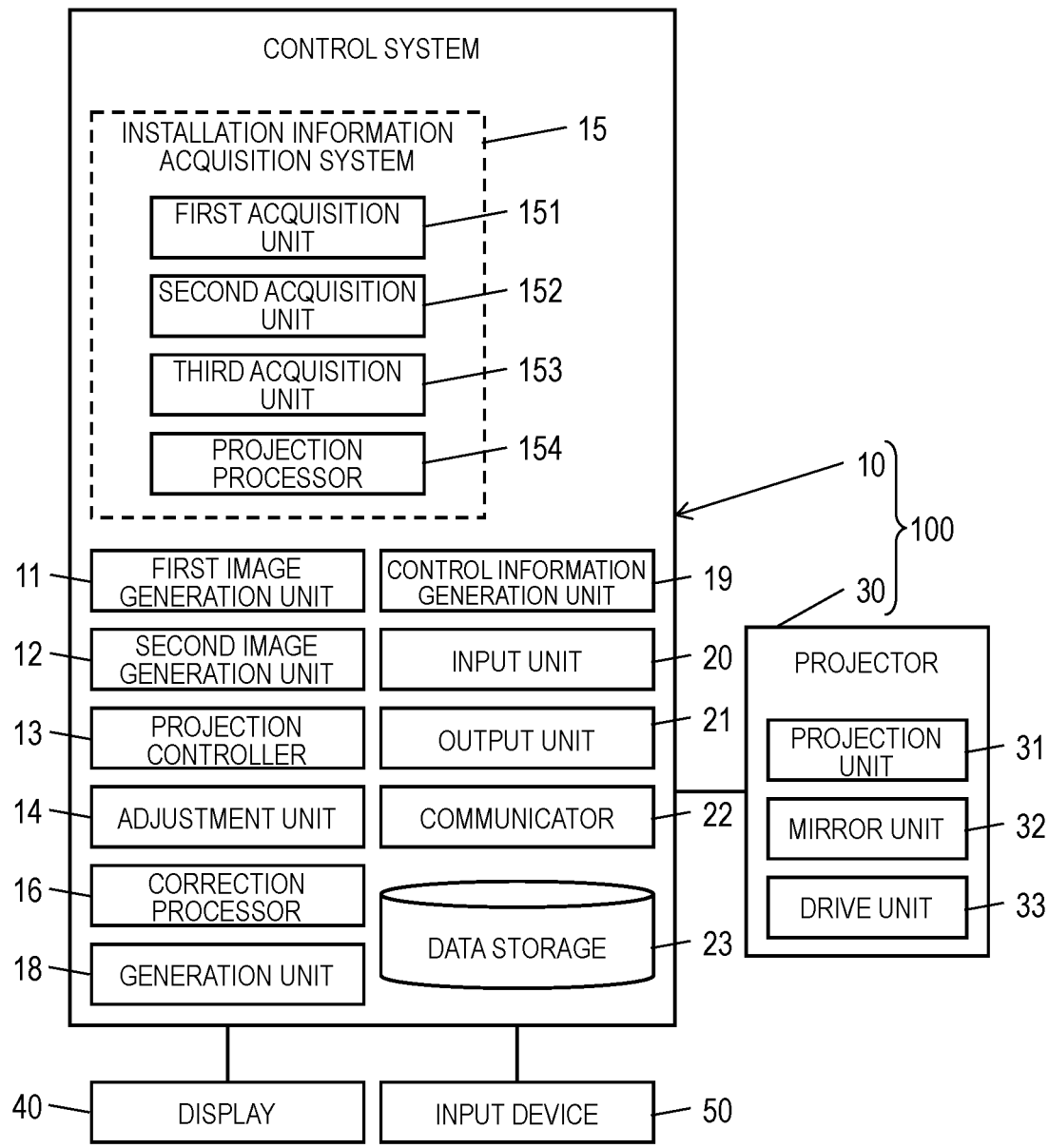
FIG. 2 is a schematic block diagram of the image projection system.

As illustrated in FIG. 1, the installation information acquisition method in image projection system 100 is a method for acquiring installation information regarding an installation state of projector 30 that projects image content D1 onto projection position P1 in real space A1.

When projector 30 projects third image Im3, a size, shape, and orientation of third image Im3 change depending on an installation position and an installation direction of projector 30 with respect to projection position P1. Accordingly, for example, even in a case where third image Im3 is projected onto front or left and right wall surfaces, a floor surface, or a ceiling surface, it is necessary to determine a size, shape, and orientation of first object Ob1 in image content D1 in accordance with a relative positional relationship between projector 30 and projection position P1 in order to project second object Ob2 in third image Im3 with a constant size, shape, and orientation. As an example, when a throw ratio is constant and a projection distance from projector 30 to projection position P1 increases, third image Im3 increases. In this case, in order to set a size of second object Ob2 in third image Im3 to be constant, it is necessary to decrease the size of first object Ob1 in image content D1 or to decrease the size of third image Im3 itself by changing a throw ratio by a zoom lens. In addition, in a case where projection position P1 moves from the front wall surface to the left or right wall surface, for example, the projection direction changes and the orientation of second object Ob2 rotates. Even in this case, in order to set the size, shape, and direction of second object Ob2 in third image Im3 to be constant, it is necessary to increase the size of first object Ob1 and rotate the orientation thereof.

As described above, when image content D1 to be projected by projector 30 is generated, since it is necessary to consider the installation state of projector 30, it takes more time and effort than generation of image content to be displayed on a display that is not a projection type. Here, the installation information regarding the installation state of projector 30 includes information regarding at least one of the relative installation position of projector 30 with respect to projection position P1 in real space A1 and the installation direction of projector 30. In particular, in a case where projection position P1 changes at any time in real space A1, since the relative positional relationship between projector 30 and projection position P1 changes, it takes much time and effort to generate image content D1 in consideration of the positional relationship between the projector and the projection position, that is, the installation state of projector 30.

Thus, in the present exemplary embodiment, image content D1 projected by projector 30 is generated by the following content generation method. In this content creation method, virtual space A2 (see FIGS. 3A to 3C) corresponding to real space A1 is created on a computer. In virtual space A2, virtual installation position P2 corresponding to the installation position of projector 30 in real space A1 and display position P3 corresponding to projection position P1 in real space A1 are reproduced. In the content generation method, second image Im2 (virtual image) including first object Ob1 viewed from virtual installation position P2 in a state where first object Ob1 is arranged (displayed) at display position P3 in virtual space A2 is generated as image content D1. That is, in virtual space A2, in a state where first object Ob1 is displayed at display position P3, second image Im2 including first object Ob1 viewed from virtual installation position P2 is generated as image content D1. That is, in virtual space A2, first object Ob1 can be virtually displayed in any size, shape, and orientation at any display position P3. In a case where third image Im3 based on image content D1 is projected at projection position P1 by projector 30 installed at real installation position P4 corresponding to virtual installation position P2, second object Ob2 to be projected substantially coincides with first object Ob1 virtually displayed onto display position P3. Accordingly, when projector 30 is installed in the installation state as set, the projector can project desired second object Ob2 onto projection position P1 by projecting, by projector 30, image content D1 created by the content generation method.

However, in a case where image content D1 is projected by projector 30, when the installation position and the installation direction with respect to projection position P1 are greatly deviated from an installation position and an installation direction assumed during the creation of image content D1, there is a possibility that second object Ob2 is not correctly projected onto projection position P1. Here, the fact that "second object Ob2 is not correctly projected" refers to a state where at least one of the size, shape, and orientation of second object Ob2 projected onto projection position P1 does not coincide with the size, shape, and orientation of first object Ob1 displayed at display position P3 in virtual space A2. In particular, when projection position P1 of projector 30 moves from one of the front or right and left wall surfaces, the floor surface, or the ceiling surface to another surface in real space A1, there is a possibility that an image is not correctly projected due to deformation or the like when the image is projected onto a position crossing the surface.

Thus, in the installation information acquisition method by an installation information acquisition system of the present exemplary embodiment, the installation information regarding the installation state of projector 30 is acquired. Projector 30 is installed at installation position P4 in real space A1, and can change the projection direction with respect to a reference direction. Projector 30 projects third image Im3 based on second image Im2 onto projection position P1 in real space A1. Second image Im2 is an image in a case where the image arranged at display position P3 in virtual space A2 corresponding to real space A1 is viewed from virtual installation position P2 in virtual space A2 corresponding to installation position P4. The installation information acquisition method includes first acquisition processing, projection processing, second acquisition processing, and third acquisition processing. In the first acquisition processing, positional information regarding positions of three or more first adjustment points AP1 (see FIG. 14) in virtual space A2 is acquired. In the projection processing, projector 30 projects an index image onto real space A1. In the second acquisition processing, angle information regarding an angle of the projection direction of projector 30 with respect to the reference direction in a state where position of the index image match three or more second adjustment points AP2 (see FIG. 15) is acquired. Three or more second adjustment points AP2 correspond to three or more first adjustment points AP1 in virtual space A2. In the third acquisition processing, the installation information regarding the installation state of projector 30 is acquired based on the positional information and the angle information.

Here, the installation information regarding the installation state of projector 30 includes information regarding at least one of the installation position and the installation direction of projector 30 in real space A1. In addition, the reference direction is a direction as a reference in a case where projector 30 capable of changing the projection direction projects an image. For example, in a case where projector 30 can move (pan and tilt) the projection direction in a horizontal direction and an up-down direction, the projection direction in which both a pan angle and a tilt angle become zero is the reference direction. Here, when both the pan angle and the tilt angle are zero, as an example, an image is projected onto a position in front of projector 30. Note that, in the following description, a state where projector 30 is installed at an installation position and an installation direction assumed when image content D1 is created may be referred to as a reference state. In addition, three or more first adjustment points AP1 are points set in virtual space A2 in order to estimate the installation state of projector 30 in real space A1. Three or more second adjustment points AP2 are points in real space A1 corresponding to three or more first adjustment points AP1 set in virtual space A2.

In this installation information acquisition method, angle information in a state where the position of the index image, that is, the projection direction of projector 30 matches three or more second adjustment points AP2 is acquired in the second acquisition processing. Here, the positions of three or more second adjustment points AP2 correspond to the positions of three or more first adjustment points AP1 in virtual space A2. Accordingly, in the third acquisition processing, the installation information of projector 30 can be acquired based on the positional information and the angle information of three or more first adjustment points AP1, and it is possible to grasp whether or not the installation state of projector 30 is deviated from the installation state at virtual installation position P2. As a result, even in a case where projector 30 is installed in an installation state different from an installation state assumed during the generation of the virtual image, the projection image can be displayed more correctly by performing processing such as correcting the projection direction of projector 30 or image data of the virtual image based on the installation information acquired in the third acquisition processing. Accordingly, it is not necessary to strictly install projector 30 in real space A1 in accordance with the installation state assumed when the virtual image is installed, and there is an advantage that a degree of freedom of the installation state of projector 30 in real space A1 is improved.

In addition, as an example, the installation information acquisition method according to the present exemplary embodiment is executed by installation information acquisition system 15 as illustrated in FIG. 2. In other words, installation information acquisition system 15 is an aspect for embodying the installation information acquisition method described above. Installation information acquisition system 15 according to the present exemplary embodiment acquires the installation information regarding the installation state of projector 30. Projector 30 is installed at installation position P4 in real space A1, and can change the projection direction with respect to a reference direction. Projector 30 projects a projection image based on the virtual image onto projection position P1 in real space A1. The virtual image is an image in a case where an image arranged at display position P3 in virtual space A2 corresponding to real space A1 is viewed from virtual installation position P2 in virtual space A2 corresponding to installation position P4. Installation information acquisition system 15 includes first acquisition unit 151, projection processor 154, second acquisition unit 152, and third acquisition unit 153. First acquisition unit 151 acquires the positional information regarding the positions of three or more first adjustment points AP1 in virtual space A2. Projection processor 154 causes projector 30 to project the index image onto real space A1. Second acquisition unit 152 acquires the angle information regarding the angle of the projection direction of projector 30 with respect to the reference direction in a state where the position of the index image matches three or more second adjustment points AP2. Three or more second adjustment points AP2 correspond to three or more first adjustment points AP1 in virtual space A2. Third acquisition unit 153 acquires the installation information on the installation state of projector 30 based on the positional information and the angle information.

Note that, in the following exemplary embodiment, a case where the number of first adjustment points AP1 for which first acquisition unit 151 acquires the positional information and the number of second adjustment points AP2 corresponding to first adjustment points AP1 are each three will be described as an example. However, the number of first adjustment points AP1 and the number of second adjustment points AP2 are not limited to three, and may be four or more.

(1.2) Image Adjustment Method

The image adjustment method in the image projection system according to the present exemplary embodiment is a method for adjusting the size of the image projected by projector 30 onto projection position P1 in real space A1.

For example, image projection system 100 can project, onto real space A1, second object Ob2 corresponding to one or more first objects Ob1 in second image Im2. In a case where only first object Ob1 in second image Im2 is projected as second object Ob2 onto real space A1, control system 10 receives setting of the rendering region set as second image Im2 from first image Im1, creates image content D1 in which a pixel value (luminance value) of a portion other than second object Ob2, that is, a portion corresponding to a background in the rendering region is set to 0 (black), and causes projector 30 to project third image Im3 based on image content D1 onto real space A1. Here, the size of second object Ob2 projected onto real space A1 is determined in accordance with the size of first object Ob1 with respect to the size of the rendering region for rendering second image Im2 with virtual installation position P2 as a viewpoint. In other words, in a case where the size of first object Ob1 in virtual space A2 is constant, the size of second object Ob2 is determined in accordance with a viewing angle (Field of View) in a case where second image Im2 is captured by virtual camera V30 installed at virtual installation position P2. Note that, in a case where the portion corresponding to the background is displayed in third image Im3 in addition to second object Ob2, control system 10 receives the setting of the rendering region set as second image Im2 from first image Im1, and appropriately sets the pixel value of the portion other than second object Ob2 in the rendering region, that is, the portion corresponding to the background, to create image content D1. Note that the setting of the background may be determined by selecting a content for the background in addition to the setting of the pixel value of the background. Here, for example, the background is determined as an image that does not move even after the lapse of time in first image Im1. On the other hand, for example, first object Ob1 is determined as an image that moves with the lapse of time in first image Im1. Note that a user can determine one or more first objects to be projected onto real space A1 by controlling control system 10 by using input device 50, and can project second object Ob2 corresponding to first object Ob1 determined by the user onto real space A1.

Here, the rendering region set as second image Im2 in virtual space A2 and the region in which an image is projected at an angle of view of projector 30 set in real space A1 do not coincide, and thus, the position of the image to be projected, particularly the position of the object in the image, may be deviated from a desired projection position.

Figure 5A:
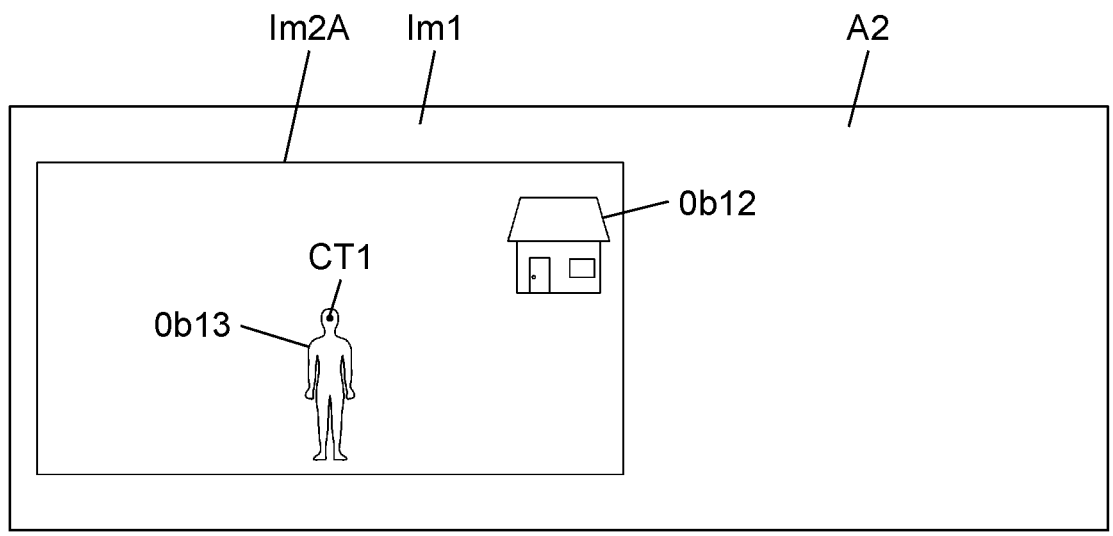
FIG. 5A is an explanatory diagram of a second image rendered from a first image by the image projection system.
Figure 5B:
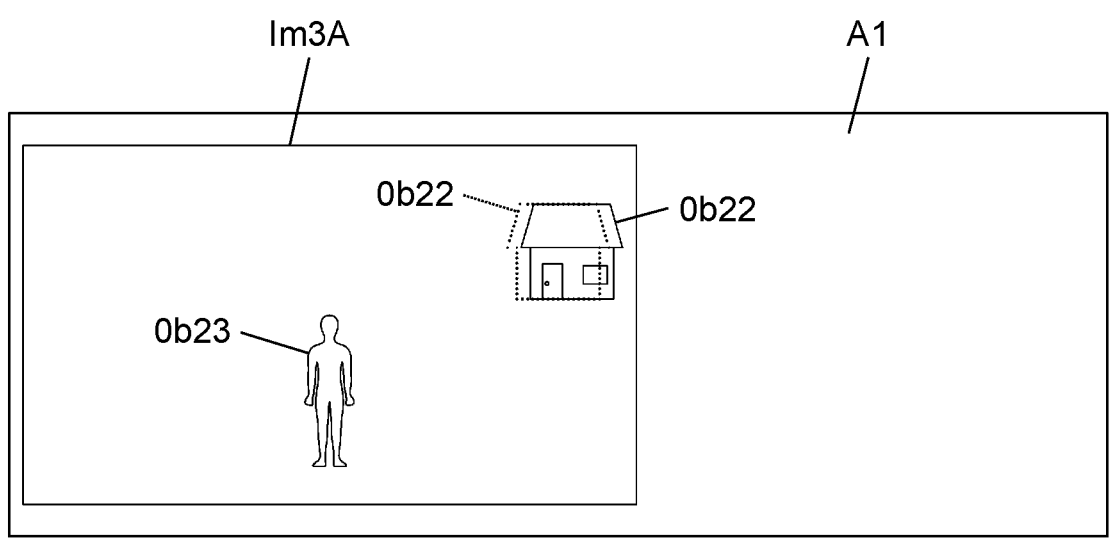
FIG. 5B is an explanatory diagram of a second object projected onto a real space by the projector of the image projection system.

For example, as illustrated in FIG. 5B, in a case where third image Im3A including second object Ob22 (for example, a building) desired to be displayed as the background at a fixed position in real space A1 and second object Ob23 (for example, a person) desired to be moved from left to right in real space A1 is projected by projector 30, control system 10 first generates first image Im1 (see FIG. 5A) such that first object Ob12 corresponding to second object Ob22 is present at a fixed position and first object Ob13 corresponding to second object Ob23 is present at a left departure point in virtual space A2. Control system 10 generates second image Im2A obtained by rendering first image Im1 in a predetermined rendering region with virtual installation position P2 as a viewpoint, and causes projector 30 to project third image Im3A based on second image Im2A onto real space A1. Note that control system 10 generates second image Im2A such that moving first object Ob13 is positioned at image center CT1. Thereafter, control system 10 renders second image Im2A (moving picture) such that first object Ob12 is positioned at image center CT1 while creating first image Im1 (moving picture) in which first object Ob13 is present at a fixed position on virtual space A2 and first object Ob13 gradually moves to a right side.

Control system 10 causes projector 30 to project third image Im3A (moving picture) based on second image Im2A onto real space A1. A moving picture in which second object Ob22 is present at a fixed position and second object Ob23 moves from left to right is projected onto real space A1. Here, control system 10 changes the projection position of third image Im3A by changing the projection direction of projector 30 in accordance with the movement of first object Ob13 in virtual space A2, that is, the movement of image center CT1 of second image Im2A. As a result, second object Ob23 projected onto real space A1 moves. Note that, since second image Im2A is formed such that first object Ob13 is present at image center CT1, in a case where first object Ob13 moves to the right side, first object Ob12 present at a fixed position moves to the left side with respect to first object Ob13 in second image Im2A. Accordingly, even in a case where the projection direction of projector 30 is moved to a right side in accordance with the movement of second object Ob23 corresponding to first object Ob13, second object Ob22 is projected onto the fixed position in real space A1. Specifically, even in a case where image center CT1 of second image Im2A (that is, an image center of third image Im3A projected onto real space A1) moves in accordance with the movement of first object Ob13 in first image Im1, second object Ob22 appears not to move in real space A1.

Here, even in a case where an image size of third image Im3A projected onto real space A1 by projector 30 does not coincide with a size of rendering region Ra1 of second image Im2A created in virtual space A2, since moving first object Ob13 is present at image center CT1 of second image Im2A, the display position in virtual space A2 and the projection position in real space A1 become the same position. On the other hand, since first object Ob12 present at the fixed position is displayed at a position different from image center CT1 of second image Im2A, in a case where the size of rendering region Ra1 of second image Im2A does not coincide with the image size of third image Im3A, second object Ob12 corresponding to first object Ob22 is projected at a position different from the projection position corresponding to the display position in virtual space A2 in real space A1. Thus, when the projection direction of projector 30 is changed in accordance with the movement of first object Ob13 (second object Ob23), there is a possibility that second object Ob22 to be projected onto the fixed position appears to be moving. Here, the fact that the size of rendering region Ra1 of second image Im2A does not coincide with the image size of third image Im3A means that the relative sizes do not coincide. That is, this means that a size obtained by converting the size of rendering region Ra1 of second image Im2A on a scale of virtual space A2 into a scale of real space A1 does not coincide with the image size of third image Im3A projected onto real space A1.

Figure 6A:
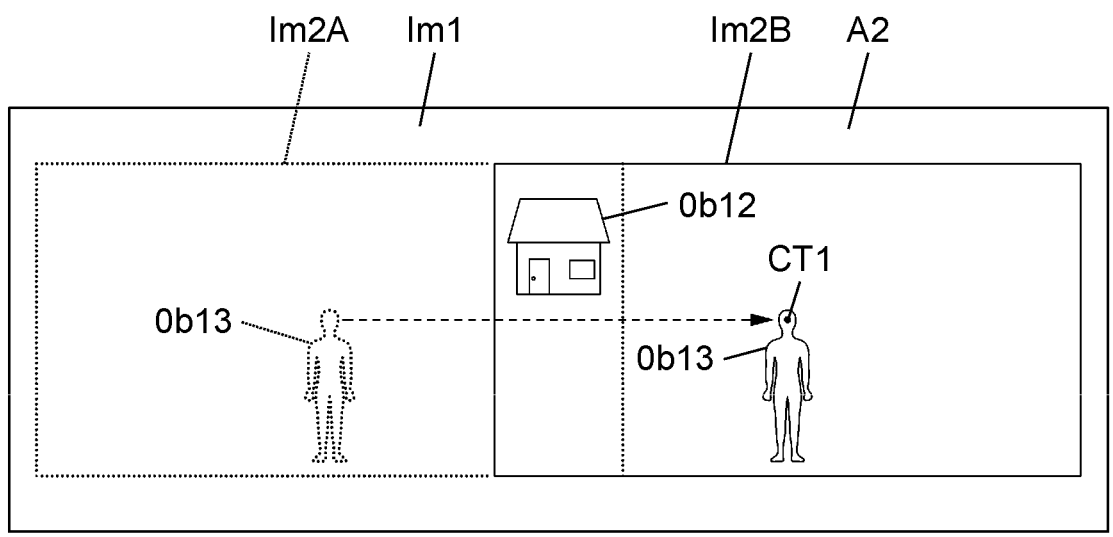
FIG. 6A is an explanatory diagram of the second image rendered from the first image by the image projection system.
Figure 6B:
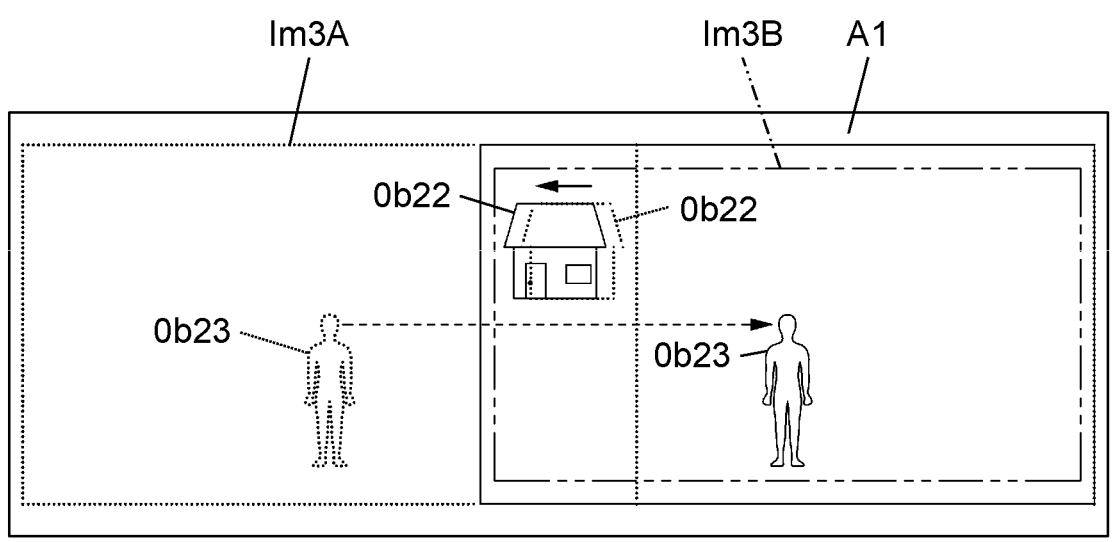
FIG. 6B is an explanatory diagram of the second object projected onto the real space by the projector of the image projection system.

FIG. 5B illustrates an example of third image Im3A projected onto real space A1. In the example of FIG. 5B, since the image size of third image Im3A is larger than the size of rendering region Ra1 of second image Im2A (the size converted into the scale of real space A1), second object Ob2 to be projected onto the fixed position is projected onto a position (a position indicated by a solid line) different from the projection position (a position indicated by a dotted line) corresponding to the display position in virtual space A2. In a case where second image Im2B is rendered such that first object Ob13 moves from left to right as illustrated in FIG. 6A, there is a problem that second object Ob22 to be projected onto the fixed position in real space A1 is projected to move from right to left as illustrated in FIG. 6B.

Thus, in the image adjustment method of the present exemplary embodiment, a first image generation step, a first adjustment image generation step, a first adjustment image projection step, a second adjustment image generation step, a second adjustment image projection step, and an adjustment step are performed, and thus, a positional deviation between the projection position of the image projected onto real space A1 by projector 30 and the position corresponding to the display position in virtual space A2 is reduced. Here, the image adjustment method of the present exemplary embodiment will be described with reference to FIGS. 19 to 22. In FIGS. 19 to 22, for the sake of convenience in description, it is assumed that first object Ob5 having a diamond shape is displayed on first image Im1 and second object Ob6 having a diamond shape corresponding to first object Ob1 is projected onto real space A1, but shapes and sizes of first object Ob1 and second object Ob6 can be changed as appropriate.

Figure 19:
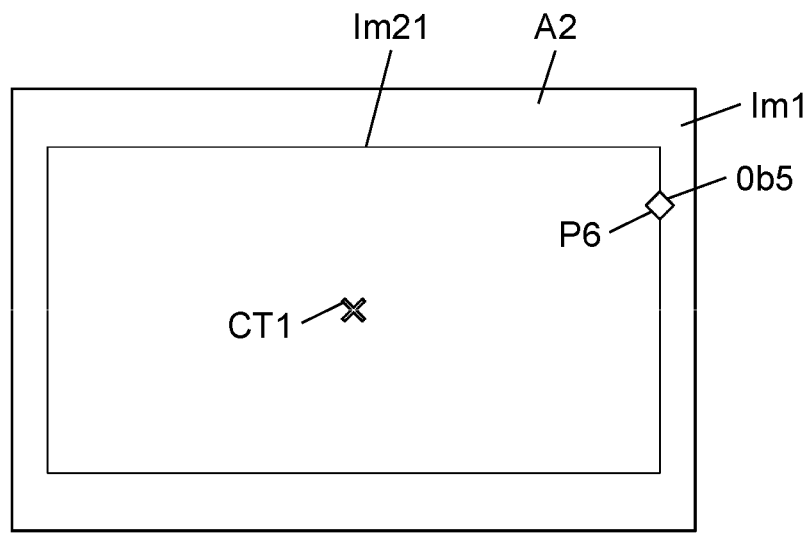
FIG. 19 is an explanatory diagram of a first adjustment image rendered from the first image by the image projection system.
Figure 20:
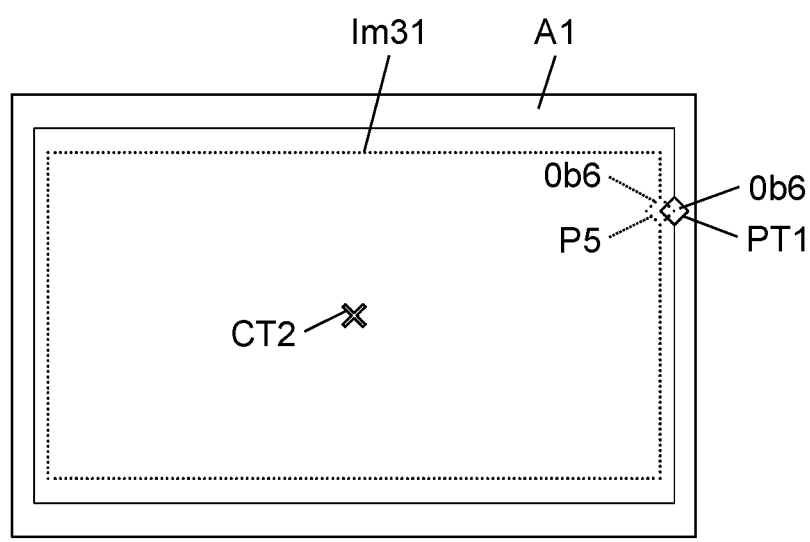
FIG. 20 is an explanatory diagram of the second object based on the first adjustment image projected onto the real space by the image projection system.

In the first image generation step, first image Im1 in which first object Ob5 is displayed at second position P6 (a position illustrated in FIG. 19) in virtual space A2 corresponding to first position P5 (a position of second object Ob6 indicated by a dotted line in FIG. 20) in real space A1 is generated. In the first adjustment image generation step, first adjustment image Im21 (see FIG. 19) in which first object Ob5 is positioned in a first direction (for example, a right direction that is one of a panning direction) with respect to image center CT1 is rendered from first image Im1 to second image Im2.

In the first adjustment image projection step, as illustrated in FIG. 20, projector 30 projects second object Ob6 (specifically, third image Im31 including second object Ob6) onto first projection position PT1 in real space A1 based on first adjustment image Im21. Note that, since the size of rendering region Ra1 of first adjustment image Im21 does not coincide with the image size of third image Im31, second object Ob6 is projected onto a position deviated from first position P5 corresponding to second position P6 in virtual space A2. In the examples of FIGS. 19 and 20, since the image size of third image Im31 projected onto real space A1 is larger than the size of rendering region Ra1 of first adjustment image Im21 (the size converted into the scale of real space A1), second object Ob6 is projected onto to a right side of first position P5. That is, a distance from image center CT2 of third image Im31 to an actual projection position of second object Ob6 is longer than a distance from image center CT2 to first position P5.

Note that, in a case where the image size of third image Im31 projected onto real space A1 is smaller than the size of rendering region Ra1 of first adjustment image Im21 (the size converted into the scale of real space A1), second object Ob6 is projected onto a left side of first position P5 corresponding to the display position in virtual space A2. That is, the distance from image center CT2 of third image Im31 to the actual projection position of second object Ob6 is shorter than the distance from image center CT2 to first position P5.

Subsequently, in the second adjustment image generation step, second adjustment image Im22 (see FIG. 21) in which first object Ob5 is positioned in a second direction (for example, a left direction) opposite to the first direction with respect to image center CT1 is rendered from first image Im1 to second image Im2.

Figure 22:
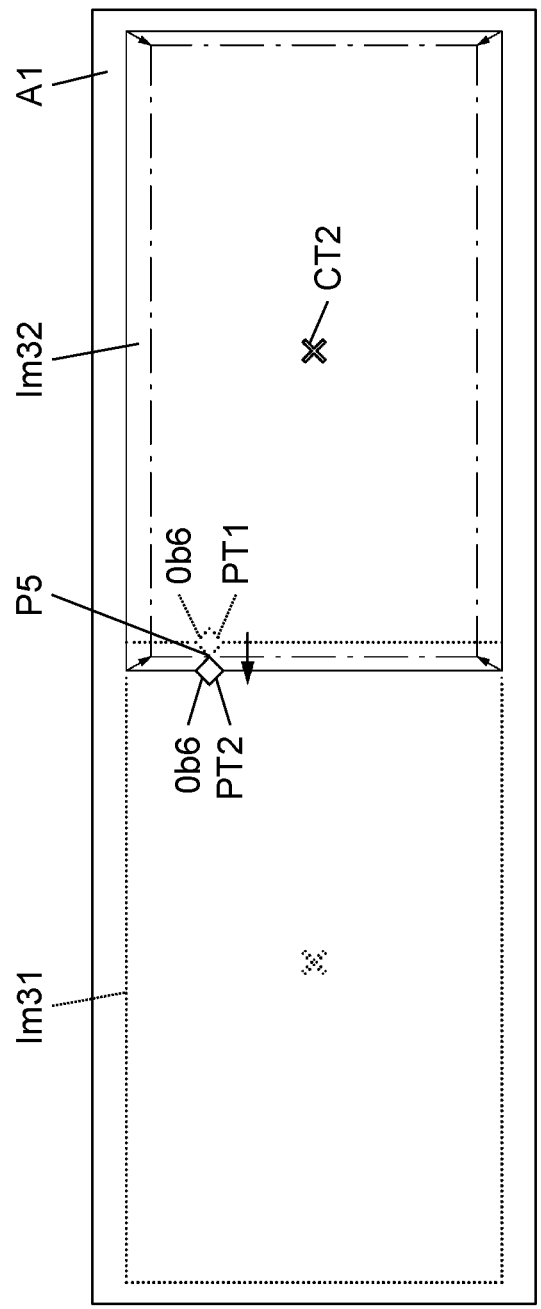
FIG. 22 is an explanatory diagram of the second object based on the second adjustment image projected onto the real space by the image projection system.

In the second adjustment image projection step, as illustrated in FIG. 22, projector 30 projects second object Ob6 (specifically, third image Im32 including second object Ob6) based on second adjustment image Im22 onto second projection position PT2 (a position indicated by the solid line in FIG. 22) in real space A1. In the examples of FIGS. 20 and 22, since the image size of third image Im32 is larger than the size of rendering region Ra1 of second adjustment image Im22 (the size converted into the scale of real space A1), second object Ob6 is projected onto the left side of first position P5. Note that, in a case where the image size of third image Im32 is smaller than the size of rendering region Ra1 of second adjustment image Im22 (the size converted into the scale of real space A1), second object Ob6 is projected onto the right side of first position P5.

In the adjustment step, a projection size of second object Ob6 in real space A1 is adjusted to reduce a positional deviation between first projection position PT1 and second projection position PT2. Note that a method for adjusting the projection size of second object Ob6 in real space A1 includes at least one of zoom adjustment of projector 30 and size adjustment of rendering region Ra1.

In the examples of FIGS. 19 to 22, since the image size of third image Im21 is larger than the size of rendering region Ra1 of first adjustment image Im31 (the size converted into the scale of real space A1), the zoom adjustment of projector 30 may be performed to decrease the projection size of second object Ob6 projected by projector 30. In FIG. 22, when the zoom adjustment is performed to decrease the image size (angle of view) of third image Im32 to the size illustrated by the dotted line, the positional deviation between first projection position PT1 and second projection position PT2 can be reduced.

Here, in the case of projector 30 that cannot perform zoom adjustment, in the adjustment step, the projection size of second object Ob6 may be adjusted by adjusting the size of rendering region Ra1 of second image Im2 to be rendered from first image Im1, and thus, the projection position of second object Ob6 may be adjusted. In addition, in the case of projector 30 that can perform zoom adjustment, in the adjustment step, the projection size of second object Ob6 may be adjusted by performing zoom adjustment of projector 30, the projection size of second object Ob6 may be adjusted by performing size adjustment of rendering region Ra1 for rendering second image Im2, or both the zoom adjustment of projector 30 and the size adjustment of rendering region Ra1 of second image Im2 may be performed. As described above, the projection position of second object Ob6 can be adjusted by adjusting the projection size of second object Ob6 in real space A1 in the adjustment step, and thus, the positional deviation between first projection position PT1 and second projection position PT2 can be reduced.

Accordingly, in a case where third image Im3 projected by projector 30 includes second object Ob22 (see FIG. 5B) displayed at the fixed position in real space A1, even though the projection direction of projector 30 is changed, there is an advantage that the position of second object Ob22 is less likely to change.

Figure 7:
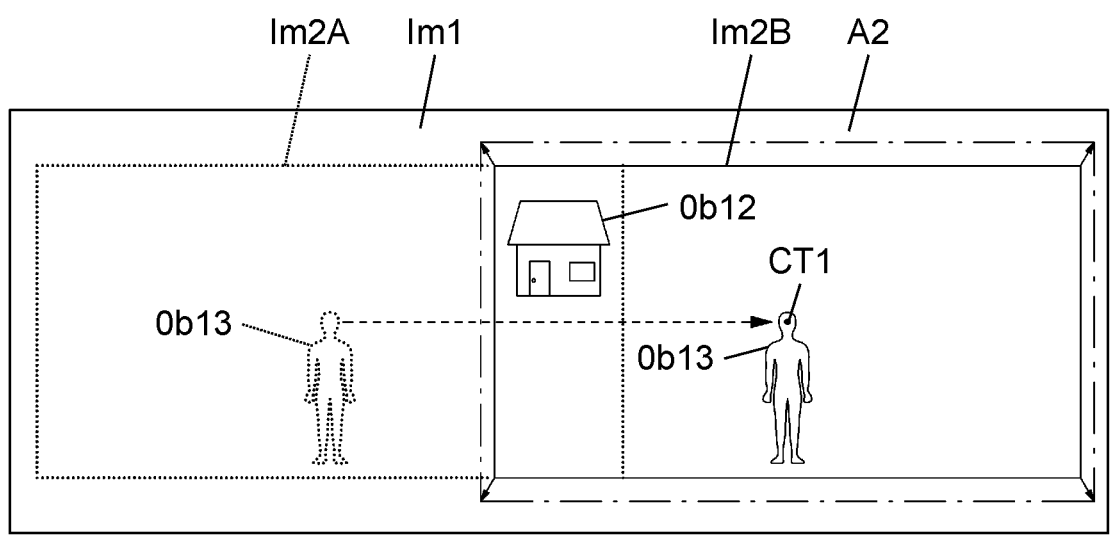
FIG. 7 is a schematic explanatory diagram for describing a method in which the image projection system performs size adjustment of a rendering region of the second image.

Note that, in the examples of FIGS. 5A to 6B, since the image sizes of third images Im3A and Im3B are larger than the image sizes of second images Im2A and Im2B, as illustrated in FIG. 6B, when zoom adjustment is performed to decrease the image size (angle of view) of third image Im3B to the size indicated by the dotted line, the positional deviation between first projection position PT1 and second projection position PT2 can also be reduced. Here, the size adjustment of the projection size of second object Ob6 in real space A1 is not limited to the zoom adjustment in projector 30, and the size adjustment of rendering region Ra1 of second image Im2 can also be performed. For example, as illustrated in FIG. 7, the projection size of second object Ob6 in real space A1 can be decreased by increasing the size of the rendering region when second image Im2B is rendered to the size indicated by the dotted line, and thus, the positional deviation between first projection position PT1 and second projection position PT2 can be reduced.

In addition, the image adjustment method according to the present exemplary embodiment is executed by control system 10 as illustrated in FIG. 2 as an example. In other words, control system 10 is an aspect for embodying the image adjustment method described above.

Control system 10 according to the present exemplary embodiment controls projector 30 of image projection system 100. Projector 30 is installed at installation position P4 in real space A1, and can change at least a projection direction. In image projection system 100, based on second image Im2, projector 30 projects second object Ob6 corresponding to first object Ob5 onto the projection position in real space A1 corresponding to the display position of first object Ob5 in virtual space A2. Second image Im2 is an image obtained by rendering first image Im1 including first object Ob5 in predetermined rendering region Ra1 with virtual installation position P2 in virtual space A2 corresponding to installation position P4 as a viewpoint.

(2) Premises

The "image" in the present disclosure includes a moving picture (moving image) and a still picture (still image). Further, the "moving picture" includes an image including a plurality of still pictures obtained by frame capturing or the like. In addition, the "image" includes a monochrome image and a color image. In the present exemplary embodiment, as an example, the "image" is an image that changes with the lapse of time (that is, a moving picture), and is a full-color image. That is, in the present exemplary embodiment, as an example, third image Im3 projected by projector 30 is a full-color moving picture, and image content D1 as contents of information for forming third image Im3 is also data of the full-color moving picture.

The "real space" in the present disclosure means an actual space, that is, a space that actually is present, and includes an internal space (inside space) of a facility (building) that actually is present and an outdoor space. The facility here includes, for example, a non-residential facility such as a commercial facility, a theme park, an office building, a school, a welfare facility, a hospital, and a factory, and a facility such as an apartment house and a detached house. Non-residential facilities also include a theater, a movie theater, a community hall, a game hall, a complex facility, a restaurant, a department store, a hotel, an inn, a kindergarten, a library, a museum, an art gallery, an underground mall, a station, an airport, and the like. Furthermore, the "facility" in the present disclosure includes not only a building (structure) but also outdoor facilities such as a stadium, a parking lot, a ground, and a park. For example, in an internal space of a facility including structures, surfaces (a wall surface, a floor surface, a ceiling surface, and the like) of the structures of the facility such as a wall, a floor, or a ceiling may be projection surface A11 for projection of third image Im3. Further, as in a door, a partition, a shelf, a desk, a chair, a home appliance, a white board, a screen, or the like, a surface of equipment (a tool, a fixture, a device, and apparatus) installed inside the facility may be projection surface A11 for projection of third image Im3. In the outdoors, an outer wall, a roof, or a pillar of a facility including a structure, and further, a surface of an object such as the ground, a rock, or a tree may be projection surface A11 for projection of third image Im3. In the present exemplary embodiment, as an example, a description will be made on a case where real space A1 is an indoor space (inside space) of one room of a non-residential facility such as a commercial facility, and a wall surface, a floor surface, a ceiling surface, or the like in the room is projection surface A11.

The "virtual space" in the present disclosure means a virtual space that does not actually exist, does not exist in an actual space (real space A1), and is not associated with an entity. Thus, virtual space A2 includes, for example, data that can be processed by one or more processors, and is visually recognized by the user via a user interface such as a device as a virtual space reproduced by the computer system. Here, virtual space A2 is a space corresponding to real space A1 in which third image Im3 is projected. In other words, virtual space A2 is a space imitating real space A1 in which projector 30 is installed, and is, for example, a virtual space in which structures such as a wall, a floor, and a ceiling are laid out similarly to real space A1. Thus, virtual space A2 includes virtual projection surface A21 (see FIGS. 3A to 3C) corresponding to projection surface A11 on which third image Im3 is projected in real space A1. However, virtual space A2 only needs to simulate real space A1 at least with respect to a layout of a surface of a structure including projection surface A11, and need not simulate real space A1 for an inside and a back side of the structure, a surface state of the structure, a layout of facilities such as a luminaire, and the like. In the present exemplary embodiment, as an example, virtual space A2 is a three-dimensional space represented by an XYZ orthogonal coordinate system having three axes of an X axis, a Y axis, and a Z axis orthogonal to each other.

In addition, the "position" in the present disclosure may have a certain size and shape, or may be a "point" having no size. Accordingly, for example, projection position P1 may be defined by a region having a certain size and shape in real space A1, or may be defined by a "point" on coordinates having no size. In the present exemplary embodiment, as an example, projection position P1 is assumed to include a region having a certain size (area) on projection surface A11. Similarly, display position P3 (see FIG. 1) corresponding to projection position P1 is assumed to be a region having a certain size (area) in virtual space A2. On the other hand, it is assumed that virtual installation position P2 (see FIGS. 1 and 3C) is a "point" having no size. Further, installation position P4 (see FIG. 1) to be described later represents a position where projector 30 is installed in real space A1, and is assumed to be a "point" having no size. That is, installation position P4 is a position of one point (for example, a center point of mirror unit 32 to be described later) determined with respect to projector 30. Further, virtual installation position P2 and display position P3 in virtual space A2 are merely defined as being virtually present in virtual space A2 that is virtual, and are not present in the actual space (real space A1) and are not associated with an entity.

The "object" in the present disclosure includes data that can be processed by one or more processors. The "object" does not exist in the actual space (real space), and is not associated with an entity. First objects Ob1, Ob5, and Ob11 to Ob13 and second objects Ob2, Ob6, Ob22, and Ob23 are virtual models representing some object (including an organism), a pattern, a symbol, a number, a character, or the like, and may be either a two-dimensional model or a three-dimensional model. In the present exemplary embodiment, it is assumed that first object Ob1 and second object Ob2 illustrated in FIGS. 1 and 4 are two-dimensional models imitating "butterfly". In addition, it is assumed that first object Ob12 illustrated in FIGS. 5A, 6A, and 7 and second object Ob22 illustrated in FIGS. 5B and 6B are two-dimensional models imitating a "house" set as a background. In addition, it is assumed that first object Ob13 illustrated in FIGS. 5A, 6A, and 7 and second object Ob23 illustrated in FIGS. 5B and 6B are two-dimensional models imitating a "person".

(3) Image Projection System (3.1) Overall Configuration

Control system 10 includes installation information acquisition system 15 that acquires the installation information of projector 30, and generates image data to be projected by projector 30. Control system 10 constitutes image projection system 100 together with projector 30 that projects generated image content D1. That is, image projection system 100 includes control system 10 including installation information acquisition system 15 and projector 30. Image projection system 100 can perform all kinds of processing necessary for projecting third image Im3 onto projection position P1 in real space A1, from generation of image content D1 to projection of generated image content D1.

As described above, control system 10 includes, as main configurations, the computer system having one or more processors and one or more memories. In the present exemplary embodiment, as an example, control system 10 is implemented by one information terminal 1 including a personal computer. In information terminal 1 (see FIG. 1), dedicated application software (program) is installed. Activating this application software causes information terminal 1 to function as control system 10 and embody the installation information acquisition method and the image adjustment method.

In addition, control system 10 is connected to display 40 and input device 50. Control system 10 displays a screen on display 40 to present information to the user, and receives an operation of the user by input device 50. For example, in the installation information acquisition method according to the present exemplary embodiment, it is possible to perform an operation of inputting the positional information of three first adjustment points AP1 on a graphical user interface (GUI) of the computer system, and in the image adjustment method, it is possible to perform an operation of instructing execution of the first adjustment image projection step, the second adjustment image projection step, and the like on the GUI.

In addition, in image projection system 100, control system 10 is configured to be able to communicate with projector 30. The fact that the control system is configured to "be able to communicate with" in the present disclosure means that information can be exchanged directly or indirectly via a network, a repeater, or the like by an appropriate communication method of wired communication or wireless communication. That is, control system 10 and projector 30 can exchange information with each other. In the present exemplary embodiment, control system 10 can transmit the index image, first adjustment image Im21 and second adjustment image Im22, control information D2 for projecting these images, and the like to projector 30. As a result, image projection system 100 can transmit image data of the index image, first adjustment image Im21, and second adjustment image Im22 to projector 30 and cause projector 30 to project these images. In addition, image content D1, control information D2, and the like can be transmitted from control system 10 to projector 30. As a result, image projection system 100 can transmit image content D1 generated by control system 10 to projector 30, and can project image content D1 by projector 30.

As an example, in the present exemplary embodiment, control system 10 and projector 30 are wire-connected via video cable 101, control cable 102, and communication cable 103. As an example, video cable 101 conforms to a communication standard such as HDMI (registered trademark), and is used for transmission of image content D1 from control system 10 to projector 30. As an example, control cable 102 conforms to a communication standard such as a local area network (LAN), and is used for transmission of control information D2 from control system 10 to projector 30. As an example, communication cable 103 conforms to a communication standard such as a LAN, and is used to exchange various kinds of information between control system 10 and projector 30. Control cable 102 and communication cable 103 may be shared by one LAN cable, or may be separately used for controlling mirror unit 32, which will be described later, and for controlling a main body of projector 30.

Projector 30 projects image content D1 generated by control system 10 onto projection position P1 in real space A1. Here, projector 30 is installed at installation position P4 in real space A1. In the present exemplary embodiment, installation position P4 is a position of one point determined for projector 30 as described above, and is, as an example, a position of a center point of mirror unit 32 to be described later. That is, projector 30 is installed in real space A1 such that the center point of mirror unit 32 is positioned at installation position P4. Projector 30 projects third image Im3 including second object Ob2 onto projection position P1 of projection surface A11 by illuminating, with light, projection surface A11 such as a wall surface, a floor surface, or a ceiling surface present in real space A1 based on image content D1.

In the present exemplary embodiment, projector 30 projects, in real time, image content D1 transmitted (distributed) from control system 10. In other words, control system 10 has a function as a video-reproducing device that reproduces image content D1 and outputs (transmits) a video signal. That is, in image projection system 100, control system 10 generates and reproduces image content D1, and projector 30 projects image content D1.

Display 40 is implemented by, for example, a liquid crystal display, an organic electro luminescence (EL) display, or the like. Display 40 presents the installation information acquisition method and the image adjustment method to the user by receiving a video signal from control system 10 and displaying a "screen" such as an input screen.

Input device 50 is implemented by, for example, a keyboard, a pointing device such as a mouse, a mechanical switch, a gesture sensor, or a voice input device. Input device 50 receives an operation of the user (including a voice operation or the like) in the installation information acquisition method and the image adjustment method, and outputs an operation signal corresponding to the operation of the user to control system 10.

At least one of display 40 or input device 50 may be included in component elements of control system 10. In other words, control system 10 may include at least one of display 40 and input device 50. Further, for example, display 40 and input device 50 may be implemented by a touch panel display, and in this case, display 40 and input device 50 are integrated.

(3.2) Projector

Next, a more detailed configuration of projector 30 will be described.

In the present exemplary embodiment, projector 30 is of a floor-mounted type that is used by being placed on a floor (including the ground). Thus, depending on a position where projector 30 is placed and an orientation of projector 30 on the floor, a position (installation position P4) and an installation direction of projector 30 in a horizontal plane can be freely set. Note that, although projector 30 is placed on the floor in the present exemplary embodiment, projector 30 is not limited to the floor-mounted type, and may be fixed to an arm provided on a wall surface, a floor surface, or a ceiling surface, or may be suspended from the ceiling surface by a wire or the like, for example.

Further, projector 30 has, for example, an adjuster function at a leg portion that supports the main body, and can also adjust a height in a vertical direction by adjusting a height of the main body from a floor surface. As a result, this allows any setting of installation position P4, which is a position of a center point of a surface (reflecting surface) of mirror unit 32 of projector 30.

Here, as an example, as illustrated in FIG. 1, projector 30 is installed at a position appropriately away from any wall surface in real space A1 including an indoor space of the facility. This allows projector 30 to use image content D1 to project third image Im3 at projection position P1 of projection surface A11, by illuminating, with light, projection surface A11 such as a wall surface, a floor surface, or a ceiling surface present around projector 30.

Here, projector 30 is a movable projection system in which projection position P1 is not fixed and projection position P1 in real space A1 is variable. That is, projection position P1 of third image Im3 is movable in real space A1. Here, projector 30 moves projection position P1 by changing an illumination direction of light (that is, the projection direction of the image). As an example, when projector 30 installed in front of projection surface A11 changes the light illumination direction from a left end to a right end of projection surface A11, projection position P1 moves on projection surface A11 in the right direction.

In the present exemplary embodiment, in particular, projector 30 is a moving mirror type project ion system, and moves projection position P1 of third image Im3 by moving mirror unit 32 positioned on an optical path of the illuminated light, to change the light illumination direction. That is, as illustrated in FIGS. 1 and 2, projector 30 includes projection unit 31, mirror unit 32, and drive unit 33. Projection unit 31 emits light for projecting an image (third image Im3) onto real space A1 by using image content D1. Mirror unit 32 reflects the light emitted from projection unit 31. Drive unit 33 changes the projection direction of the image by driving mirror unit 32 to change an orientation of mirror unit 32, and moves projection position P1 of the image. In short, in the present exemplary embodiment, by drive unit 33 causing mirror unit 32 to swing, mirror unit 32 changes a reflection direction of the light emitted from projection unit 31, to change the illumination direction of the light (reflected light in mirror unit 32) from projector 30, that is, the projection direction of the image.

More specifically, as illustrated in FIG. 1, projection unit 31 includes, as an example, optical unit 311 having a cylindrical shape protruding upward from an upper surface of the main body of projector 30. Optical unit 311 includes a lens system including a plurality of lens elements. When control information D2 including a control instruction inputted from control system 10 is received, projector 30 adjusts the image size of third image Im3 projected onto real space A1 (that is, the projection size of second object Ob2) by changing the zoom of the lens system in accordance with the control instruction. Note that, in the present exemplary embodiment, the image size of third image Im3 projected onto real space A1 (that is, the projection size of second object Ob2) can also be adjusted by the user manually adjusting the zoom of the lens system. Projection unit 31 emits light upward from an opening on an upper surface of optical unit 311, along an optical axis of optical unit 311. The light emitted from projection unit 31 is light for projecting third image Im3 including second object Ob2, and projection surface A11 is illuminated with the light, and thus, third image Im3 including second object Ob2 is formed on projection surface A11 and projected. Image content D1 is inputted, and thus, projection unit 31 emits an image corresponding to image content D1 as light. In the present exemplary embodiment, an optical axis of the light emitted from projection unit 31 is along the vertical direction and intersects with a center of the surface (reflecting surface) of mirror unit 32.

As an example, mirror unit 32 is a flat plane mirror having a polygonal (hexagonal) surface (reflecting surface), and is held by drive unit 33 so as to be swingable. As described above, since the light from projection unit 31 enters the center point of the surface of mirror unit 32 from below, mirror unit 32 is basically held with the surface facing obliquely downward. As a result, the light emitted upward from projection unit 31 is reflected laterally by the surface of mirror unit 32, and is emitted toward projection surface A11 such as a wall surface, a floor surface, or a ceiling surface present around projector 30.

Drive unit 33 holds mirror unit 32 so as to be swingable, and drives mirror unit 32 so as to change an orientation of mirror unit 32. Drive unit 33 is implemented by, for example, an actuator including a motor and the like. By drive unit 33 driving mirror unit 32, the orientation of mirror unit 32 changes, and projection position P1 moves in real space A1. Drive unit 33 is controlled by control information D2 from control system 10. In other words, control information D2 transmitted from control system 10 to projector 30 includes information used for control of drive unit 33, and includes information for moving projection position P1 on which an image is projected onto real space A1.

In the present exemplary embodiment, drive unit 33 can perform two types of operations, which are: a "panning operation" of rotating about a vertical axis passing through the center point of the surface of mirror unit 32; and a "tilt operation" of rotating about a horizontal axis passing through the center point of the surface of mirror unit 32. According to the panning operation, an orientation of a normal line at the center point of the surface of mirror unit 32 changes along a horizontal direction (referred to as a panning direction), and an azimuth angle of mirror unit 32 changes. According to the tilt operation, the orientation of the normal line at the center point of the surface of mirror unit 32 changes along the vertical direction (also referred to as a tilt direction), and an elevation and depression angle of mirror unit 32 changes. In the present exemplary embodiment, drive unit 33 can freely change the orientation of mirror unit 32 about the center point of the surface of mirror unit 32, by combining the panning operation and the tilt operation. Accordingly, projection position P1 (that is, the image is projected) illuminated with the light reflected by mirror unit 32 can be moved in vertical and horizontal two-dimensional directions on projection surface A11 including a wall surface, for example.

(3.3) Control System

Next, a more detailed configuration of control system 10 including installation information acquisition system 15 according to the present exemplary embodiment will be described.

As illustrated in FIG. 2, control system 10 includes first image generation unit 11, second image generation unit 12, projection controller 13, adjustment unit 14, installation information acquisition system 15, correction processor 16, generation unit 18, control information generation unit 19, input unit 20, output unit 21, communicator 22, and data storage 23. Installation information acquisition system 15 includes first acquisition unit 151, second acquisition unit 152, third acquisition unit 153, and projection processor 154.

In the present exemplary embodiment, as described above, control system 10 includes, as main configurations, the computer system having one or more processors and one or more memories. Specifically, in control system 10, functions other than communicator 22 and data storage 23 are embodied by one or more processors executing programs.

First image generation unit 11 generates first image Im1 in which first object Ob5 is displayed at second position P6 (see FIG. 19) in virtual space A2 corresponding to first position P5 (see FIG. 20) in real space A1.

Second image generation unit 12 renders first image Im1 to second image Im2.

Projection controller 13 causes projector 30 to project second object Ob6 corresponding to first object Ob5 based on second image Im2.

Second image generation unit 12 renders first adjustment image Im21 (see FIG. 19) in which first object Ob5 is positioned in the first direction (for example, the right direction) with respect to image center CT1 from first image Im1 to second image Im2. In addition, second image generation unit 12 renders second adjustment image Im22 (see FIG. 21) in which first object Ob5 is positioned in the second direction (for example, the left direction) opposite to the first direction with respect to image center CT1 from first image Im1 to second image Im2.

Projection controller 13 performs first projection processing and second projection processing. In the first projection processing, projector 30 projects second object Ob6 (see FIG. 20) onto first projection position PT1 in real space A1 based on first adjustment image Im21. In the second projection processing, projector 30 projects second object Ob6 (see FIG. 22) onto second projection position PT2 in real space A1 based on second adjustment image Im22.

Adjustment unit 14 adjusts the projection size of second object Ob6 in real space A1 to reduce the positional deviation between first projection position PT1 and second projection position PT2.

In the following exemplary embodiment, for example, input device 50 that receives an adjustment instruction inputted by the user is connected to control system 10, and adjustment unit 14 performs the adjustment step according to the adjustment instruction received by input device 50. Note that adjustment unit 14 may cause projector 30 to execute zoom adjustment by outputting a control instruction for executing zoom adjustment to projector 30 based on the adjustment instruction received by input device 50. In addition, adjustment unit 14 may cause the user to manually perform zoom adjustment of projector 30, for example, by displaying adjustment contents of zoom adjustment on display 40 based on the adjustment instruction received by input device 50. In addition, control system 10 may be configured to execute some or all of the steps of the image adjustment method or may be configured to automatically execute some or all of the steps of the image adjustment method based on an operation instruction of the user received by input device 50.

As described above, first acquisition unit 151 acquires the positional information regarding the positions of three first adjustment points AP1 set in virtual space A2. In the present exemplary embodiment, first acquisition unit 151 acquires the positional information from input unit 20.

As described above, projection processor 154 causes projector 30 to project the index image onto real space A1.

As described above, second acquisition unit 152 acquires the angle information regarding the angle of the projection direction of projector 30 with respect to the reference direction in a state where the position of the index image matches three second adjustment points AP2 in real space A1. Three second adjustment points AP2 in real space A1 correspond to three first adjustment points AP1 in virtual space A2. For example, in a case where the installation state of projector 30 is deviated from the reference state, in a case where projector 30 projects the index image onto second adjustment points AP2, there is a possibility that the position of the actually projected index image is deviated from the positions of second adjustment points AP2. Here, in a case where the user of image projection system 100 directly moves mirror unit 32 of projector 30 by hand or moves mirror unit 32 via input device 50 to display the index image at the positions of second adjustment points AP2, the projection direction of projector 30 is moved by an angle necessary for causing the index image to match the positions of second adjustment points AP2. Drive unit 33 of projector 30 can detect an angle of the projection direction of projector 30 with respect to the reference direction by, for example, a sensor or the like provided in an actuator such as a motor, and outputs angle information regarding the angle. Here, since a relationship between a control amount and an angle in the projection direction (pan angle and tilt angle) is known in advance, second acquisition unit 152 acquires the angle information from the control amount. Note that second acquisition unit 152 may acquire the angle information regarding the angle of the projection direction of projector 30 with respect to the reference direction in a state where the position of the index image matches second adjustment points AP2 by communicating with projector 30.

As described above, third acquisition unit 153 acquires the installation information of projector 30 based on the positional information regarding the positions of three first adjustment points AP1 in virtual space A2 and the angle information in a case where the index image is projected onto three second adjustment points AP2. Each of three second adjustment points AP2 is set at a position corresponding to each of three first adjustment points AP1 in real space A1. Accordingly, third acquisition unit 153 can acquire the installation information regarding the installation position and the installation direction of projector 30 in real space A1 (that is, the installation information regarding the installation state) based on the positional information and the angle information of second adjustment points AP2 obtained from the positional information of first adjustment points AP1.

Correction processor 16 performs correction processing of correcting a projection direction in which an image is projected by projector 30 based on the angle information acquired by second acquisition unit 152. For example, correction processor 16 projects the image in a desired direction by correcting the projection direction (pan angle and tilt angle) in which the image is projected by projector 30 based on the angle information regarding the projection direction in a case where the image is projected onto second adjustment points AP2 in real space A1. Note that, in control system 10 of the present exemplary embodiment, it is not essential for correction processor 16 to perform correction processing of correcting the projection direction. The correction processing performed by correction processor 16 will be described in "(5.4) Fourth variation".

As described above, generation unit 18 executes generation processing of generating image content D1. In the generation processing, second image Im2 (image content D1) is generated by rendering predetermined rendering region Ra1 from first image Im1 in which first object Ob1 is displayed (arranged) at display position P3 in virtual space A2. Specifically, generation unit 18 generates virtual space A2 imitating real space A1, and generates image content D1 (second image Im2) as an image obtained by capturing display position P3 from virtual camera V30 (see FIGS. 1 and 3C) installed at virtual installation position P2 in a state where first object Ob1 is virtually displayed at display position P3 in virtual space A2. That is, rendering region Ra1 when second image Im2 is rendered coincides with a region in which the angle of view in which virtual camera V30 captures second image Im2 is expected. Note that the virtual display of first object Ob1 at display position P3 in virtual space A2 is executed by generation unit 18.

Control information generation unit 19 executes control information generation processing of generating control information D2. In the control information generation processing, control information D2 of projector 30 for movement of projection position P1 in real space A1 is generated in synchronization with movement of display position P3. Control information D2 generated by control information generation unit 19 is outputted from output unit 21.

In the present exemplary embodiment, as an example, generation unit 18 virtually installs virtual camera V30 (see FIG. 3C) at virtual installation position P2 in virtual space A2. That is, the installation information acquisition method and the image adjustment method of the present exemplary embodiment further include arrangement processing of arranging virtual camera V30 at virtual installation position P2 on a display screen representing virtual space A2. The "virtual camera" in the present disclosure is a concept for specifying rendering region Ra1, is a virtual device imitating a function of a camera, and is merely defined to be being virtually present in virtual space A2. The "virtual camera" is not present in the actual space (real space A1), and is not associated with an entity. In the present exemplary embodiment, virtual camera V30 imitates a function of a video camera capable of capturing a full-color moving picture.

In the present exemplary embodiment, virtual installation position P2 represents a position where virtual camera V30 is installed in virtual space A2, and is a "point" having no size, similarly to installation position P4. In other words, in virtual space A2, virtual installation position P2 is a position corresponding to installation position P4 in real space A1. Here, virtual installation position P2 is a position of one point determined for virtual camera V30, and is a position of a center point of virtual mirror unit V32 to be described later, as an example. That is, virtual camera V30 is virtually installed in virtual space A2 to be positioned at virtual installation position P2 as the center point of virtual mirror unit V32.

Similarly to a general camera, virtual camera V30 has a function of capturing an image of a subject that is present in a field of view of virtual camera V30, and outputting a picture appearing in the field of view as an image (image signal). Thus, in a state where first object Ob1 is virtually displayed at display position P3 in virtual space A2 as illustrated in FIG. 3C, when display position P3 is captured by virtual camera V30, second image Im2 obtained by rendering predetermined rendering region Ra1 with virtual installation position P2 as a viewpoint is outputted from virtual camera V30. That is, second image Im2 outputted at this time is an image including first object Ob1, and rendering region Ra1 coincides with a region in which the angle of view of virtual camera V30 is expected. Accordingly, after such virtual camera V30 is defined, generation unit 18 generates image content D1 by setting second image Im2 captured by virtual camera V30 as image content D1. In other words, generation unit 18 generates, as second image Im2, an image obtained by rendering first image Im1 displayed (arranged) at display position P3 as the virtual image in predetermined rendering region Ra1 with virtual installation position P2 as a viewpoint.

Input unit 20 receives inputs of various kinds of information and signals from outside of control system 10. Input unit 20 receives at least an input of an operation signal from input device 50. As a result, control system 10 can indirectly receive, by input device 50, the operation of the user (including voice operation and the like) in the installation information acquisition method and the image adjustment method. Input unit 20 may receive inputs of information and signals from outside via communicator 22.

Output unit 21 outputs at least image content D1 generated by generation unit 18. Output unit 21 also outputs control information D2 generated by control information generation unit 19. Further, output unit 21 outputs, for example, a video signal for displaying a screen for executing the installation information acquisition method and the image adjustment method on display 40. Here, an aspect of the output in output unit 21 includes, for example, display, communication (transmission), sound, printing (print-out), recording (writing) on a non-transitory recording medium, and the like. In the present exemplary embodiment, as an example, at least for image content D1 and control information D2, output unit 21 performs output by recording (writing) to data storage 23 and output by communication (transmission) from communicator 22 to projector 30.

Communicator 22 has a function of communicating with projector 30. In the present exemplary embodiment, communicator 22 is wire-connected to projector 30 via video cable 101, control cable 102, and communication cable 103.

Data storage 23 stores image content D1, control information D2, and the like. In addition, data storage 23 also stores the positional information of first adjustment points AP1 acquired by first acquisition unit 151, the angle information acquired by second acquisition unit 152, and the installation information acquired by third acquisition unit 153. Further, data storage 23 stores information and the like necessary for calculation in first image generation unit 11, second image generation unit 12, projection controller 13, first acquisition unit 151, second acquisition unit 152, third acquisition unit 153, generation unit 18, control information generation unit 19, and the like. Data storage 23 includes a rewritable nonvolatile memory such as an electrically erasable programmable read-only memory (EEPROM).

An operation of each unit of control system 10 will be described in detail in the section of "(4.1) Generation mode".

Meanwhile, control system 10 has a function of generating image content D1 based on second image Im2, a function of acquiring the installation information, a function as a video-reproducing device that reproduces image content D1 and outputs (transmits) a video signal, and a function of adjusting the projection size of the second object projected in real space A1. However, it is assumed that control system 10 does not simultaneously perform the generation of image content D1, the acquisition of the installation information, the reproduction of image content D1 (the output of the video signal), and the adjustment of the projection size of the second object, but performs the generation, the reproduction, and the adjustment m in different situations.

Thus, control system 10 has, as operation modes, at least four modes of a generation mode, an installation information acquisition mode, an adjustment mode, and a projection mode. The generation mode is an operation mode for generating image content D1. During the operation in the generation mode, control system 10 generates image content D1, and stores generated image content D1 into data storage 23. The installation information acquisition mode is an operation mode for acquiring the installation information regarding the installation state of projector 30. During the operation in the installation information acquisition mode, installation information acquisition system 15 causes projector 30 to project the index image onto real space A1. Installation information acquisition system 15 acquires the installation information of projector 30 based on the angle information when the index image is adjusted to the positions of second adjustment points AP2 and the positional information of first adjustment points AP1 (that is, second adjustment points AP2). The adjustment mode is an operation mode for performing image adjustment of decreasing a difference between the size of rendering region Ra1 of second image Im2 in virtual space A2 (the size converted into the scale of real space A1) and the image size of third image Im3 in real space A1. The reproduction mode is an operation mode for projecting image content D1. During the operation in the reproduction mode, control system 10 reproduces image content D1 stored in data storage 23, and outputs (transmits) a video signal to projector 30. Switching between the operation modes (the generation mode, the installation information acquisition mode, the adjustment mode, and the projection mode) may be manually performed by an operation of the user on input device 50, or may be automatically performed, for example.

(4) Description of Operation
(4.1) Generation Mode

Hereinafter, an operation of control system 10 according to the present exemplary embodiment in the generation mode will be described with reference to FIGS. 3A to 4. FIGS. 3A to 3C are explanatory diagrams visualizing virtual space A2 created by control system 10 to generate image content D1. FIG. 4 is an explanatory diagram conceptually illustrating a flow of a processing of generating image content D1 by virtual camera V30 in virtual space A2, and projecting generated image content D1 by projector 30 in real space A1.

In generating image content D1, generation unit 18 first forms virtual space A2 corresponding to real space A1 as illustrated in FIG. 3A. For example, generation unit 18 forms virtual space A2 based on space information for specifying a layout of structures constituting a space, such as a wall, a floor, and a ceiling, in real space A1 and articles (for example, timepiece 200, home electric appliance such as a television, a decorative article such as a painting, and the like) arranged in real space A1. This space information may be stored in advance in data storage 23, for example, or may be acquired from an external server device or the like. Virtual space A2 is a virtual space that does not actually exist, and is a virtual space including data that can be processed by one or more processors and to be reproduced by the computer system. In virtual space A2 formed in this manner, for example, surfaces of structures such as a wall, a floor, and a ceiling and articles arranged in real space A1 are to be virtual projection surface A21 corresponding to projection surface A11 in real space A1.

Note that, in virtual space A2, a reduction scale (scale) having the same length (dimension) as real space A1 is not required. Therefore, for example, in a case of a wall, it suffices that an aspect ratio is the same between real space A1 and virtual space A2, and a height dimension may be different between real space A1 and virtual space A2.

Figure 3B:
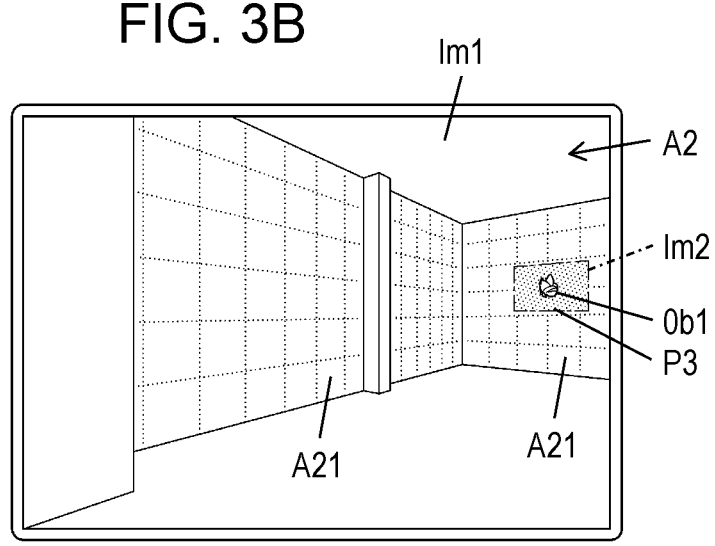
FIG. 3B is an explanatory diagram of a state where a first object is displayed in the virtual space in the generation mode of the control system of the image projection system.

Next, control system 10 specifies display position P3 as illustrated in FIG. 3B based on display positional information regarding display position P3 corresponding to projection position P1 in real space A1. The display positional information is information used to specify display position P3 in virtual space A2, and is information for specifying a position in virtual projection surface A21 including the surfaces of the structures such as a wall, a floor, and a ceiling in virtual space A2. The display positional information may be stored in advance in data storage 23. For example, and input unit 20 may receive an input by the user, or may be acquired from an external server device or the like.

Subsequently, generation unit 18 acquires information regarding first object Ob1 from, for example, data storage 23 or the like in order to display first object Ob1 as illustrated in FIG. 3B. Specifically, generation unit 18 acquires data for displaying first object Ob1 on virtual projection surface A21 on software of three-dimensional computer graphics from data storage 23 or the like. Generation unit 18 arranges first object Ob1 at display position P3 in virtual space A2. First object Ob1 is arranged at display position P3 set on virtual projection surface A21 in virtual space A2, and thus, first object Ob1 is virtually displayed.

Subsequently, generation unit 18 arranges virtual camera V30 as illustrated in FIG. 3C at virtual installation position P2 corresponding to installation position P4 based on installation position P4 (design value) where projector 30 is installed in real space A1.

Here, virtual camera V30 includes a virtual device imitating projector 30. That is, in accordance with movable projector 30, virtual camera V30 includes a movable camera system in which a field of view is not fixed but the field of view in virtual space A2 is variable. That is, by moving virtual mirror unit V32 positioned on an optical path of the incident light, virtual camera V30 changes the incident direction of the light to move the field of view. That is, as illustrated in FIG. 3C, virtual camera V30 includes virtual image-capturing unit V31 and virtual mirror unit V32. Virtual image-capturing unit V31 captures an image of a subject that is present in the field of view, and outputs a picture appearing in the field of view as an image (image signal). Virtual mirror unit V32 reflects light arriving from surroundings, toward virtual image-capturing unit V31. Virtual camera V30 moves the field of view of virtual camera V30 by driving virtual mirror unit V32 so as to change an orientation of the virtual mirror unit V32. In short, in the present exemplary embodiment, by causing virtual mirror unit V32 to swing, virtual camera V30 causes virtual mirror unit V32 to change an incoming direction of light incident on virtual image-capturing unit V31, to change the incident direction of the light on virtual camera V30.

Furthermore, virtual camera V30 imitates projector 30 also for the incident direction of light of virtual image-capturing unit V31, the shape of virtual mirror unit V32, the operation of virtual mirror unit V32, and the like. For example, an optical axis of the light incident on virtual image-capturing unit V31 is along a vertical direction and intersects with a center or a rotation center of a surface (reflecting surface) of virtual mirror unit V32. In addition, virtual mirror unit V32 can freely change the orientation about a center point of the surface of virtual mirror unit V32, for example, by combining the panning operation and the tilt operation. In FIG. 3C, a moving (rotating) direction of virtual mirror unit V32 during the panning operation is indicated by arrow M1, while a moving (rotation) direction of virtual mirror unit V32 during the tilt operation is indicated by arrow M2. In addition, a viewing angle (angle of view) of virtual camera V30 is the same as the angle of view of projector 30. At this time, since virtual camera V30 is installed at virtual installation position P2 corresponding to the installation position of projector 30, it is easy to strictly reproduce real space A1 based on the image captured by virtual camera V30.

As illustrated in FIG. 4, in a state where first object Ob1 is virtually displayed at display position P3 in virtual space A2, generation unit 18 captures an image of display position P3 by virtual camera V30 in virtual space A2. That is, in virtual space A2, an image when first object Ob1 displayed at display position P3 is captured by virtual camera V30 at virtual installation position P2 is generated by virtual camera V30. This allows control system 10 to generate, as image content D1, an image including first object Ob1 viewed from virtual installation position P2 as illustrated in FIG. 4, by virtual camera V30 defined by generation unit 18.

However, virtual camera V30 merely virtually captures an image of a subject that is present in the field of view of virtual camera V30, and outputs a picture appearing in the field of view as an image (image signal). Thus, strictly speaking, the image outputted from virtual camera V30 is not an actually captured image but a rendered image generated (rendered) by arithmetic processing. In any case, the image outputted from virtual camera V30 at this time is an image including first object Ob1 viewed from virtual installation position P2 when first object Ob1 is displayed at display position P3 in virtual space A2. Accordingly, generation unit 18 generates image content D1 by setting the image virtually captured by virtual camera V30 as image content D1.

Meanwhile, FIGS. 8 to 12 illustrate an example of a screen on which display 40 displays, as reference image Im2r, second image Im2 rendered from first image Im1 and inputted to projector 30 as image content D1 in a case where generation unit 18 generates first image Im1 including first object Ob11. The user can confirm image content D1 inputted to projector 30 by visually recognizing reference image Im2r of display 40.

Figure 8:
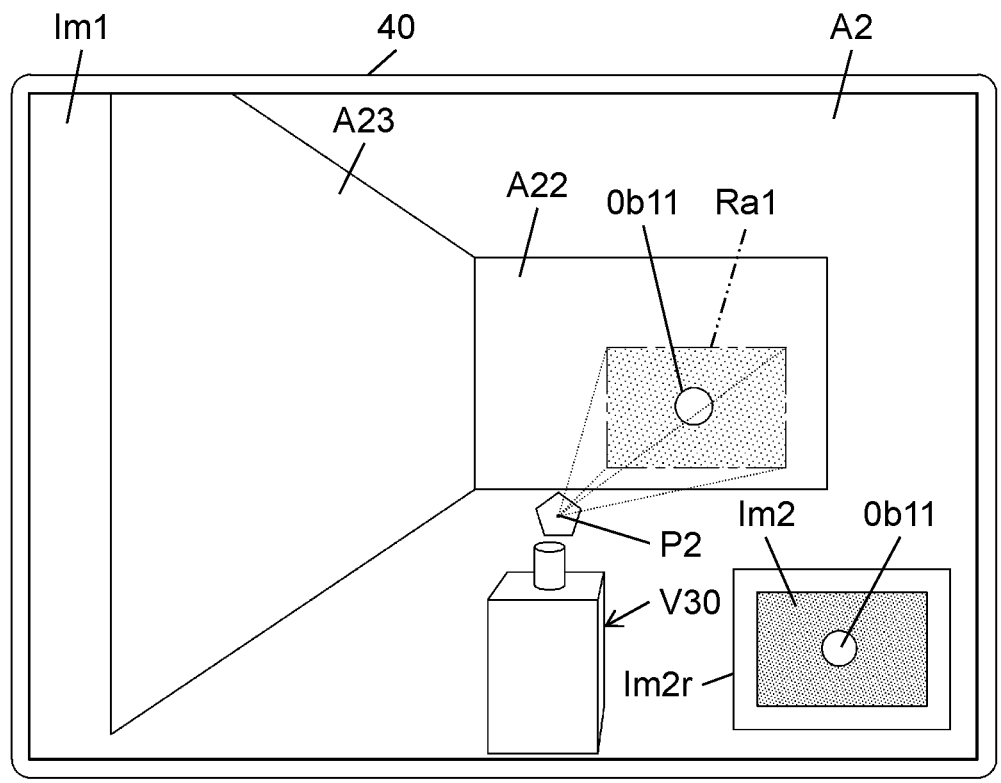
FIG. 8 is an explanatory diagram for describing a scene in which the image projection system renders the second image from the first image displayed in the virtual space.

FIG. 8 illustrates a case where circular first object Ob11 is displayed on virtual projection surface A22 in front of virtual camera V30 in virtual space A2. In this case, since an imaging range of virtual camera V30 is rectangular, first object Ob11 included in rendered second image Im2 is also circular.

Figure 9:
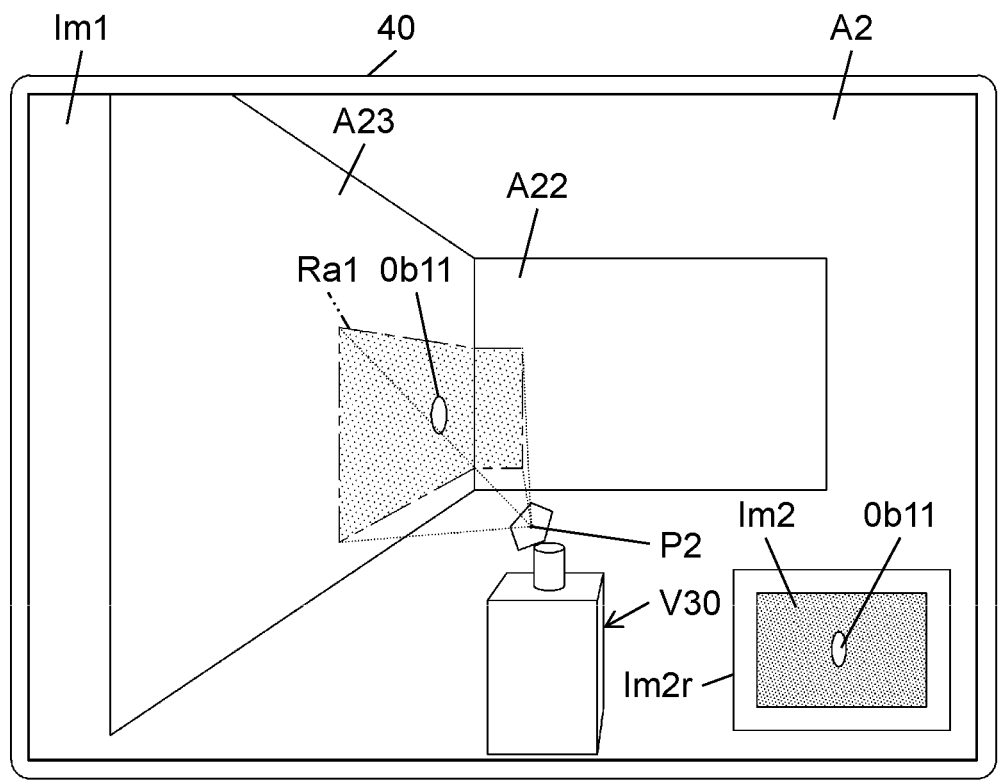
FIG. 9 is an explanatory diagram for describing a scene in which the image projection system renders the second image from the first image displayed in the virtual space.

FIG. 9 illustrates a case where, in virtual space A2, circular first object Ob11 is displayed on virtual projection surface A22 intersecting with virtual projection surface A23 in front of virtual camera V30, and rendering region Ra1 is set across virtual projection surface A22 and virtual projection surface A23. First object Ob11 appears to be circular when viewed from the front of virtual projection surface A23, but since first object Ob11 appears to be distorted in an elliptical shape from virtual camera V30, first object Ob11 included in rendered second image Im2 also has a shape distorted in an elliptical shape.

Figure 10:
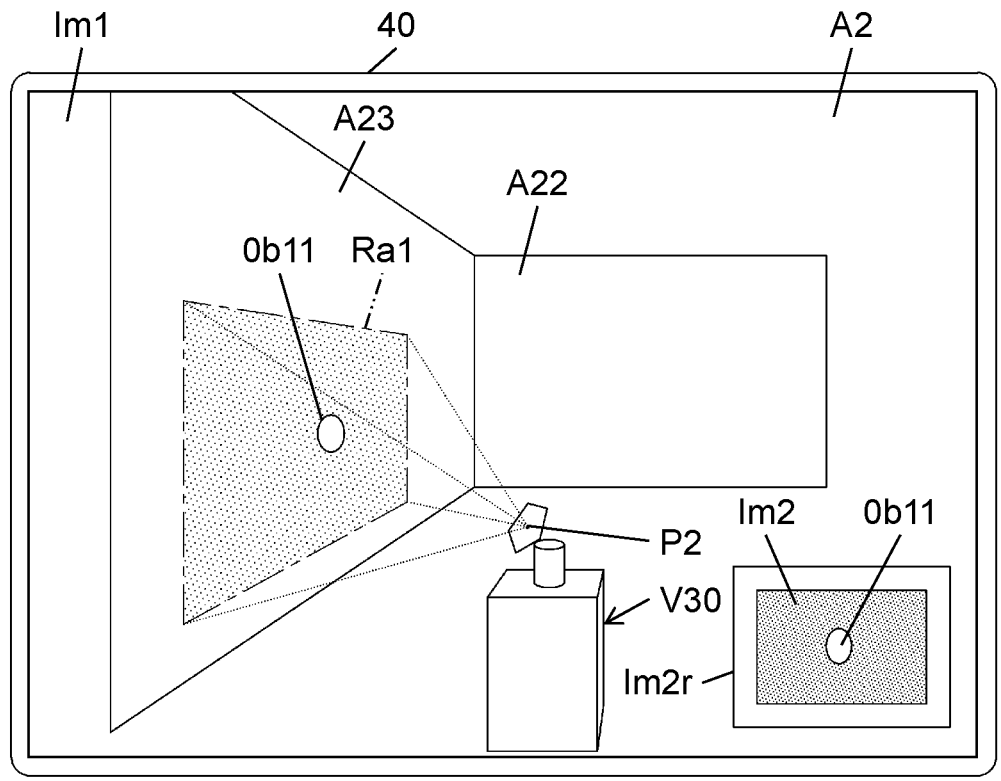
FIG. 10 is an explanatory diagram for describing a scene in which the image projection system renders the second image from the first image displayed in the virtual space.

In FIG. 10, circular first object Ob11 is displayed on virtual projection surface A23 as in FIG. 9, but first object Ob11 is displayed at a position closer to virtual camera V30 than in FIG. 9. In this case, since first object Ob11 included in rendered second image Im2 is displayed to be larger than in the example of FIG. 9, and is close to the position in for when viewed from virtual camera V30, the shape of first object Ob11 is close to a circle.

Figure 11:
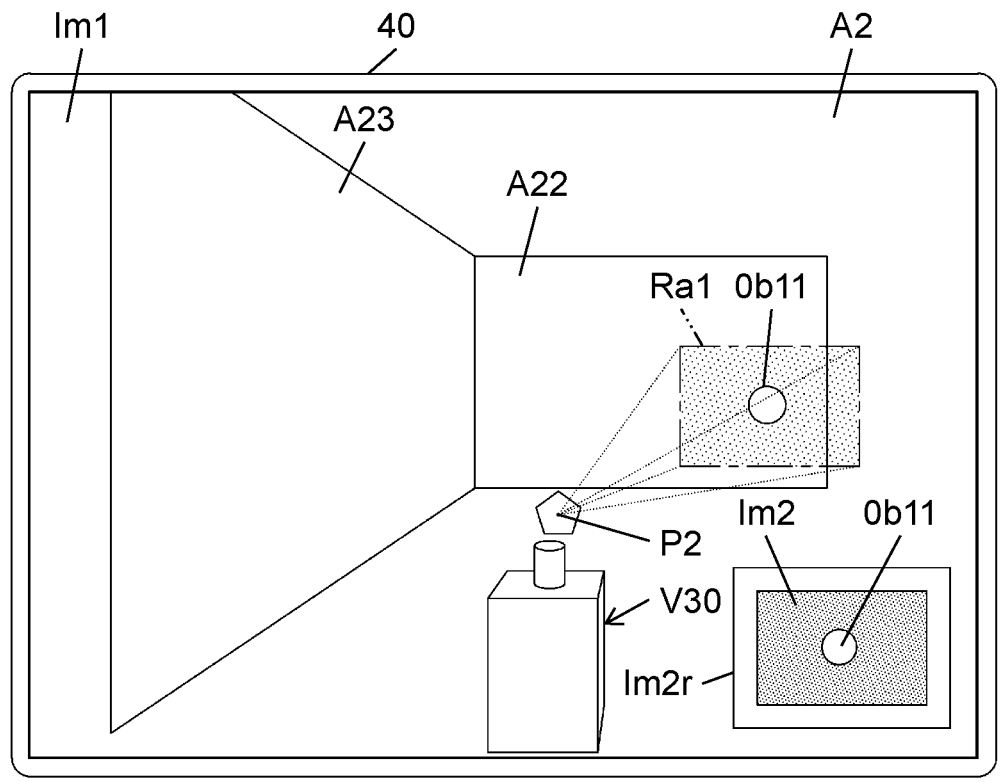
FIG. 11 is an explanatory diagram for describing a scene in which the image projection system renders the second image from the first image displayed in the virtual space.

In FIG. 11, in virtual space A2, first object Ob11 is displayed on virtual projection surface A22 in front of virtual camera V30, but since first object Ob11 is displayed on an end of virtual projection surface A22, rendering region Ra1 includes a portion where nothing is displayed. Note that, in second image Im2, since a portion other than first object Ob11 is displayed in black, circular first object Ob11 is correctly displayed in rendered second image Im2.

As described above, since second image Im2 is formed as an image rendered in predetermined rendering region Ra1 with virtual installation position P2 of virtual camera V30 as a viewpoint, the second object corresponding to first object Ob11 is correctly displayed in real space A1 by projecting the second object based on second image Im2 in real space A1 by projector 30.

Figure 12:
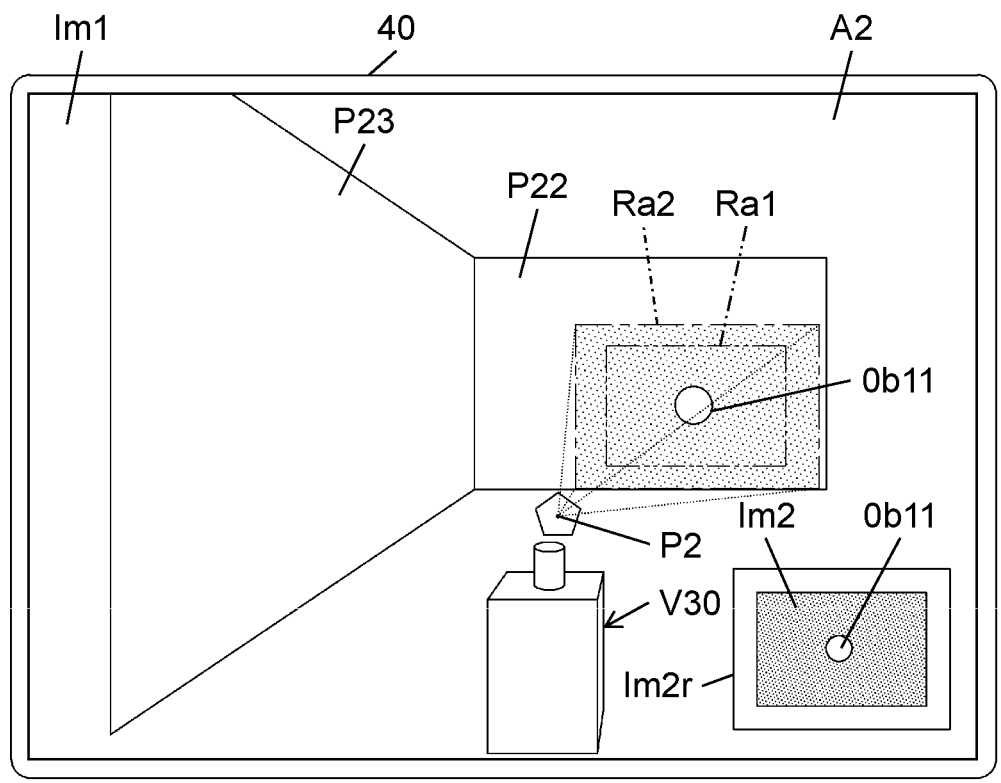
FIG. 12 is an explanatory diagram for describing a scene in which the image projection system renders the second image from the first image displayed in the virtual space.
Figure 13:
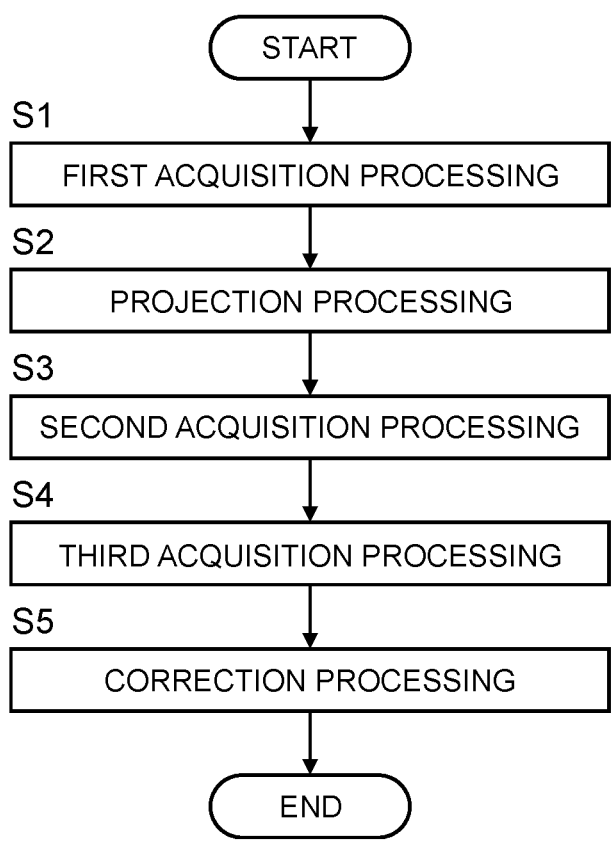
FIG. 13 is a flowchart illustrating an example of an installation information acquisition method by the installation information acquisition system of the image projection system.

Note that, in the adjustment step, in a case where the size of rendering region Ra1 when second image Im2 is rendered is adjusted, the projection size of second object Ob2 projected onto real space A1 can be adjusted based on second image Im2. For example, FIG. 12 illustrates a case where rendering region Ra1 when first object Ob11 displayed on virtual projection surface A22 in front of virtual camera V30 is rendered is set to be larger than in FIG. 9. In this case, in rendered second image Im2, since the size of first object Ob11 is smaller than in FIG. 9, the projection size of the second object corresponding to first object Ob11 can be decreased. Conversely, when rendering region Ra1 is set to be smaller than in FIG. 9, since the size of first object Ob11 is larger than in FIG. 9 in rendered second image Im2, the projection size of the second object corresponding to first object Ob11 can be increased.

In the present exemplary embodiment, image content D1 is the data of the (full-color) moving picture. Therefore, generation unit 18 continuously generates image content D1 by continuously capturing first object Ob1 with virtual camera V30 while the generation processing is continued. That is, virtual camera V30 in virtual space A2 captures first object Ob1 displayed at display position P3 to capture a moving picture, and thus, generation unit 18 generates image content D1 including the data of the moving picture. Thus, in a case where first object Ob1 has motion, that is, in a case where first object Ob1 is an animation or the like that deforms with the lapse of time, the motion of first object Ob1 is reflected in image content D1. As an example, in a case where first object Ob1 of "butterfly" has "motion" such as flapping as illustrated in FIG. 4, image content D1 is data of a moving picture in which "butterfly" flaps.

As illustrated in FIG. 4, image content D1 generated in this manner can be projected by projector 30 in real space A1 by being transmitted to projector 30. As illustrated in FIG. 4, in real space A1, third image Im3 projected at this time is displayed at projection position P1 corresponding to display position P3 in virtual space A2. Moreover, in a case where projector 30 projects image content D1 at projection position P1, second object Ob2 to be projected substantially coincide with first object Ob1 virtually displayed at display position P3. Accordingly, in real space A1, first object Ob1 virtually displayed in virtual space A2 is projected as third image Im3 as if virtual space A2 has been copied. Processing when image content D1 is actually projected by projector 30 will be described in detail in the section of "(4.4) Projection method".

Here, in the present exemplary embodiment, image content D1 is an image of first object Ob1 excluding a background of first object Ob1 in virtual space A2. That is, second image Im2 virtually captured by virtual camera V30 may include virtual projection surface A21 or the like as the background, but generation unit 18 extracts only first object Ob1 from second image Im2 captured by virtual camera V30 and generates image content D1. That is, in image content D1 illustrated in FIG. 4, a periphery of first object Ob1 is transparent (a state where image data is not present).

This causes image content D1 generated by generation unit 18 to be data of an image of only first object Ob1 excluding the background. Specifically, when first object Ob1 is displayed at display position P3 in virtual space A2, a portion that is inside display position P3 and other than first object Ob1, that is, a portion corresponding to the background is displayed in black in which a pixel value (luminance value) is 0. Since projector 30 does not illuminate a black image with light, as a result, the image of only first object Ob1 excluding the background is generated as image content D1.

Meanwhile, in the present exemplary embodiment, projector 30 that projects generated image content D1 is a movable projection system in which projection position P1 in real space A1 is variable as described above, and projection position P1 is movable in real space A1. Thus, display position P3 corresponding to projection position P1 can also move in virtual space A2 similarly to projection position P1. In other words, in a case where projection position P1 is moved by projector 30 that projects image content D1, display position P3 is moved at a time of generation of image content D1. In this case, first object Ob1 displayed at display position P3 also moves in virtual space A2. While following first object Ob1 with virtual camera V30, generation unit 18 continuously generates image content D1 by continuously capturing first object Ob1 with virtual camera V30 during the continuation of the generation processing.

Here, control system 10 executes, by control information generation unit 19, control information generation processing of generating control information D2. That is, in the control information generation processing, control information D2 of projector 30 for movement of projection position P1 in real space A1 is generated in synchronization with movement of display position P3. In other words, in the control information generation processing, control information D2 is generated in synchronization with movement of first object (object Ob1) in virtual space A2.

In the present exemplary embodiment, control system 10 generates, as control information D2, information to be used for control of virtual camera V30 when following moving first object Ob1 with virtual camera V30. Specifically, in the control information generation processing, the information used by generation unit 18 to cause virtual mirror unit V32 to swing is generated as control information D2. In short, a parameter to be used to control virtual mirror unit V32 of virtual camera V30 in virtual space A2 is coincident with control information D2 that is a parameter to be used to control mirror unit 32 of projector 30 in real space A1.

After the generation of control information D2, control system 10 also outputs control information D2 in addition to the output of image content D1. That is, control system 10 outputs image content D1 and control information D2 by recording (writing) the image content and the control information onto data storage 23 by output unit 21. This causes image content D1 generated in the generation processing to be recorded (saved) in data storage 23 as needed, together with control information D2 generated in the control information generation processing. After the output of image content D1 (and control information D2), for example, when input unit 20 receives an operation signal of an end operation from input device 50, control system 10 ends the operation in the generation mode.

(4.2) Installation Information Acquisition Mode

Next, an operation of installation information acquisition system 15 according to the present exemplary embodiment in the installation information acquisition mode, that is, the installation information acquisition method according to the present exemplary embodiment will be described with reference to FIGS. 13 to 17.

In image projection system 100, projector 30 projects image content D1 generated by control system 10 onto projection position P1 of real space A1. Thus, as a preparation, it is necessary to install projector 30 at installation position P4 assumed during the generation of the virtual image. Here, installation position P4 is a position corresponding to virtual installation position P2 in virtual space A2 in which virtual camera V30 is installed, and the user installs projector 30 at installation position P4. Note that the user installs projector 30 such that a reference direction (installation direction of projector 30) of a projection direction in which projector 30 projects an image faces a predetermined direction. As described above, projector 30 installed at installation position P4 is wire-connected to control system 10 via video cable 101, control cable 102, and communication cable 103.

Here, when the actual installation state of projector 30 in real space A1 is deviated from the installation state assumed during the generation of the virtual image, there is a possibility that second object Ob2 projected onto projection surface A11 by projector 30 is not correctly displayed. Thus, installation information acquisition system 15 acquires the installation information regarding the installation state of projector 30 installed in real space A1 by executing the installation information acquisition method. Control system 10 can more correctly project second object Ob2 onto projection surface A11, for example, by correcting the projection direction of projector 30 by using the installation information acquired by installation information acquisition system 15. Here, the installation information regarding the installation state of projector 30 includes at least one of the relative installation position of projector 30 with respect to projection position P1 in real space A1 and the installation direction of projector 30.

Figure 14:
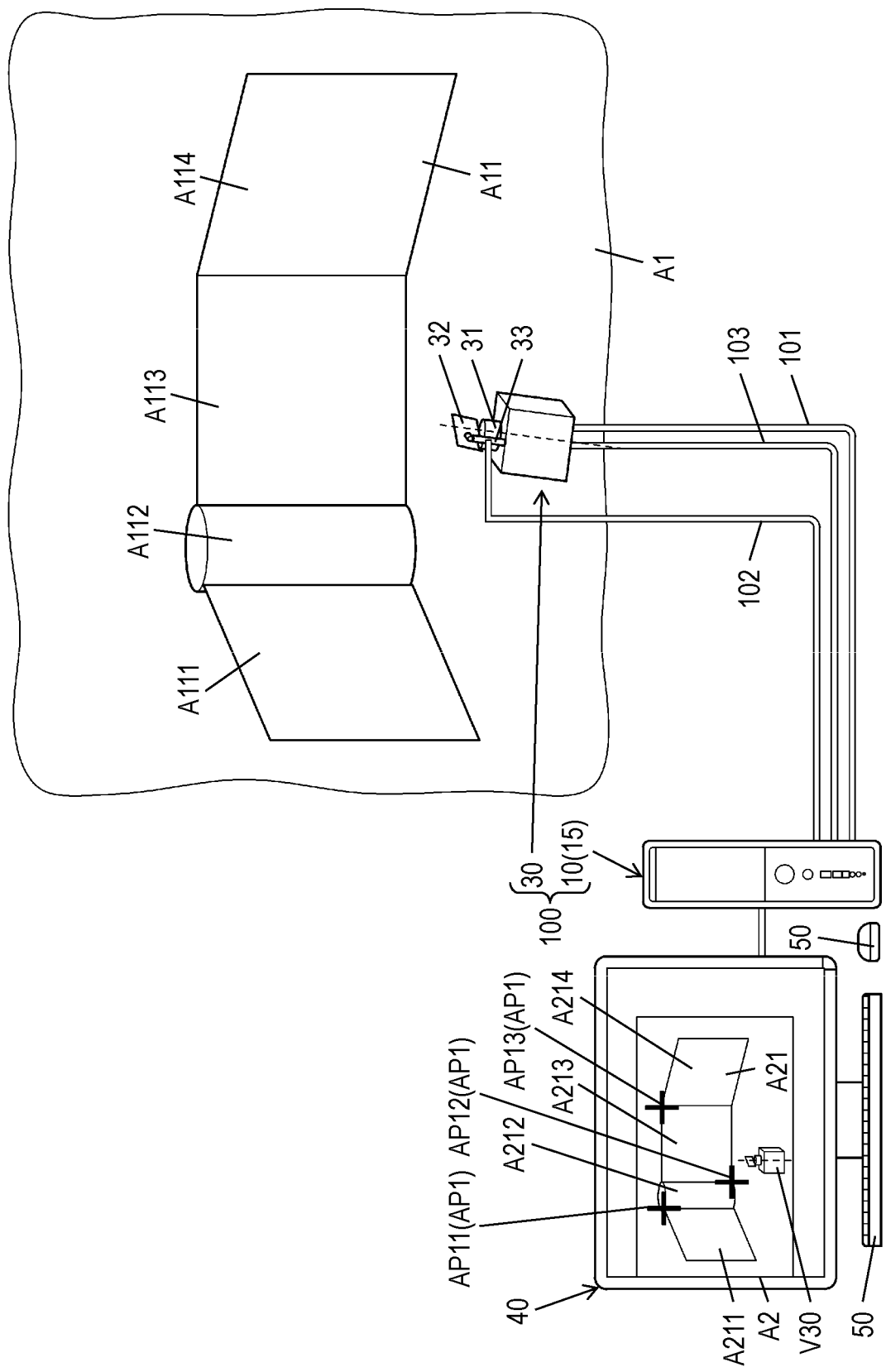
FIG. 14 is a schematic explanatory diagram for describing the installation information acquisition method by the installation information acquisition system of the image projection system.

When installation information acquisition system 15 starts the operation in the installation information acquisition mode, first acquisition unit 151 performs first acquisition processing of acquiring the positional information regarding the positions of three first adjustment points AP1 (see FIG. 14) in virtual space A2 (step S1). Here, installation information acquisition system 15 displays an input screen for the user to input first adjustment points AP1 on display 40 in the installation information acquisition mode. Virtual space A2 formed to correspond to real space A1 is displayed on the input screen. Here, when the user performs an operation of designating three first adjustment points AP1 by using input device 50, first acquisition unit 151 acquires the positional information regarding the positions of three first adjustment points AP1 in virtual space A2 based on the operation signal received by input unit 20 from input device 50. The positional information of three first adjustment points AP1 is acquired, for example, as coordinate information in the XYZ orthogonal coordinate system representing virtual space A2. Note that, in the following description, three first adjustment points AP1 are referred to as first adjustment points AP11, AP12, and AP13. In the example of FIG. 14, there are four discontinuous surfaces (virtual projection surfaces A211 to A214) discontinuous from each other in virtual space A2. Here, the fact that two surfaces are discontinuous may include a state where two adjacent surfaces are not parallel or a state where there is a step between two surfaces. In the illustrated example, first adjustment point AP11 is set at an upper end of a boundary between adjacent virtual projection surfaces A211 and A212. First adjustment point AP12 is set at a lower end of a boundary between adjacent virtual projection surfaces A212 and A213. First adjustment point AP13 is set at an upper end of a boundary between adjacent virtual projection surfaces A213 and A214.

When the positional information of three first adjustment points AP1 is acquired, projection processor 154 causes projector 30 to output image data of index image (for example, circular index) from communicator 22, and performs projection processing of causing projector 30 to project the index image (step S2). Note that the index image is not limited to the circular index, and a shape thereof can be appropriately changed.

Figure 15:
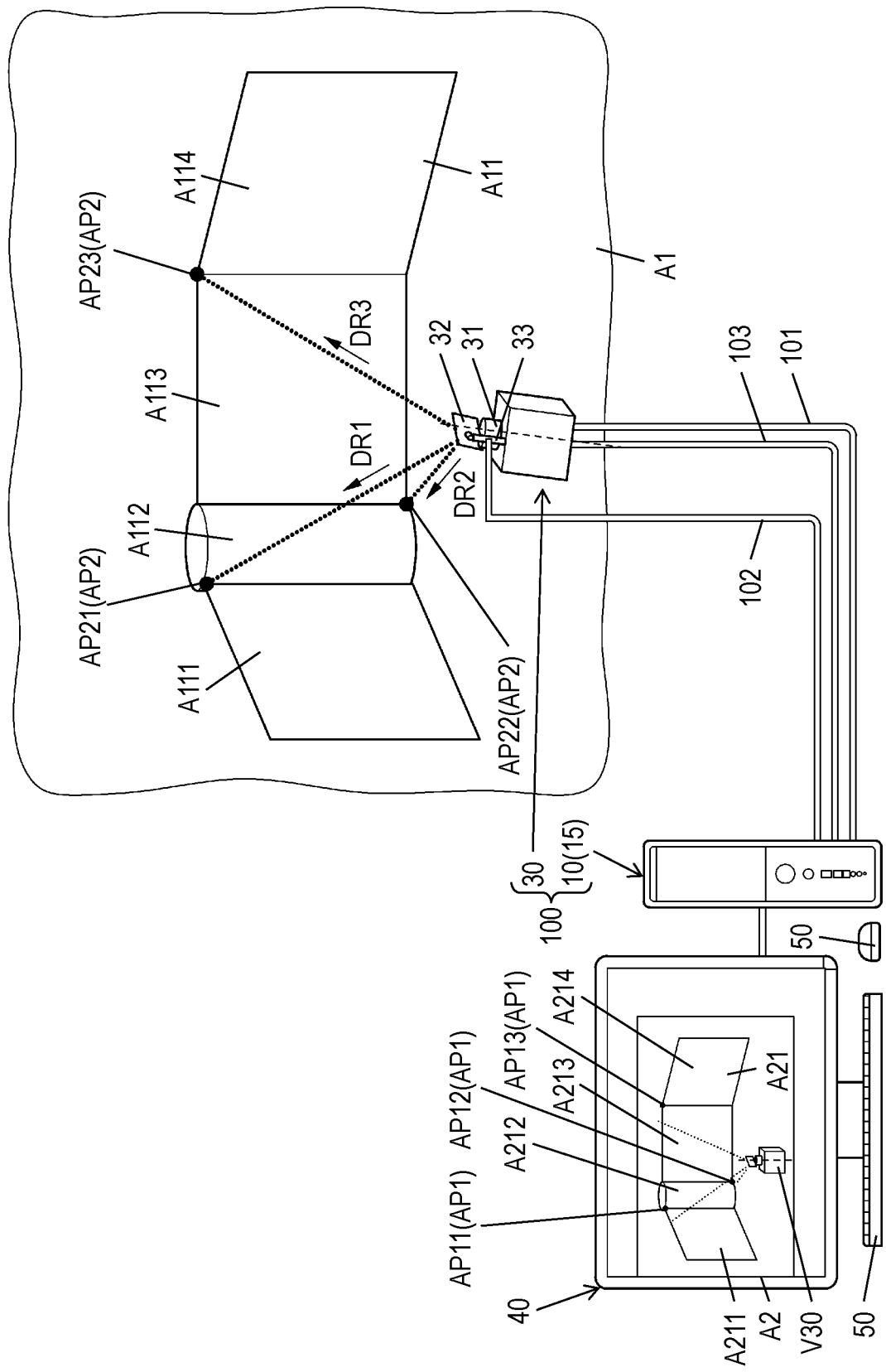
FIG. 15 is a schematic explanatory diagram for describing the installation information acquisition method by the installation information acquisition system of the image projection system.
Figure 16:
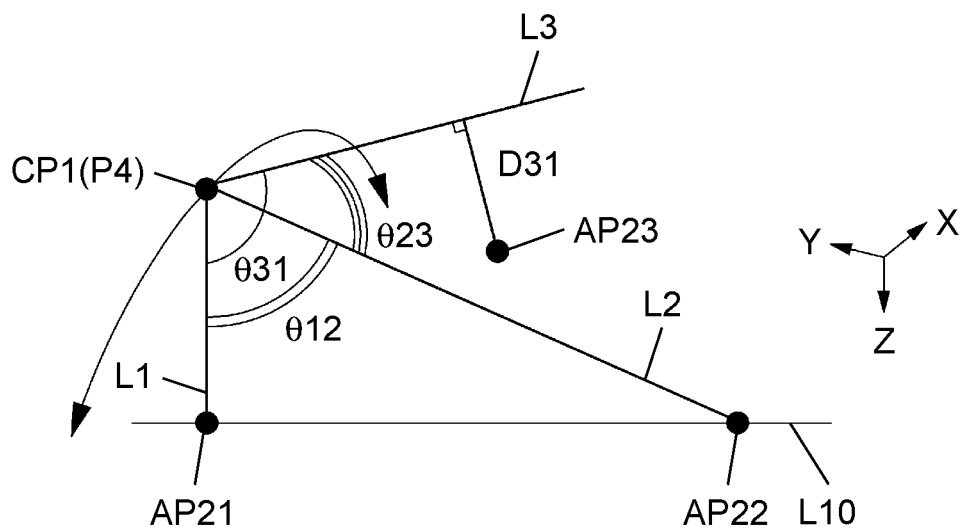
FIG. 16 is a schematic explanatory diagram for describing the installation information acquisition method by the installation information acquisition system of the image projection system.

Here, the user adjusts the orientation (pan and tilt) of mirror unit 32 of projector 30 to project the index image onto second adjustment points AP2 (AP21 to AP23) in the real space corresponding to first adjustment points AP1 (AP11 to AP13) (see FIG. 15). First, the user adjusts the orientation of mirror unit 32 to project the index image onto second adjustment point AP21. In this state, when the user inputs that the index image is adjusted to second adjustment point AP11 corresponding to first adjustment point AP21 by using input device 50, second acquisition unit 152 acquires the angle information with respect to the reference direction of the projection direction from projector 30 via communicator 22. For example, second acquisition unit 152 acquires, as the angle information, pan angle PA1 and tilt angle TL1 with respect to the reference direction of the projection direction in a state where the index image is projected onto second adjustment point AP21.

Subsequently, when the user inputs that the index image is adjusted to second adjustment point AP22 by using input device 50 in a state where the orientation of mirror unit 32 is adjusted and the index image is projected onto second adjustment point AP22, second acquisition unit 152 acquires the angle information in this state. Second acquisition unit 152 acquires, as the angle information, pan angle PA2 and tilt angle TL2 with respect to the reference direction of the projection direction in a state where the index image is projected onto second adjustment point AP22.

Thereafter, when the user inputs that the index image is adjusted to second adjustment point AP23 by using input device 50 in a state where the orientation of mirror unit 32 is adjusted and the index image is projected onto second adjustment point AP23, second acquisition unit 152 acquires the angle information in this state. Second acquisition unit 152 acquires, as the angle information, pan angle PA3 and tilt angle TL3 with respect to the reference direction of the projection direction in a state where the index image is projected onto second adjustment point AP23.

As described above, second acquisition unit 152 acquires the angle information in a state where the position of the index image matches three or more (three in the present exemplary embodiment) second adjustment points AP2 in real space A1 (step S3). When the second acquisition processing in step S3 is ended, third acquisition unit 153 performs third acquisition processing of acquiring the installation information regarding the installation state of projector 30 (step S4).

In the third acquisition processing, the installation information of projector 30 is acquired based on the positional information regarding the positions of three first adjustment points AP1 in virtual space A2 and the angle information in a case where the index image is projected onto three second adjustment points AP2.

For example, third acquisition unit 153 calculates angle θ12 formed by projection direction DR1 in a state where the index image is projected onto second adjustment point AP21 and projection direction DR2 in a state where the index image is projected onto second adjustment point AP22 based on the angle information obtained in the second acquisition processing. In addition, third acquisition unit 153 calculates angle θ23 formed by projection direction DR2 in a state where the index image is projected onto second adjustment point AP22 and projection direction DR3 in a state where the index image is projected onto second adjustment point AP23 based on the angle information obtained in the second acquisition processing. In addition, third acquisition unit 153 calculates angle θ31 formed by projection direction DR3 in a state where the index image is projected onto second adjustment point AP23 and projection direction DR1 in a state where the index image is projected onto second adjustment point AP21 based on the angle information obtained in the second acquisition processing.

When angles θ12, θ21, and θ31 are obtained, third acquisition unit 153 generates straight line L1 (see FIG. 16) o vector (a1, a2, a3) passing through second adjustment point AP21 in the XYZ orthogonal coordinate system. Vector (a1, a2, a3) is, for example, vector (0, 0, −1). Subsequently, third acquisition unit 153 generates straight line L2 passing through second adjustment point AP22 and having an intersection angle with straight line L1 of angle θ12. In addition, third acquisition unit 153 also generates straight line L3 passing through intersection point CP1 of straight lines L1 and L2, having intersection angle with straight line L1 of angle θ31, and having an intersection angle with straight line L2 of angle θ23. Here, although two straight lines in which the intersection angle with straight line L1 is angle θ31 and the intersection angle with straight line L2 is angle θ23 are obtained, third acquisition unit 153 generates, as straight line L3, a straight line that matches a positional relationship between three second adjustment points AP2. Here, intersection point CP1 of three straight lines L1, L2, and L3 corresponds to the installation position of projector 30.

Figure 17:
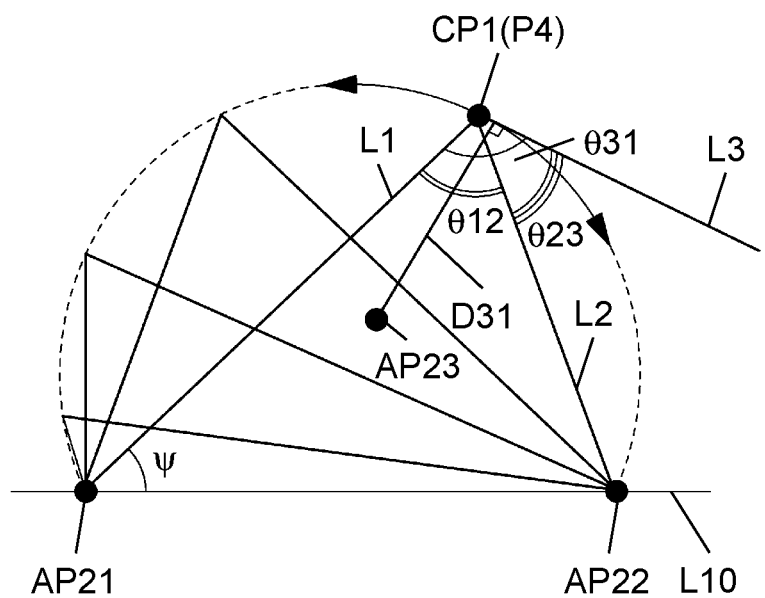
FIG. 17 is a schematic explanatory diagram for describing the installation information acquisition method by the installation information acquisition system of the image projection system.
Figure 18:
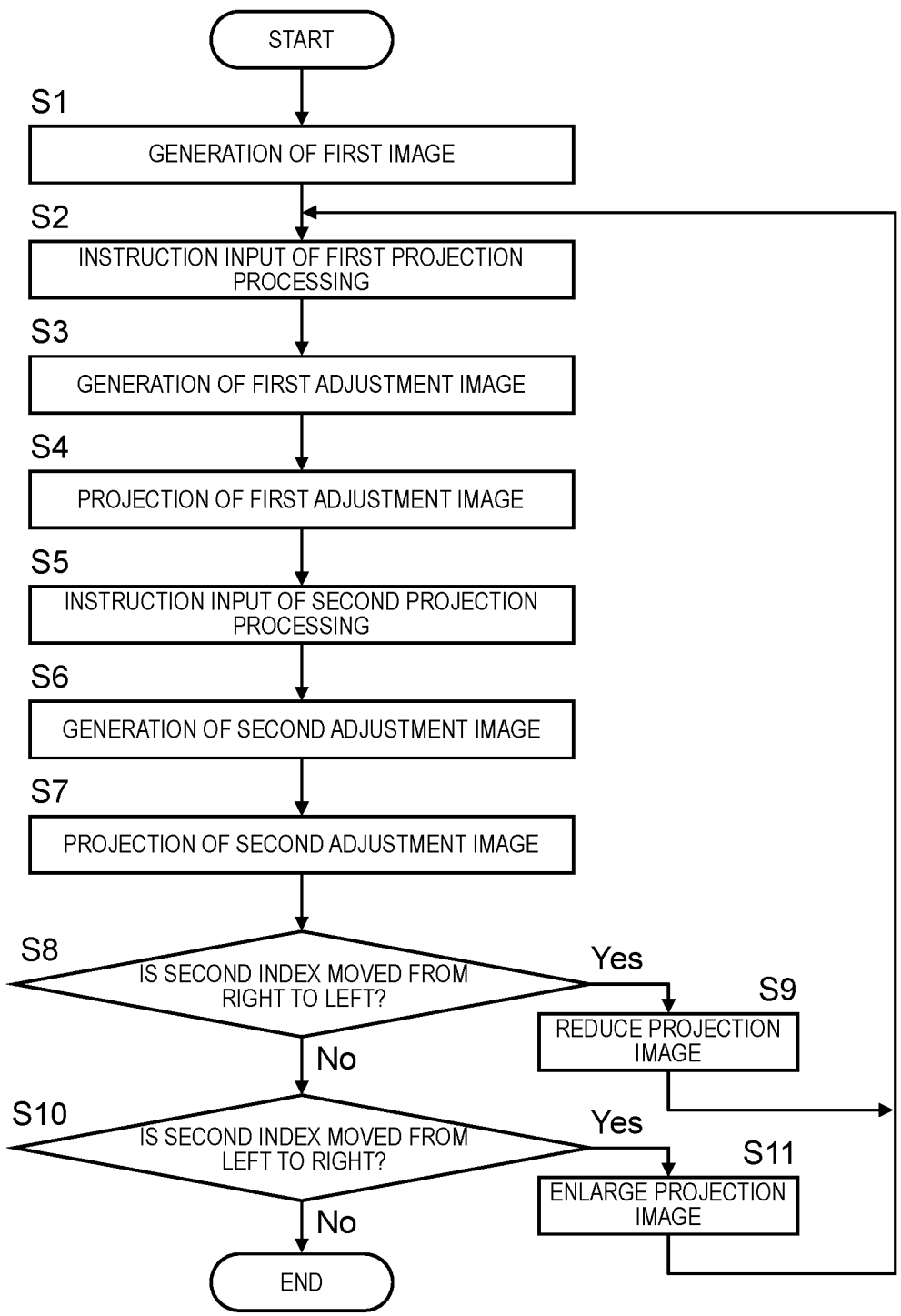
FIG. 18 is a flowchart for describing an image adjustment method by the image projection system.

Third acquisition unit 153 calculates distance D31 between straight line L3 and second adjustment point AP23 while maintaining a relationship among three straight lines L1, L2, and L3 and rotating intersection point CP1 by angle ΔΦ around straight line L10 connecting second adjustment points AP21 and AP22. Further, as illustrated in FIG. 17, while maintaining the relationship between three straight lines L1, L2, and L3, third acquisition unit 153 calculates distance D31 between straight line L3 and second adjustment point AP21 while rotating straight line L1 by angle ΔΨ around second adjustment point AP23 in a plane including two straight lines L1 and L2 and vector (a1, a2, a3). Third acquisition unit 153 calculates angle ΔΦ and angle ΔΨ when distance D31 is minimized.

After angle ΔΦ and angle ΔΨ when distance D31 is minimized are obtained, third acquisition unit 153 obtains coordinates of intersection point CP1, that is, installation position P4 of projector 30 based on position coordinates of three second adjustment points AP21, AP22, and AP23, angle ΔΦ, and angle ΔΨ. In addition, after the coordinates of the installation position of projector 30 are obtained, third acquisition unit 153 obtains the installation direction of projector 30 based on the projection directions for three second adjustment points AP21, AP22, and AP23. Third acquisition unit 153 arranges virtual camera V30 at virtual installation position P2 corresponding to installation position P4 in virtual space A2. Third acquisition unit 153 generates straight line L1 by setting the orientation of mirror unit 32 to pan angle PA1 and tilt angle TL1, and generates straight line L2 by setting the orientation of mirror unit 32 to pan angle PA2 and tilt angle TL2. Third acquisition unit 153 obtains the installation direction of projector 30 by rotating virtual camera V30 in an orientation in which straight line L1 passes through first adjustment point AP11 and straight line L2 passes through first adjustment point AP12. In this manner, third acquisition unit 153 can acquire the installation information regarding the installation state of projector 30, and stores the acquired installation information in data storage 23.

Here, in control system 10 of the present exemplary embodiment, in a case where there is an error between the actual installation state of projector 30 and the reference state, correction processor 16 performs correction processing of correcting the projection direction of the image by projector 30 (step S5). In the correction processing, based on the installation information acquired by third acquisition unit 153, a correction value for correcting the projection direction (pan angle and tilt angle) in which the image is projected by projector 30 is calculated and outputted to data storage 23. In a case where control system 10 projects the image by projector 30, the orientation of mirror unit 32 is controlled in consideration of the correction value calculated in the correction processing, and thus, the projection direction of the image can be corrected in consideration of the installation state of projector 30. Therefore, control system 10 can cause projector 30 to project second object Ob2 having a correct size, shape, and orientation.

(4.3) Adjustment Mode

Next, an operation of control system 10 that performs the image adjustment method in image projection system 100 in the adjustment mode will be described with reference to FIGS. 18 to 22. Note that, in FIGS. 19 to 22, for the sake of convenience in description, first object Ob5 displayed in first image Im1 and second object Ob6 projected in real space A1 are each a diamond object, but the shapes, sizes, and the like of first object Ob5 and second object Ob6 can be appropriately changed.

For example, when input device 50 receives a start operation of the adjustment mode by the user, control system 10 starts the operation of the adjustment mode.

First, first image generation unit 11 generates first image Im1 (see FIG. 19) in which first object Ob5 is displayed at second position P6 corresponding to first position P5 (see FIG. 20) in real space A1 (step S1: first image generation step). First position P5 is, for example, a position in front of projector 30, and is a position where the object is projected when light is illuminated in a projection direction in which the pan angle and the tilt angle are each 0 degrees. Note that first position P5 can be changed as appropriate. In a case where there is no wall as projection surface A11 at first position P5 or in a case where the user desires to change first position P5, when the user inputs coordinates representing a position of first position P5 by using input device 50, control system 10 sets, as first position P5, a position corresponding to the inputted coordinates.

After first image Im1 including first object Ob5 is generated, when input device 50 receives an operation of the user instructing the execution of the first projection processing (step S2), control system 10 starts processing of generating first adjustment image Im21 (see FIG. 19) and projecting the first adjustment image onto the real space. Second image generation unit 12 renders first adjustment image Im21 in which first object Ob5 is positioned in the first direction (for example, the right direction) with respect to image center CT1 from first image Im1 to second image Im2 (step S3: first adjustment image generation step). Projection controller 13 outputs image content D1 and control information D2 of first adjustment image Im21 to projector 30, and causes projector 30 to project the image. Projector 30 changes the projection direction in accordance with image center CT1 of first adjustment image Im21, and projects third image Im31 (see FIG. 20) based on first adjustment image Im21. That is, based on first adjustment image Im21, projection controller 13 causes projector 30 to project second object Ob6 corresponding to first object Ob5 onto first projection position PT1 in real space A1 (step S4: first adjustment image projection step). Here, it is assumed that an angle value (rendering region) of the viewing angle of virtual camera V30 is not correctly set since an angle value of the angle of view of projector 30 is unknown. In other words, the image size of third image Im31 is larger than the size of rendering region Ra1 of first adjustment image Im21 that is second image Im2 (the size converted into the scale of real space A1) for the reason that the installation position or the like of projector 30 is different from a design condition. Thus, second object Ob6 is displayed on the right side of first position P5 corresponding to second position P6.

Subsequently, when input device 50 receives an operation of the user instructing the execution of the second projection processing (step S5), control system 10 starts processing of generating second adjustment image Im22 (see FIG. 21) and projecting the second adjustment image onto the real space. Second image generation unit 12 renders second adjustment image Im22 in which first object Ob5 is positioned in the second direction (for example, the left direction) opposite to the first direction with respect to image center CT1 from first image Im1 to second image Im2 (step S6: second adjustment image generation step). Projection controller 13 outputs image content D1 and control information D2 of second adjustment image Im22 to projector 30, and causes projector 30 to project the image. Projector 30 changes the projection direction in accordance with image center CT1 of second adjustment image Im22, and projects third image Im32 (see FIG. 22) based on second adjustment image Im22. That is, projection controller 13 projects second object Ob6 corresponding to first object Ob5 onto second projection position PT2 in real space A1 based on second adjustment image Im22 (step S7: second adjustment image projection step). Here, since the image size of third image Im32 is larger than the size of rendering region Ra1 of second adjustment image Im22 that is second image Im2 (the size converted into the scale of real space A1), second object Ob6 is displayed on a left side of first position P5 corresponding to second position P6. Accordingly, second object Ob6 is moving leftward from first projection position PT1 to second projection position PT2.

Here, in a case where second object Ob6 moves from right to left in the second adjustment image projection step (step S8: Yes), the user operates input device 50 to input an adjustment instruction to reduce the projection size of second object Ob6 (projection image) in real space A1. At this time, after adjustment unit 14 performs zoom adjustment of decreasing the image size of third image Im3 by projector 30 or performs processing of increasing the rendering region when second image Im2 is rendered (step S9: adjustment step), the processing returns to step S2. Here, in a case where the rendering region when second image Im2 is rendered is increased, the image size of the projection image (third image Im3) of projector 30 does not change, but since the relative size of the object with respect to the rendering region decreases, an effect equivalent to the reduction of the image size is obtained, and thus, the projection size of second object Ob6 decreases. That is, in the adjustment step, in a case where second projection position PT2 is deviated in the second direction (left direction) with respect to first projection position PT1, at least one of zoom adjustment of decreasing third image Im3 projected by projector 30 and size adjustment of increasing the rendering region is performed.

In addition, in a case where second object Ob6 moves from left to right in the second adjustment image projection step (step S8: No and step S10: Yes), the user operates input device 50 to input an adjustment instruction to enlarge the projection size of second object Ob6 (projection image) in real space A1. At this time, after adjustment unit 14 performs zoom adjustment of increasing the image size of third image Im3 by projector 30 or performs processing for decreasing the rendering region when second image Im2 is rendered (step S11: adjustment step), the processing returns to step S2. Here, in a case where the rendering region when second image Im2 is rendered is decreased, the image size of the projection image (third image Im3) of projector 30 does not change, but since the relative size of the object with respect to the rendering region increases, an effect equivalent to the enlargement in the image size is obtained, and thus, the projection size of second object Ob6 increases. That is, in the adjustment step, in a case where second projection position PT2 is deviated in the first direction (right direction) with respect to first projection position PT1, at least one of zoom adjustment of increasing third image Im3 projected by projector 30 and size adjustment of decreasing the rendering region is performed.

In addition, the position of second object Ob6 does not change in the second adjustment image projection step (step S8: No and step S10: No), the user determines that the adjustment step is completed, and operates input device 50 to input an instruction to end the adjustment step. At this time, control system 10 ends the adjustment step based on the end instruction received by input device 50. Note that, the fact that the position of second object Ob6 does not change in the second adjustment image projection step may include a case where the change in the position of second object Ob6 falls within a predetermined error range. In a case where the position of second object Ob6 does not change, the size of rendering region Ra1 of second image Im2 in virtual space A2 (the size converted into the scale of real space A1) and the image size of third image Im3 in real space A1 are substantially the same, so that it is possible to reduce the deviation between the projection position of the image projected by projector 30 on real space A1 and the position on real space A1 corresponding to the display position in virtual space A2. Note that the fact that the size of rendering region Ra1 of second image Im2 (the size converted into the scale of real space A1) and the image size of third image Im3 are substantially the same may include a case where both image sizes are the same and a state where a difference between two image sizes falls within a predetermined error range.

As described above, control system 10 of the present exemplary embodiment repeatedly performs the processing of steps S2 to S11 until the position of second object Ob6 does not change in the second adjustment image projection step.

Note that first adjustment image Im21 and second adjustment image Im22 may be generated by arranging a diamond object on virtual space A2 and virtually changing the imaging direction of virtual camera V30 according to the procedure described in the generation mode without changing the position of the diamond object.

(4.4) Projection Mode

Next, an operation of control system 10 according to the present exemplary embodiment in the projection mode will be described.

In the projection mode, control system 10 projects image content D1 generated in the generation mode onto projection position P1 of real space A1 by projector 30.

Control system 10 reproduces image content D1 stored in data storage 23, outputs (transmits) a video signal to projector 30, and causes projector 30 to project the video signal onto projection position P1 in real space A1. Since image content D1 is an image of first object Ob1 excluding the background in virtual space A2, projector 30 can project only second object Ob2.

In addition, in the projection mode, control information D2 is also transmitted from control system 10 to projector 30 together with image content D1. Control system 10 corrects control information D2 based on the correction value calculated by correction processor 16, and transmits corrected control information D2 to projector 30. Projector 30 controls the orientation of mirror unit 32 based on corrected control information D2, and even in a case where the actual installation state of projector 30 is deviated from the reference state, the image can be more correctly projected onto desired projection position P1. Here, image content D1 and control information D2 are inputted to projector 30 in a synchronized state. Thus, in projector 30, drive unit 33 can drive mirror unit 32 in accordance with control information D2 while projecting image content D1. This allows projector 30 to move projection position P1 on real space A1, and to reproduce movement of first object Ob1 when image content D1 is generated in virtual space A2.

Here, in real space A1, third image Im3 projected by projector 30 is displayed at projection position P1 corresponding to display position P3 in virtual space A2. Moreover, in a case where projector 30 projects image content D1 at projection position P1, second object Ob2 to be projected substantially coincides with first object Ob1 virtually displayed at display position P3 in virtual space A2. Further, for image content D1 generated while display position P3 is being moved in virtual space A2, projection position P1 can be moved in the same manner in real space A1.

(5) Variations

The above exemplary embodiment is merely one of various exemplary embodiments of the present disclosure. The above exemplary embodiment can be variously changed in accordance with design and the like as long as the object of the present disclosure can be achieved. Each drawing described in the present disclosure is a schematic view, and a ratio of a size and a thickness of each component element in each drawing does not necessarily reflect an actual dimensional ratio. In addition, functions similar to those of control system 10 according to the above exemplary embodiment may be embodied by an installation information acquisition method, a computer program, a non-transitory recording medium recording a computer program, or the like.

Variations of the above exemplary embodiment will be listed below. The variations to be described below can be applied in appropriate combination.

(5.1) First Variation

In the installation information acquisition mode of installation information acquisition system 15 of the above exemplary embodiment, in the projection processing in step S2, projection processor 154 may cause projector 30 to project the index image onto three or more initial projection positions. Three or more initial projection positions correspond to three or more first adjustment points AP1 in real space A1.

Here, when the actual installation state of projector 30 is deviated from the reference state, the index image projected onto the initial projection positions by projector 30 are projected onto positions deviated from actual second adjustment points AP2. At this time, when the user moves mirror unit 32 of projector 30 via input device 50 to cause the index image to match second adjustment points AP2, second acquisition unit 152 acquires the angle information in a state where the position of the index image matches second adjustment points AP2. That is, in the second acquisition processing, the angle information is acquired based on an adjustment angle obtained by adjusting the projection direction of projector 30 in order to adjust the position of the index image projected onto the initial projection positions with the positions of second adjustment points AP2. Note that, in order to move mirror unit 32, mirror unit 32 may be moved directly by hand without using input device 50.

As described above, in the projection processing, when projection processor 154 controls projector 30 to project the index image onto the initial projection positions, even though the actual installation state of projector 30 is deviated from the reference state, the index image is projected onto positions close to second adjustment points AP2. Accordingly, in order for the user to adjust the index image with the positions of second adjustment points AP2, the amount of movement of mirror unit 32 is small, and it is possible to reduce the time and effort for the user to adjust the index image with the positions of second adjustment points AP2.

(5.2) Second Variation

In the installation information acquisition mode of installation information acquisition system 15 of the above exemplary embodiment, in a case where installation position P4 of projector 30 and three second adjustment points AP2 are positioned at vertices of a regular tetrahedron, three second adjustment points AP21, AP22, and AP23 are also solutions of intersection point CP1. In addition, in a case where installation position P4 of projector 30 and three second adjustment points AP2 are slightly deviated from the vertexes of the regular tetrahedron, points close to second adjustment points AP2 may be the solutions of intersection point CP1.

In such a case, although points at which a distance to second adjustment points AP2 is less than a predetermined value may be excluded from the solutions of intersection point CP1, there is a possibility that projector 30 is arranged near second adjustment points AP2.

Figure 23:
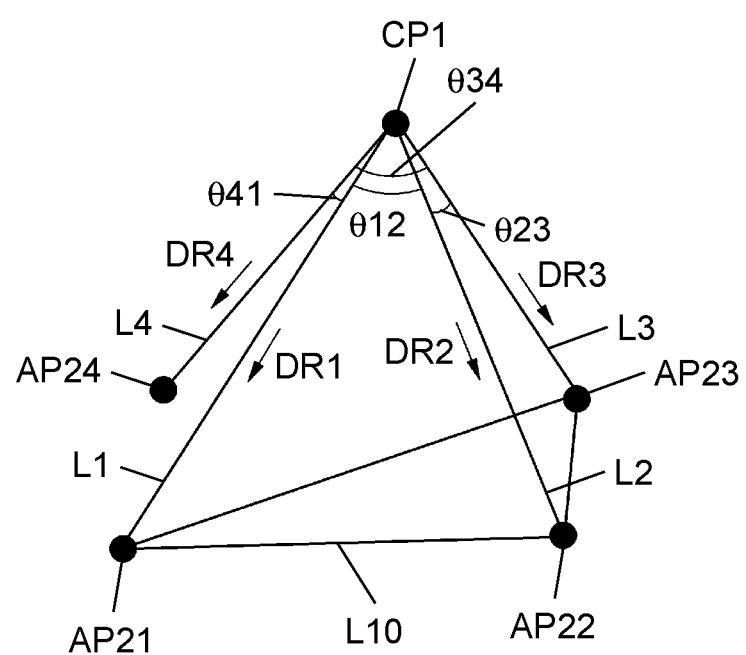
FIG. 23 is a schematic explanatory diagram for describing an installation information acquisition method of an image projection system according to a second variation.

Thus, in installation information acquisition system 15 of a second variation, four first adjustment points AP1 are set in virtual space A2. Installation information acquisition system 15 sets four second adjustment points AP2 (AP21 to AP24) corresponding to four first adjustment points AP1 in real space A1 (see FIG. 23), and executes the installation information acquisition method.

Specifically, when installation information acquisition system 15 starts the operation in the installation information acquisition mode, first acquisition unit 151 performs the first acquisition processing of acquiring the positional information regarding the positions of four first adjustment points AP1 in virtual space A2. Installation information acquisition system 15 displays an input screen for the user to input first adjustment points AP1 on display 40 in the installation information acquisition mode. When the user performs an operation of designating four first adjustment points AP1 by using input device 50, first acquisition unit 151 acquires the positional information regarding the positions of four first adjustment points AP1 in virtual space A2 based on the operation signal received by input unit 20 from input device 50.

When the positional information of four first adjustment points AP1 is acquired, projection processor 154 causes projector 30 to output the image data of the index image (for example, circular index) from communicator 22, and performs the projection processing of causing projector 30 to project the index image.

Here, the user adjusts the orientation (pan and tilt) of mirror unit 32 of projector 30 to project the index image on second adjustment points AP2. The user adjusts the orientation of mirror unit 32 to cause the index image to be projected onto second adjustment points AP21 to AP24 in order. Second acquisition unit 152 acquires the angle information with respect to the reference direction of the projection direction in a state where the index image is projected onto second adjustment points AP21 to AP24.

When the angle information is acquired by second acquisition unit 152, third acquisition unit 153 acquires the installation information of projector 30 based on the positional information regarding the positions of four first adjustment points AP1 and the angle information in the case of projecting the index image onto four second adjustment points AP2.

Specifically, third acquisition unit 153 obtains projection directions DR1 to DR4 in a case where the index image is projected from projector 30 to four second adjustment points AP21 to AP24. Third acquisition unit 153 calculates an angle formed by each of projection directions DR1 to DR4 and the other three projection directions.

Third acquisition unit 153 generates straight line L1 passing through second adjustment point AP21 and straight line L2 passing through second adjustment point AP22 and intersecting with straight line L1 at an angle formed by projection directions DR1 and DR2. In addition, third acquisition unit 153 also generates straight line L3 passing through intersection point CP1 of straight lines L1 and L2, intersecting with straight line L1 at an angle formed by projection directions DR1 and DR3, and intersecting with straight line L2 at an angle formed by projection directions DR2 and DR3. In addition, third acquisition unit 153 generates straight line L4 passing through intersection point CP1 of straight lines L1 and L2, intersecting with straight line L1 at an angle formed by projection directions DR1 and DR4, intersecting with straight line L2 at an angle formed by projection directions DR2 and DR4, and intersecting with straight line L3 at an angle formed by projection directions DR3 and DR4.

While maintaining a relationship between four straight lines L1 to L4, third acquisition unit 153 obtains first candidate coordinates of intersection point CP1 when a distance between straight line L3 and second adjustment point AP22 is minimized while rotating intersection point CP1 around straight line L10 connecting second adjustment points AP21 and AP23. In addition, while maintaining the relationship between four straight lines L1 to L4, third acquisition unit 153 obtains second candidate coordinates of intersection point CP1 when a distance between straight line L4 and second adjustment point AP24 is minimized while rotating intersection point CP1 around straight line L10 connecting second adjustment points AP21 and AP22. A point at which the first candidate coordinates coincide with the second candidate coordinates is acquired as intersection point CP1, that is, the installation position of projector 30.

As described above, installation information acquisition system 15 of the second variation can uniquely obtain intersection point CP1, that is, the installation position of projector 30 by setting four second adjustment points AP2 and executing the installation information acquisition method.

Note that, in a case where intersection point CP1, that is, a plurality of candidates for the installation position of projector 30 is obtained as a result of execution of the installation information acquisition method by installation information acquisition system 15, the user may select the installation position of projector 30 from the plurality of candidates.

Note that installation information acquisition system 15 may obtain the installation information regarding the installation state of projector 30 by setting five or more second adjustment points AP2 and executing the installation information acquisition method, and the number of first adjustment points AP1 and the number of second adjustment points AP2 can be appropriately changed as long as the number of points is three or more. As described above, in installation information acquisition system 15 of the second variation, the number of first adjustment points AP1 and the number of second adjustment points AP2 are set to four or more. By setting the number of first adjustment points AP1 and the number of second adjustment points AP2 to four or more, it is possible to more accurately obtain the installation information regarding the installation state of projector 30.

(5.3) Third Variation

In a case where there is a difference between virtual projection surface A21 in virtual space A2 and projection surface A11 in real space A1, when the number of first adjustment points AP1 and the number of second adjustment points AP2 are three, there is a possibility that the actual installation state of projector 30 cannot be correctly acquired.

Figure 24:
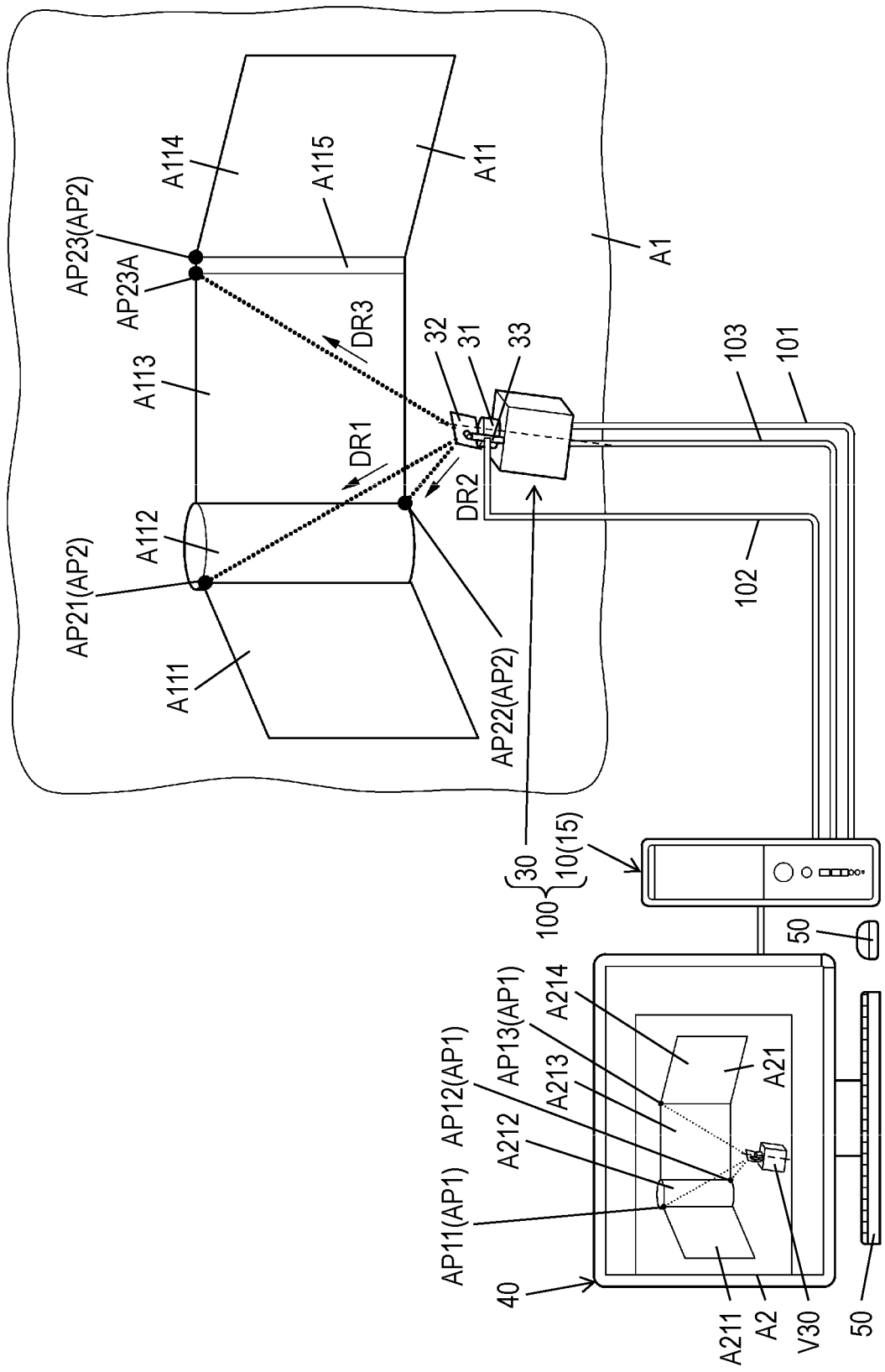
FIG. 24 is a schematic explanatory diagram for describing an installation information acquisition method of an image projection system according to a third variation.

As illustrated in FIG. 24, first adjustment point AP13 is set at a boundary between virtual projection surfaces A213 and A214 in virtual space A2. By contrast, in real space A1, a surface corresponding to virtual projection surface A213 is horizontally longer than the size in the virtual space. That is, the size is obtained by adding projection surface A115 between projection surfaces A113 and A114. In FIG. 24, for the sake of convenience in description, a virtual boundary is illustrated between projection surface A113 and projection surface A115. However, since projection surfaces A113 and A115 are continuous and the boundary cannot be seen, second adjustment point AP23A corresponding to first adjustment point AP13 to be at a boundary between projection surfaces A113 and A115 is set at the boundary between projection surface A114 and projection surface A115. Thus, a virtual installation position of a virtual projector in virtual space A2 and the installation position of projector 30 in real space A1 do not coincide with each other, and there is a possibility that second object Ob2 is not projected onto a correct position by projector 30.

Figure 25:
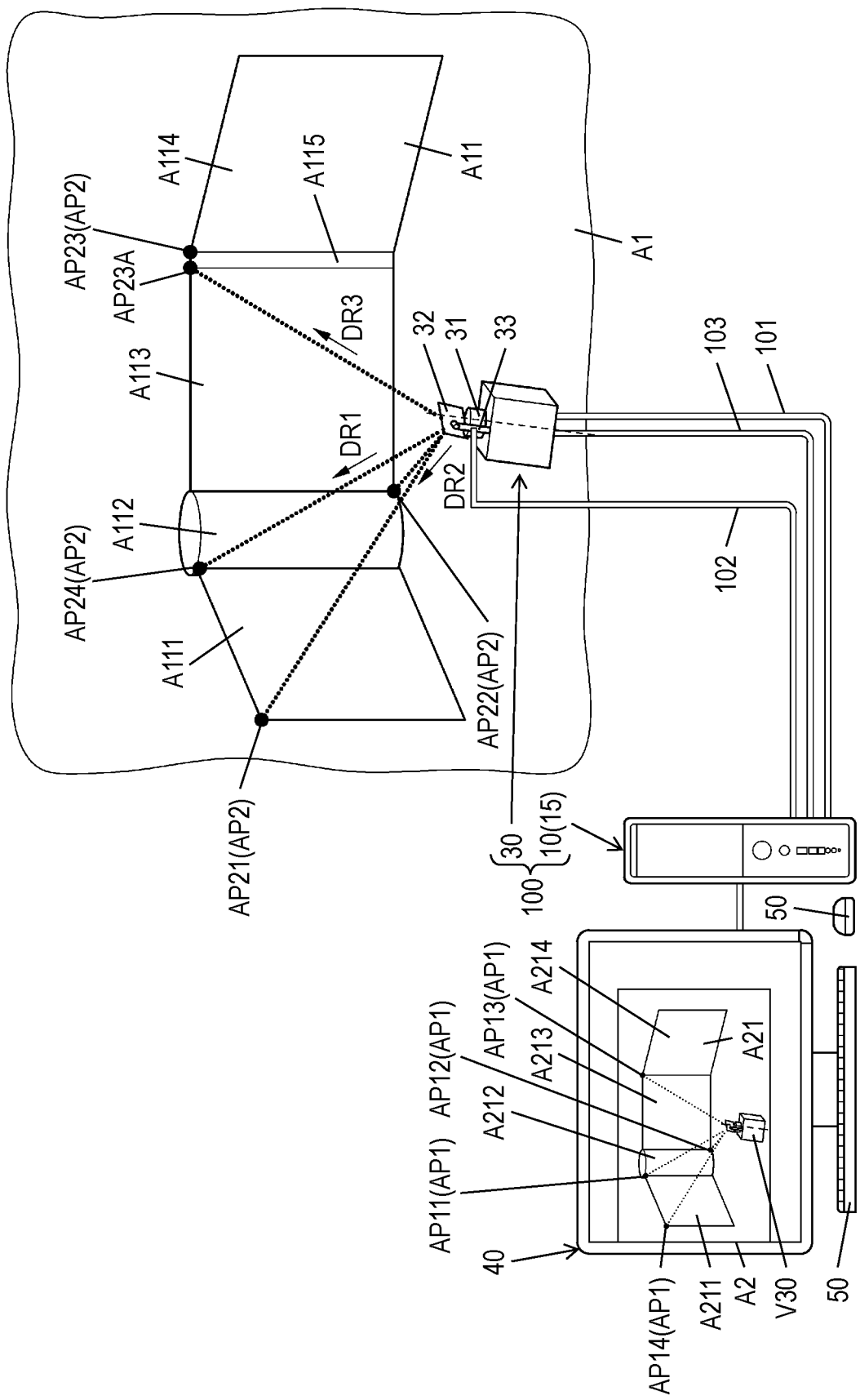
FIG. 25 is a schematic explanatory diagram for describing an installation information acquisition method of the image projection system.

Thus, as illustrated in FIG. 25, installation information acquisition system 15 of a third variation performs installation information acquisition processing by setting four second adjustment points AP2 (AP21, AP22, AP23A, and AP24) and executing the installation information acquisition method.

Installation information acquisition system 15 calculates the installation position of projector 30 based on the positional information and the angle information of four second adjustment points AP2 in the same manner as in the above exemplary embodiment. Here, third acquisition unit 153 calculates the installation position of projector 30 by the method described in "(5.2) Second variation". Third acquisition unit 153 obtains the position of intersection point CP1 by rotating an intersection point around a straight line connecting two points selected from four second adjustment points AP2, but obtains the position of intersection point CP1 while changing two points selected from four second adjustment points AP2, and obtains the installation position of projector 30 by obtaining an intermediate point thereof. As a result, the influence of the difference between virtual projection surface A21 constructed in virtual space A2 and projection surface A11 in real space A1 can be reduced, and changes in the position, size, orientation, and the like of the image projected by image projection system 100 can be suppressed.

(5.4) Fourth Variation

In a case where the difference between virtual projection surface A21 in virtual space A2 and projection surface A11 in real space A1 is large, even though the number of first adjustment points AP1 and the number of second adjustment points AP2 are increased to four as in the third variation, there is a possibility that projector 30 cannot correctly project an image.

Figure 26:
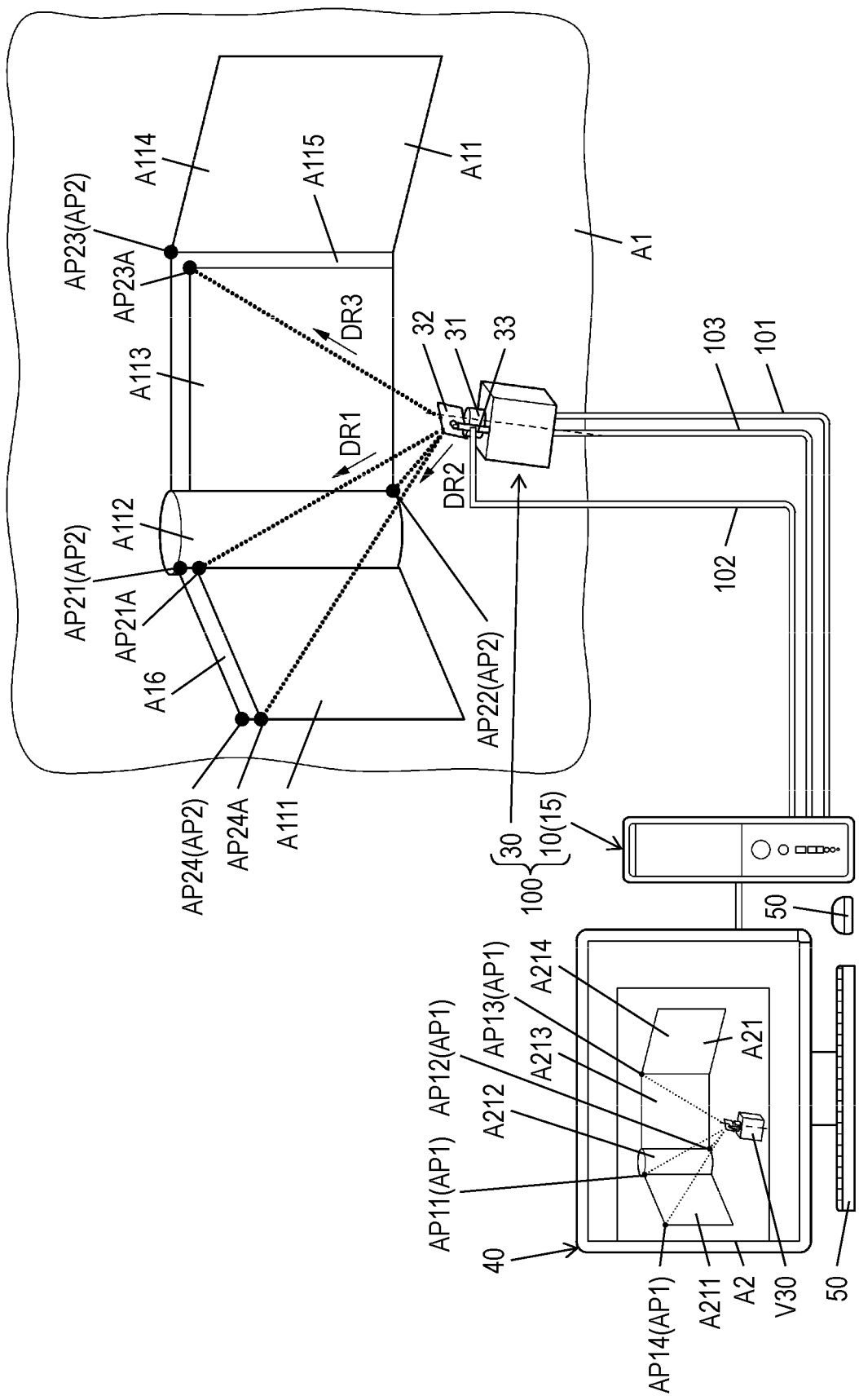
FIG. 26 is a schematic explanatory diagram for describing the installation information acquisition method of an image projection system according to a fourth variation.

In the example of FIG. 26, virtual projection surface A211 in virtual space A2 corresponds to projection surface A111 and projection surface A116 in real space A1, and virtual projection surface A213 in virtual space A2 corresponds to projection surface A113 and projection surface A115 in real space A1. Thus, second adjustment point AP21A different from actual second adjustment point AP21 corresponds to first adjustment point AP11 in virtual space A2. In addition, second adjustment point AP24A different from actual second adjustment point AP24 corresponds to first adjustment point AP14 in virtual space A2. In addition, second adjustment point AP23A different from actual second adjustment point AP23 corresponds to first adjustment point AP13 in virtual space A2.

As described above, when the angle information is obtained by adjusting the position of the index image with second adjustment points AP21A, AP23A, and AP24A different from actual second adjustment points AP21, AP23, and AP24 with respect to first adjustment points AP11, AP13, and AP14 in virtual space A2, the installation information of projector 30 is different from the reference state.

In this case, since three points of four second adjustment points AP2 are deviated from the correct positions, even though the number of second adjustment points AP2 is increased, the installation information of projector 30 cannot be correctly acquired, and there is a possibility that projector 30 cannot correctly project an image.

Thus, in control system 10 of the fourth variation, third acquisition unit 153 acquires the angle information (pan angle and tilt angle) of the projection direction of projector 30 with respect to the reference direction in a state where the index image is projected onto second adjustment points AP21A, AP22, AP23A, and AP24A. When the angle information is acquired for each of second adjustment points AP21A, AP22, AP23A, and AP24A, third acquisition unit 153 stores the acquired angle information in data storage 23. Here, an example of the control amounts (pan angles and tilt angles) in the projection direction set for first adjustment points AP1 in virtual space A2 and the pieces of angle information (pan angles and tilt angles) acquired at second adjustment points AP2 in real space A1 corresponding to first adjustment points AP1 is represented in Table 1.

TABLE 1

| First adjustment point | Control amount | | Second adjustment point | Angle information | |
|---|---|---|---|---|---|
| | Pan angle | Tilt angle | | Pan angle | Tilt angle |
| AP11 | PA1 | TL1 | AP21A | PA11 | TL11 |
| AP12 | PA2 | TL2 | AP22 | PA12 | TL12 |
| AP13 | PA3 | TL3 | AP23A | PA13 | TL13 |
| AP14 | PA4 | TL4 | AP24A | PA14 | TL14 |

In a case where control system 10 projects an image in real space A1 by projector 30, correction processor 16 corrects the projection direction in which the image is projected based on the angle information. That is, correction processor 16 performs correction processing of correcting the projection direction in which the projection image is projected by projector 30 by using the angle information acquired by the installation information acquisition method.

In a case where the image is projected onto any one of the positions in real space A1 corresponding to first adjustment points AP1 in virtual space A2, that is, second adjustment points AP21A, AP22, AP23A, and AP24A for which the angle information is acquired, correction processor 16 corrects the control amounts in the projection direction set for first adjustment points AP1 with the pieces of angle information acquired at the corresponding second adjustment points AP2. For example, in a case where the image is projected onto the position in real space A1 corresponding to first adjustment point AP11 in virtual space A2, control system 10 controls the projection direction of projector 30 based on the angle information of second adjustment point AP21A corresponding to first adjustment point AP11. Specifically, control system 10 controls the projection direction of projector 30 by setting mirror unit 32 to pan angle PA11 and tilt angle TL11.

Figure 27:
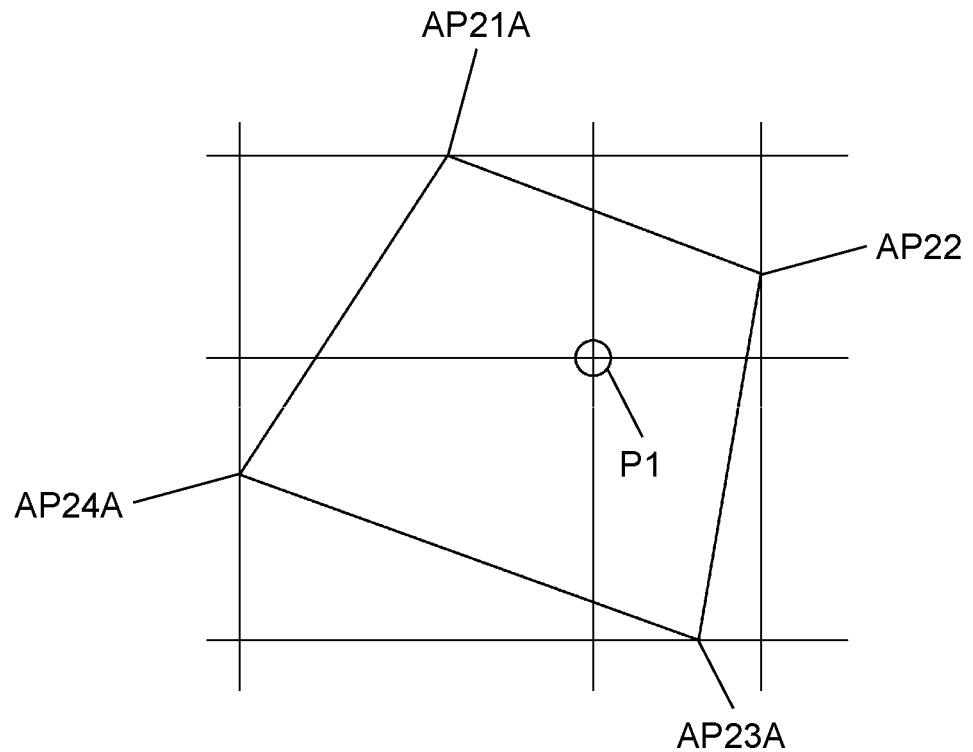
FIG. 27 is a schematic explanatory diagram for describing the installation information acquisition method of the image projection system.

On the other hand, in a case where the image is projected onto projection position P1 in real space A1 corresponding to display position P3 other than first adjustment points AP1 in virtual space A2, correction processor 16 determines the projection direction of the image by projector 30 based on the pieces of angle information at the plurality of second adjustment points AP2 around projection position P1. For example, in a case where control system 10 projects an image onto projection position P1 (see FIG. 27) surrounded by four second adjustment points AP21A, AP22, AP23A, and AP24A, correction processor 16 determines the projection direction of the image based on the pieces of angle information at second adjustment points AP21A, AP22, AP23A, and AP24A. Specifically, control system 10 determines pan angle PAx and tilt angle TLx in a case where the image is projected onto projection position P1 based on the following Expression 1 and Expression 2. Here, a minimum value of the pan angles at four second adjustment points AP21A, AP22, AP23A, and AP24A is PAmin, a maximum value of the pan angles is PAmax, a minimum value of the tilt angles is TLmin, and a maximum value of the tilt angles is TLmax. In addition, an X coordinate and a Y coordinate of projection position P1 are defined as PX1 and TY1, respectively. In addition, an X coordinate of first adjustment point AP1 on a CG screen having a minimum pan angle is PXmin, and an X coordinate of first adjustment point AP1 on the CG screen having a maximum pan angle is PXmax. In addition, a Y coordinate of first adjustment point AP1 on the CG screen having a minimum tilt angle is TYmin, and a Y coordinate of first adjustment point AP1 on the CG screen having a maximum tilt angle is TYmax.

$$PAx = PA\min + \frac{PA\max - PA\min}{PX\max - PX\min} \times (PX1 - PX\min) \quad \text{Math. 1}$$

$$TLx = TL\min + \frac{TL\max - TL\min}{TY\max - TY\min} \times (TY1 - TY\min) \quad \text{Math. 2}$$

In this manner, since pan angle PAx and tilt angle TLx in a case where the image is projected onto projection position P1 are obtained by linear interpolation by using the pan angle and the tilt angle at the plurality of second adjustment points AP2 around projection position P1, the projection direction at any projection position P1 can be set based on the angle information at second adjustment point AP2 in real space A1. That is, the correction processing performed by correction processor 16 includes correction processing of obtaining the projection direction at any display position P3 other than three or more second adjustment points AP2 by interpolation by using the angle information obtained for each of three or more second adjustment points AP2 in the second acquisition processing. As a result, even in a case where virtual projection surface A21 in virtual space A2 and projection surface A11 in real space A1 are greatly different from each other, since the projection direction in a case where the image is projected onto the projection position is linearly interpolated based on, for example, the pieces of angle information at the plurality of second adjustment points AP2, it is possible to suppress the changes in the size, shape, and orientation of the image projected onto projection position P1 from the size, shape, and orientation during the generation of image content D1.

Figure 28:
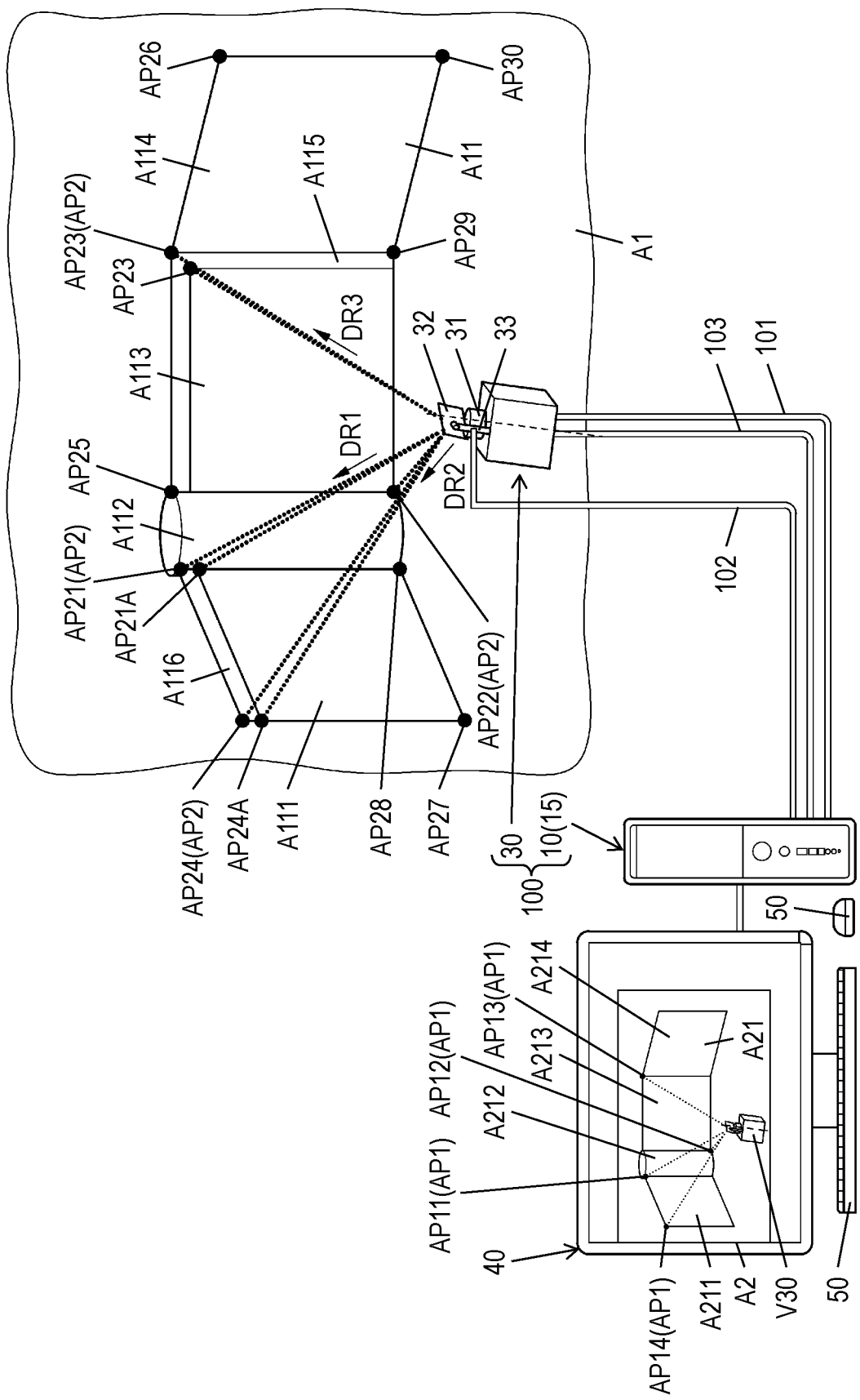
FIG. 28 is a schematic explanatory diagram for describing the installation information acquisition method of the image projection system.

Note that, in order to obtain the projection direction (pan angle and tilt angle) in a case where the image is projected onto any projection position P1 in real space A1 by linear interpolation as described above, the plurality of second adjustment points AP21 to AP30 are preferably set for each of the plurality of projection surfaces A11 as illustrated in FIG. 28. Since correction processor 16 corrects the projection direction in a case where the image is projected onto any projection position P1 by linear interpolation by using the pieces of angle information at the plurality of second adjustment points AP2 around projection position P1, the image can be more correctly projected by projector 30.

Note that the correction method performed by correction processor 16 can also be embodied by a program. This program is a program for causing one or more processors to execute the correction method performed by correction processor 16.

Note that the interpolation method performed by correction processor 16 is not limited to the linear interpolation, and interpolation may be performed by a non-linear function.

(5.5) Fifth Variation

Figure 29:
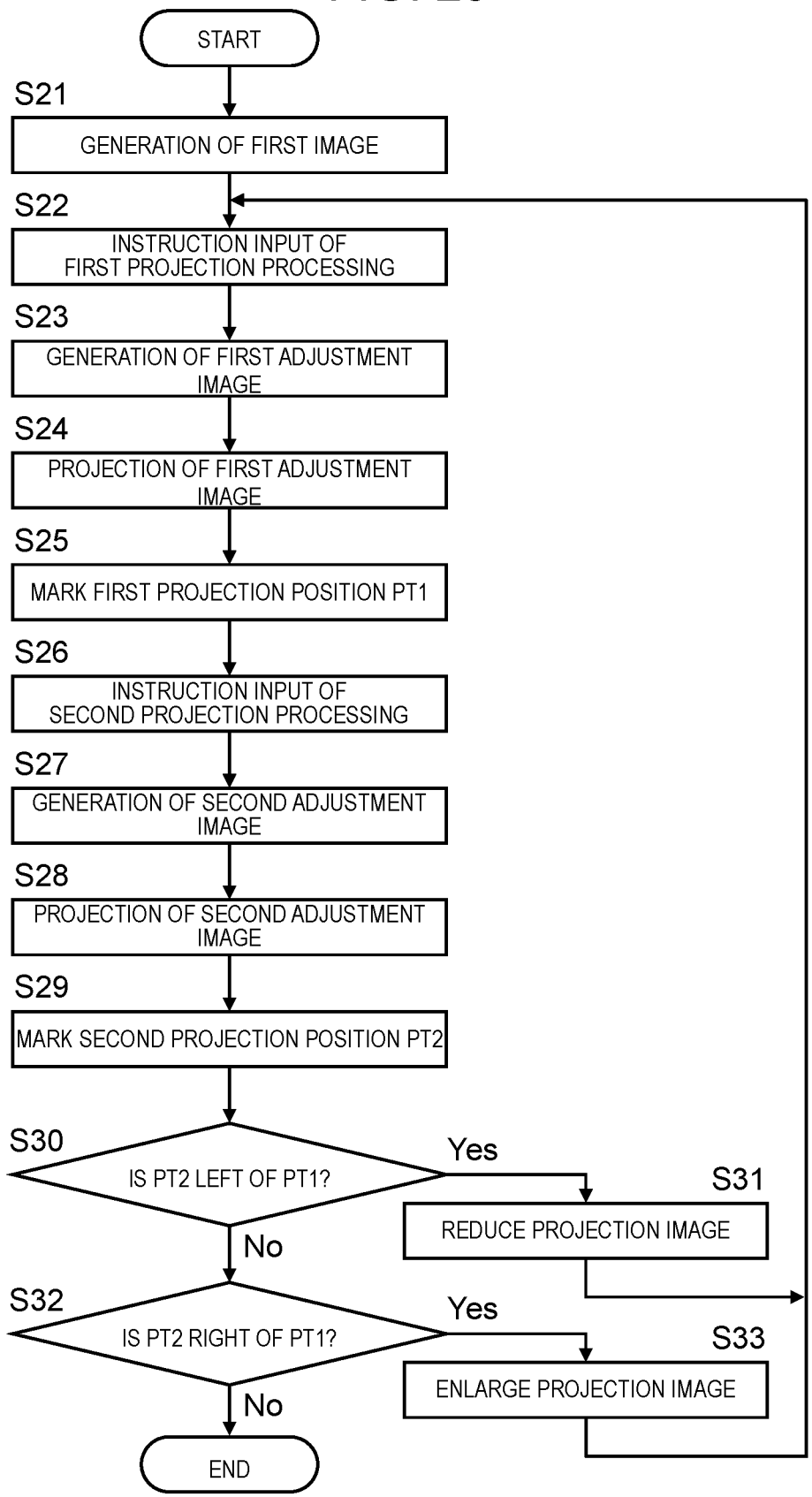
FIG. 29 is a flowchart for describing an image adjustment method by an image projection system of a fifth variation.
Figure 30:
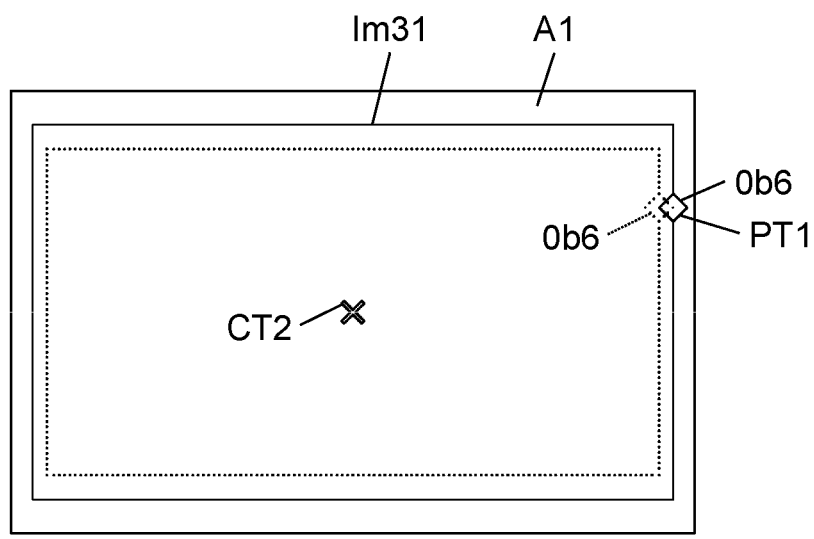
FIG. 30 is an explanatory diagram of the first adjustment image projected onto the real space by an image projection system of a fifth variation.
Figure 31:
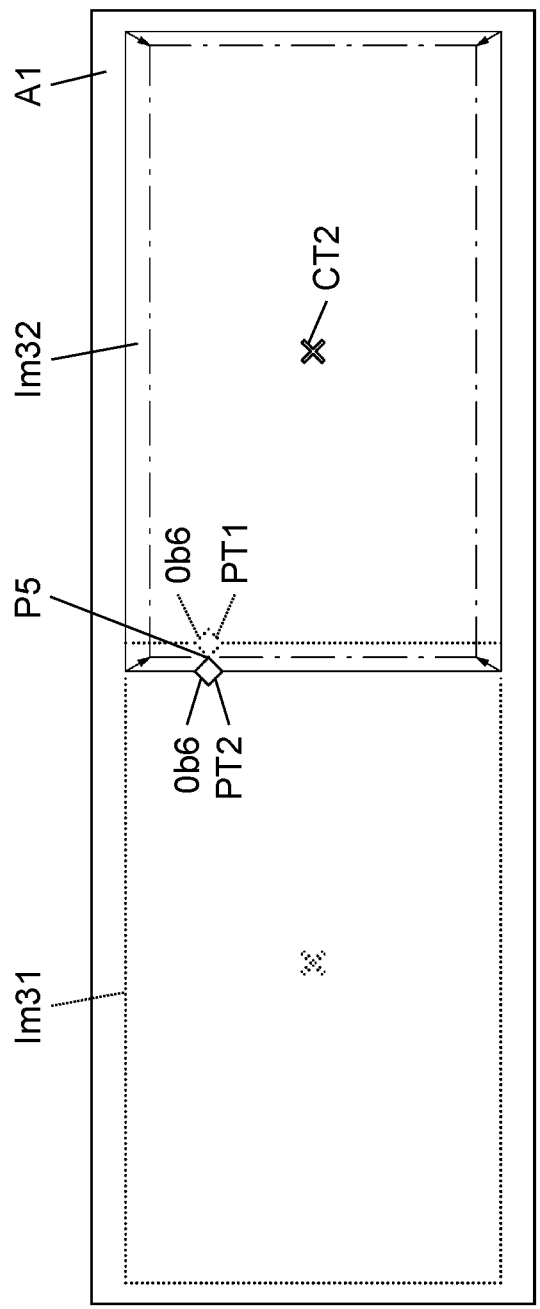
FIG. 31 is an explanatory diagram of the second object based on the second adjustment image projected onto the real space by the image projection system of the fifth variation.

Control System 10 of a Fifth Variation Will be Described with Reference to FIGS. 29 to 31.

An operation of control system 10 of the fifth variation in the adjustment mode is different from the above exemplary embodiment. Since a configuration of control system 10 is in common with the above exemplary embodiment, the same component elements are denoted by the same reference marks, and the description thereof will be omitted.

For example, when input device 50 receives a start operation of the adjustment mode by the user, control system 10 starts the operation of the adjustment mode.

First, first image generation unit 11 generates first image Im1 (see FIG. 19) in which first object Ob5 is displayed at second position P6 corresponding to first position P5 in real space A1 (step S21: first image generation step).

After first image Im1 including first object Ob5 is generated, when input device 50 receives an operation of the user instructing the execution of the first projection processing (step S22), control system 10 starts processing of generating first adjustment image Im21 (see FIG. 19) and projecting the first adjustment image onto the real space. Second image generation unit 12 renders first adjustment image Im21 in which first object Ob5 is positioned in the first direction (for example, the right direction) with respect to image center CT1 from first image Im1 to second image Im2 (step S23: first adjustment image generation step). Projection controller 13 outputs image content D1 and control information D2 of first adjustment image Im21 to projector 30, and causes projector 30 to project second object Ob6. Projector 30 projects second object Ob6 onto first projection position PT1 in real space A1 by changing the projection direction in accordance with image center CT1 of first adjustment image Im21 and projecting third image Im31 (see FIG. 19) including second object Ob6 based on first adjustment image Im21 (step S24: first adjustment image projection step). Here, since the image size of third image Im21 is larger than the size of rendering region Ra1 of first adjustment image Im31 that is second image Im2 (the size converted into the scale of real space A1) for the reason that the installation position or the like of projector 30 is different from the design condition, second object Ob6 is displayed on the right side of first position P5 corresponding to second position P6. The user marks first projection position PT1 onto which second object Ob6 is projected in real space A1 by, for example, marking the first projection position (step S25).

Subsequently, when input device 50 receives an operation of the user instructing the execution of the second projection processing (step S26), control system 10 starts processing of generating second adjustment image Im22 (see FIG. 21) and projecting the second adjustment image onto the real space. Second image generation unit 12 renders second adjustment image Im22 in which first object Ob5 is positioned in the second direction (for example, the left direction) with respect to image center CT1 from first image Im1 to second image Im2 (step S27: second adjustment image generation step). Projection controller 13 outputs image content D1 and control information D2 of second adjustment image Im22 to projector 30, and causes projector 30 to project second object Ob6. Projector 30 projects second object Ob6 onto second projection position PT2 in real space A1 by changing the projection direction in accordance with image center CT1 of second adjustment image Im22 and projecting third image Im32 (see FIG. 31) including second object Ob6 based on second adjustment image Im22 (step S28: second adjustment image projection step). Here, since the image size of third image Im32 is larger than the size of rendering region Ra1 of second adjustment image Im22 that is second image Im2 (the size converted into the scale of real space A1), second object Ob6 is displayed on a left side of first position P5 corresponding to second position P6. Accordingly, second object Ob6 is moving leftward from first projection position PT1 to second projection position PT2. The user marks second projection position PT2 onto which second object Ob6 is projected in real space A1 by marking the second projection position (step S29).

Here, in a case where second projection position PT2 is on a left side (second direction) of first projection position PT1 (step S30: Yes), the user operates input device 50 to input an adjustment instruction to reduce the projection size of second object Ob6 (projection image) in real space A1. At this time, after adjustment unit 14 performs zoom adjustment of decreasing the image size of third image Im3 by projector 30 or performs processing of increasing the rendering region when second image Im2 is rendered (step S31: adjustment step), the processing returns to step S22.

In addition, in a case where second projection position PT2 is on a right side (first direction) of first projection position PT1 (step S30: No and step S32: Yes), the user operates input device 50 to input an adjustment instruction to enlarge the projection size of second object Ob6 (projection image) in real space A1. At this time, after adjustment unit 14 performs zoom adjustment of increasing the image size of third image Im3 by projector 30 or performs processing of decreasing the rendering region when second image Im2 is rendered (step S33: adjustment step), the processing returns to step S22.

In addition, in a case where second projection position PT2 and first projection position PT1 are the same (step S30: No and step S32: No), the user determines that the adjustment step is completed, and operates input device 50 to input an instruction to end the adjustment step. At this time, control system 10 ends the adjustment step based on the end instruction received by input device 50. Note that the fact that second projection position PT2 and first projection position PT1 are the same may include a case where the displacement of second projection position PT2 with respect to first projection position PT1 falls within a predetermined error range. The image size of third image Im3 is adjusted such that second projection position PT2 and first projection position PT1 become the same, and thus, it is possible to reduce the deviation between the projection position of the image projected onto real space A1 by projector 30 and the position on real space A1 corresponding to the display position in virtual space A2.

As described above, control system 10 of the present variation repeatedly performs the processing of steps S21 to S33 until second projection position PT2 and first projection position PT1 become the same.

Figure 21:
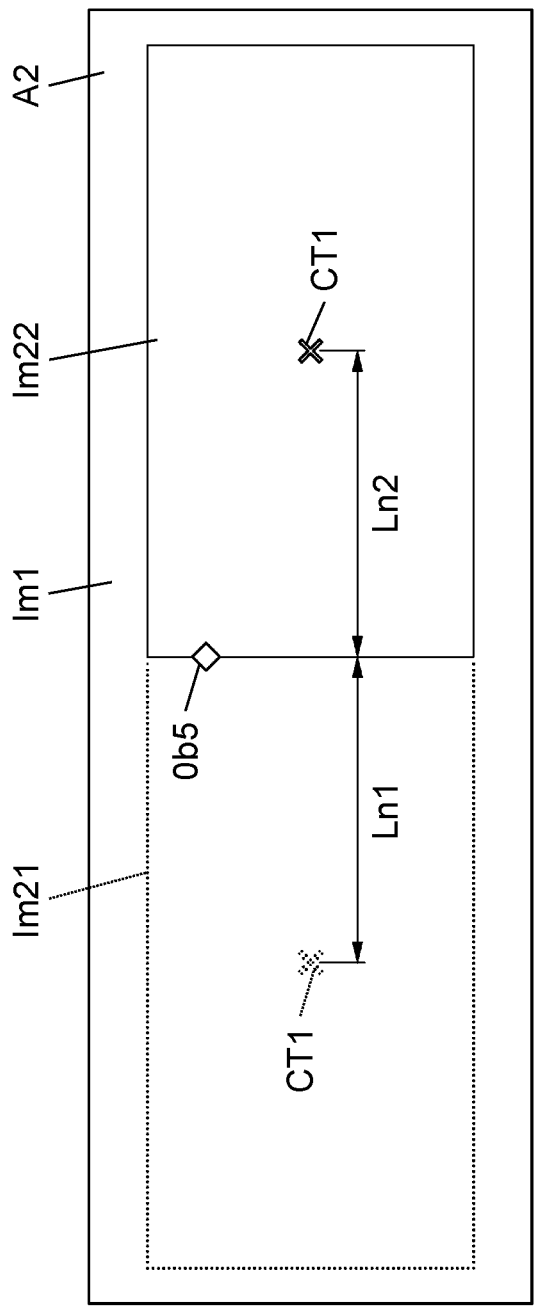
FIG. 21 is an explanatory diagram of a second adjustment image rendered from the first image by the image projection system.

In the present variation, as illustrated in FIG. 21, first distance Ln1 between image center CT1 and first object Ob5 in first adjustment image Im21 is equal to second distance Ln2 between image center CT1 and first object Ob5 in second adjustment image Im22. In this case, an intermediate position between first projection position PT1 and second projection position PT2 becomes second position P6 where second object Ob6 is projected. Accordingly, after first projection position PT1 and second projection position PT2 are marked in real space A1, the user marks the intermediate position (first position P5) between first projection position PT1 and second projection position PT2. In the adjustment step, at least one of the zoom adjustment of projector 30 and the size adjustment of the image size of second image Im2 may be performed such that second object Ob6 is projected onto the intermediate position (marked position) between first projection position PT1 and second projection position PT2. In this case, the adjustment step can be ended in a short time without repeating the processing of steps S22 to S33 multiple times.

(5.6) Sixth Variation

Figure 32:
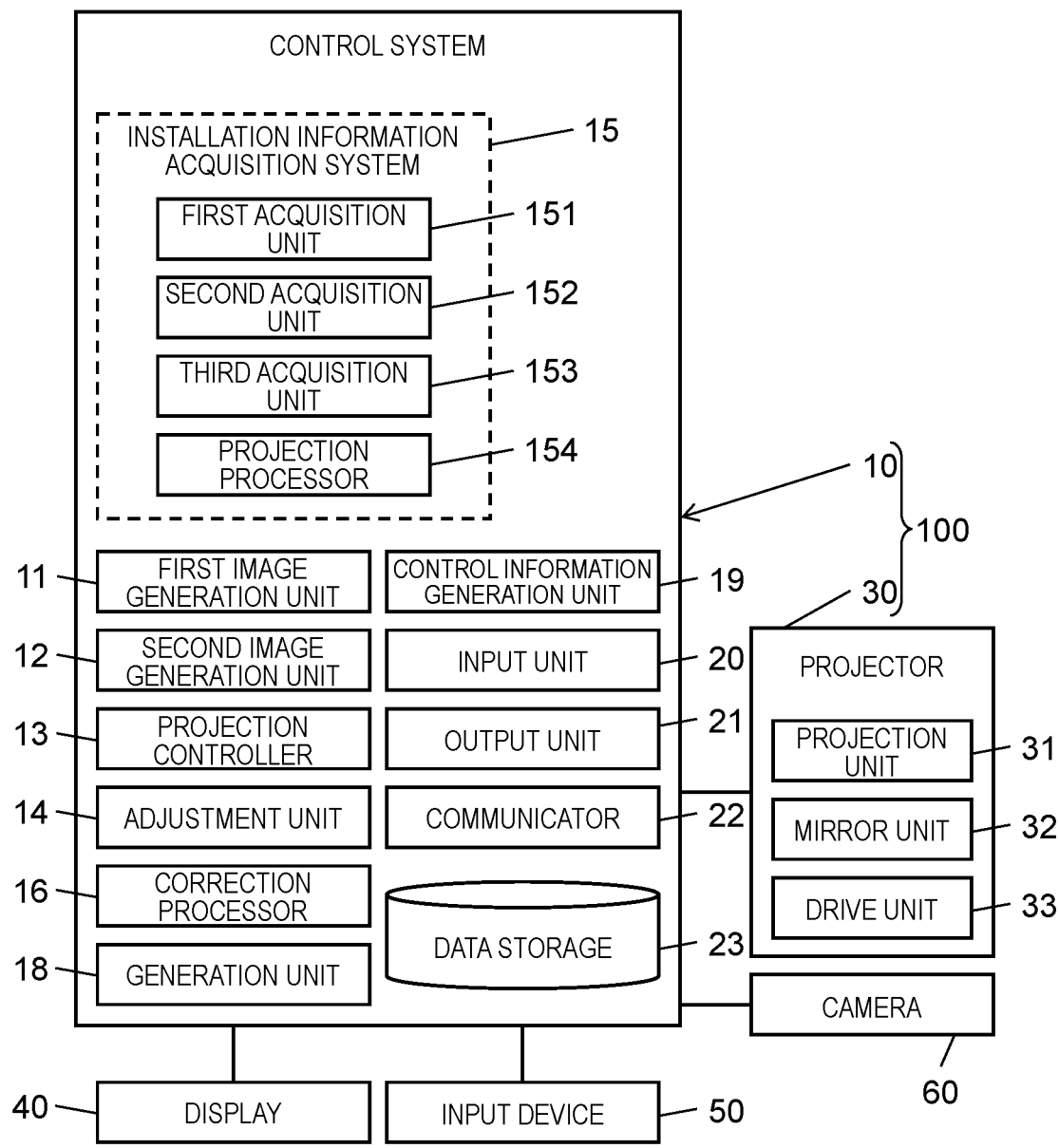
FIG. 32 is a schematic block diagram of an image projection system of a sixth variation.
Figure 33:
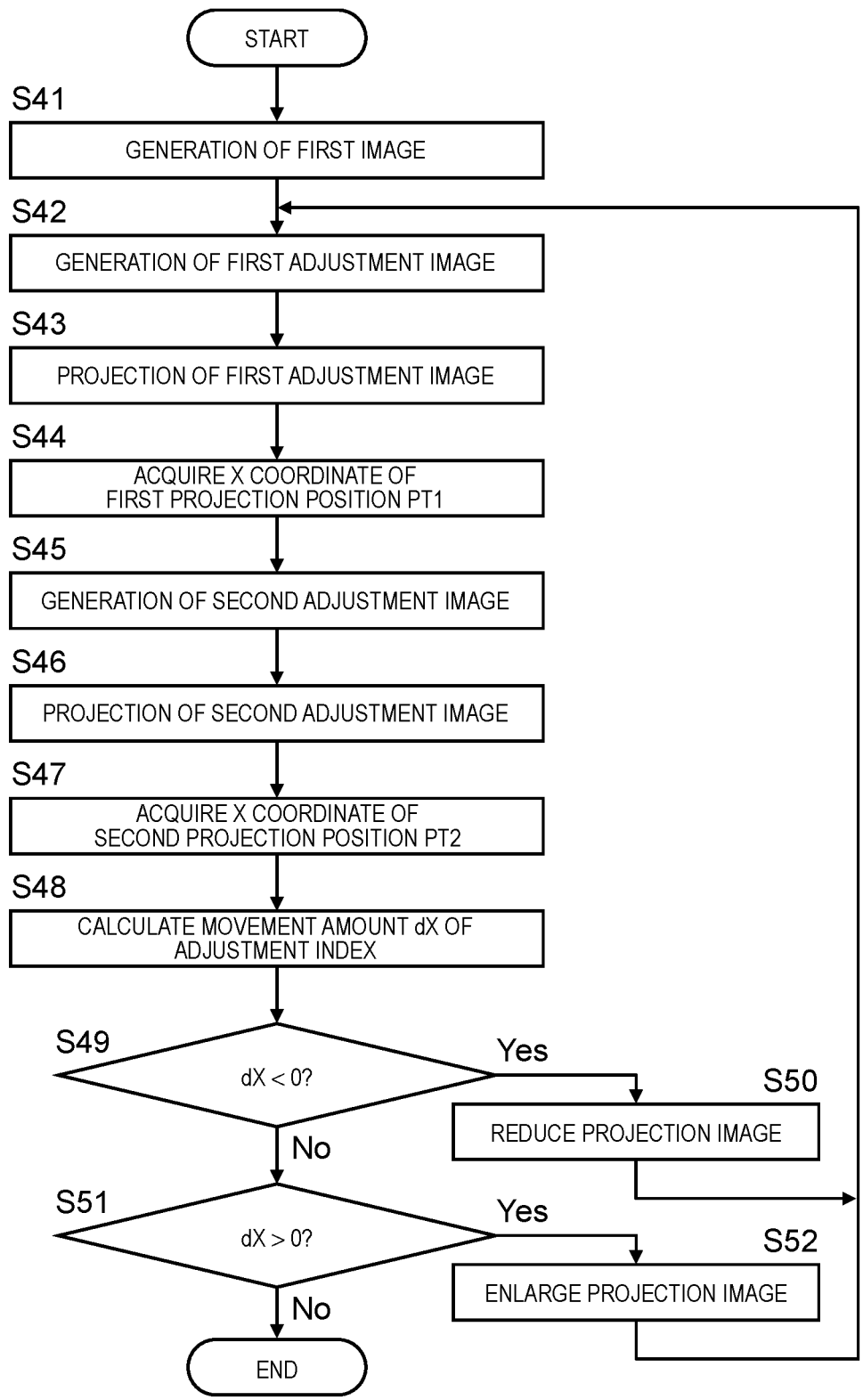
FIG. 33 is a flowchart for describing an image adjustment method by the image projection system of the sixth variation.

Control System 10 of a Sixth Variation Will be Described with Reference to FIGS. 32 and 33.

Control system 10 of the sixth variation is different from the above exemplary embodiment in that camera 60 that captures second object Ob6 projected by projector 30 is further included. Camera 60 is a camera of which an imaging direction is fixed, and image data of an image captured by camera 60 is outputted to control system 10. Note that, since configurations other than camera 60 are common to the configurations of the above exemplary embodiment or the fifth variation, the same component elements are denoted by the same reference marks, and the description thereof is omitted.

An operation of control system 10 of the sixth variation in the adjustment mode will be described below.

For example, when input device 50 receives a start operation of the adjustment mode by the user, control system 10 starts the operation of the adjustment mode.

First, first image generation unit 11 generates first image Im1 (see FIG. 19) in which first object Ob5 is displayed at second position P6 corresponding to first position P5 in real space A1 (step S41: first image generation step).

When first image Im1 including first object Ob5 is generated, control system 10 starts processing of generating first adjustment image Im21 (see FIG. 19) and projecting the first adjustment image onto the real space. Second image generation unit 12 generates, as second image Im2, first adjustment image Im21 in which first object Ob5 is positioned in the first direction (for example, the right direction) with respect to image center CT1 (step S42: first adjustment image generation step). Projection controller 13 outputs image content D1 and control information D2 of first adjustment image Im21 to projector 30, and causes projector 30 to project the image. Projector 30 projects second object Ob6 onto first projection position PT1 in real space A1 by changing the projection direction in accordance with image center CT1 of first adjustment image Im21 and projecting third image Im31 (see FIG. 30) based on first adjustment image Im21 (step S43: first adjustment image projection step). Here, since the image size of third image Im21 is larger than the size of rendering region Ra1 of first adjustment image Im31 that is second image Im2 (the size converted into the scale of real space A1) for the reason that the installation position or the like of projector 30 is different from the design condition, second object Ob6 is displayed on the right side of first position P5 corresponding to second position P6.

At this time, adjustment unit 14 performs image processing on the image captured by camera 60 to obtain the position of second object Ob6 in the image. Adjustment unit 14 calculates coordinates of first projection position PT1 where second object Ob6 is projected onto real space A1 based on the position of second object Ob6 in the image, the imaging direction of camera 60, and the like (step S44: first coordinate acquisition step). In other words, in the first coordinate acquisition step, first coordinates of first projection position PT1 are acquired from the image obtained by capturing second object Ob6 projected onto first projection position PT1 by camera 60 installed in real space A1 and having a fixed imaging direction. Here, the first coordinates of first projection position PT1 are, for example, coordinates on the image captured by camera 60, but may be coordinates in real space A1. In addition, in the first coordinate acquisition step, adjustment unit 14 may obtain at least an X coordinate of first projection position PT1 in the pan direction onto which second object Ob6 is projected. Note that, in a case where the X coordinate in the pan direction is obtained as the first coordinate in the image captured by camera 60, a position of a left end of the image captured by camera 60 may be set as an origin of the X coordinate.

Subsequently, control system 10 starts processing of generating second adjustment image Im22 (see FIG. 21) and projecting the second adjustment image onto the real space. Second image generation unit 12 generates, as second image Im2, second adjustment image Im22 in which first object Ob5 is positioned in the second direction (for example, the left direction) with respect to image center CT1 (step S45: second adjustment image generation step). Projection controller 13 outputs image content D1 and control information D2 of second adjustment image Im22 to projector 30, and causes projector 30 to project the image. Projector 30 projects second object Ob6 onto second projection position PT2 in real space A1 by changing the projection direction in accordance with image center CT1 of second adjustment image Im22 and projecting third image Im32 (see FIG. 22) based on second adjustment image Im22 (step S46: second adjustment image projection step). Here, since the image size of third image Im32 is larger than the size of rendering region Ra1 of second adjustment image Im22 that is second image Im2 (the size converted into the scale of real space A1), second object Ob6 is displayed on the left side of first position P5 corresponding to second position P6. Accordingly, second object Ob6 is moving leftward from first projection position PT1 to second projection position PT2.

At this time, adjustment unit 14 calculates coordinates of second projection position PT2 where second object Ob6 is projected in real space A1 based on the image captured by camera 60 (step S47: second coordinate acquisition step). In other words, in the second coordinate acquisition step, the second coordinates of second projection position PT2 are acquired from the image obtained by capturing second object Ob6 projected onto second projection position PT2 by camera 60. Here, the second coordinates of second projection position PT2 are, for example, coordinates on the image captured by camera 60, but may be coordinates in real space A1. Note that, in the second coordinate acquisition step, adjustment unit 14 may obtain at least an X coordinate of second projection position PT2 in the pan direction onto which second object Ob6 is projected.

Thereafter, adjustment unit 14 calculates movement amount dX (=X2−X1) of second object Ob6 by subtracting X coordinate X1 of first projection position PT1 from X coordinate X2 of second projection position PT2 (step S48). In other words, in the adjustment step, the projection size of second object Ob6 is adjusted (for example, at least one of the zoom adjustment of projector 30 and the size adjustment of the rendering region) to reduce a difference between the first coordinates and the second coordinates in a direction (pan direction) along the first direction and the second direction.

Here, when a sign of movement amount dX is negative (step S49: Yes), after adjustment unit 14 performs zoom adjustment of decreasing the image size of third image Im3 by projector 30 or performs processing of increasing the rendering region of second image Im2 (step S50: adjustment step), the processing returns to step S42.

In addition, when the sign of movement amount dX is positive (step S49: No and step S51: Yes), after adjustment unit 14 performs zoom adjustment of increasing the image size of third image Im3 by projector 30 or performs processing of decreasing the rendering region of second image Im2 (step S52: adjustment step), the processing returns to step S42.

In addition, when a value of movement amount dX becomes zero (step S49: No and step S51: No), control system 10 ends the adjustment step, and displays the end of the adjustment step on display 40, for example. Note that the fact that the value of movement amount dX is zero may include a case where the value of movement amount dX falls within a predetermined error range.

As described above, control system 10 of the present variation repeatedly performs the processing of steps S42 to S52 until the value of movement amount dX becomes zero.

In the present variation, as illustrated in FIG. 21, first distance Ln1 between image center CT1 and first object Ob5 in first adjustment image Im21 is equal to second distance Ln2 between image center CT1 and first object Ob5 in second adjustment image Im22. In this case, an intermediate position between first projection position PT1 and second projection position PT2 becomes second position P6 where second object Ob6 is projected. Accordingly, adjustment unit 14 can obtain an X coordinate of the intermediate position (first position P5) between first projection position PT1 and second projection position PT2 from the X coordinate of first projection position PT1 and the X coordinate of second projection position PT2. In this case, in the adjustment step, the projection size of second object Ob6 in real space A1 may be adjusted (at least one of the zoom adjustment of projector 30 and the size adjustment of the rendering region) such that second object Ob6 is projected onto the intermediate position between first projection position PT1 and second projection position PT2 in the direction (pan direction) along the first direction and the second direction based on the X coordinate of the intermediate position. As a result, the adjustment step can be ended in a short time without repeating the processing of steps S42 to S52 multiple times.

(5.7) Other Variations

Control system 10 of the present disclosure includes a computer system. The computer system includes, as main configurations, a processor and a memory as hardware. Functions as installation information acquisition system 15 and control system 10 in the present disclosure are implemented under a program recorded in the memory of the computer system and executed by the processor. The program may be recorded in advance in the memory of the computer system, may be provided through a telecommunication line, or may be provided by being recorded in a non-transitory recording medium such as a memory card, an optical disk, or a hard disk drive readable by the computer system. The processor of the computer system includes one or a plurality of electronic circuits including a semiconductor integrated circuit (IC) or a large-scale integration (LSI). The integrated circuit such as the IC or the LSI in this disclosure is called differently depending on a degree of integration, and includes an integrated circuit called a system LSI, a very large scale integration (VLSI), or an ultra large scale integration (ULSI). Further, a field-programmable gate array (FPGA) programmed after manufacture of LSI, and a logical device capable of reconfiguring a joint relationship in LSI or reconfiguring circuit partitions in LSI can also be used as processors. The plurality of electronic circuits may be aggregated in one chip or may be provided in a distributed manner on a plurality of chips. The plurality of chips may be aggregated in one device or may be provided in a distributed manner in a plurality of devices. The computer system in this disclosure includes a microcontroller having at least one processor and at least one memory. Accordingly, the microcontroller also includes one or a plurality of electronic circuits including a semiconductor integrated circuit or a large-scale integrated circuit.

Similarly, it is not essential for control system 10 that at least some functions of control system 10 are aggregated in one housing, and the component elements of control system 10 may be provided in a plurality of housings in a distributed manner. For example, at least some functions of control system 10 may be provided in another housing. Further, at least some functions of control system 10 may be implemented by cloud (cloud computing), edge (edge computing), or a combination thereof.

Conversely, in the above exemplary embodiment, at least some functions distributed in a plurality of devices may be aggregated in one housing. For example, functions distributed to control system 10 and projector 30 may be aggregated in one housing.

In the above exemplary embodiment, the user designates three or more first adjustment points AP1 in virtual space A2, but installation information acquisition system 15 may automatically set three or more first adjustment points AP1, or the user may select three or more first adjustment points AP1 from a plurality of candidate points presented by installation information acquisition system 15. Here, installation information acquisition system 15 preferably determines a combination of three or more first adjustment points AP1 such that the installation position of projector 30 is uniquely determined.

In the above exemplary embodiment, there may be a plurality of discontinuous surfaces (projection surface A11) that are discontinuous with each other in real space A1, and first adjustment points AP1 and second adjustment points AP2 may include points on at least two discontinuous surfaces among the plurality of discontinuous surfaces. That is, first adjustment points AP1 and second adjustment points AP2 are preferably set on projection surfaces discontinuous to each other. When the projection position of the image moves from a certain projection surface to a projection surface discontinuous with respect to the projection surface, the distortion, rotation, or the like of the image is likely to occur. However, when first adjustment points AP1 and second adjustment points AP2 are set on the projection surfaces discontinuous with each other, the installation state of projector 30 can be acquired more accurately, and the image can be projected more correctly by projector 30. In addition, first adjustment points AP1 and second adjustment points AP2 may be set on a contour of the article arranged in real space A1, in other words, first adjustment points AP1 and second adjustment points AP2 may include points on the contour of the article present in real space A1, and there is an advantage that it is easy for the user to adjust the index image to second adjustment points AP2. Examples of this kind of article include household electrical appliances such as timepiece 200, ornaments such as a painting, and a white board.

In the above exemplary embodiment, correction processor 16 may correct the image data of the virtual image viewed from virtual installation position P2 by reflecting the actual installation state of projector 30 on the installation state when the first data is generated. That is, correction processor 16 may execute a correction method for correcting the projection image by using the installation information acquired by the installation information acquisition method. In this correction method, virtual installation position P2 is corrected based on the installation information. The correction method includes correction processing of arranging virtual camera V30 at corrected virtual installation position P2 and generating the projection image based on the virtual image in a case of being viewed from corrected virtual installation position P2 by virtual camera V30. Since virtual installation position P2 is corrected in accordance with the actual installation state of projector 30 and the projection image is corrected based on the virtual image viewed from virtual installation position P2, a more correct image can be projected in real space A1 by projector 30. Note that this correction method can also be embodied by a program. This program is a program for causing one or more processors to execute the correction method performed by correction processor 16.

In the exemplary embodiment, control system 10 does not include, as component elements, projector 30, display 40, and input device 50, but at least one of projector 30, display 40, or input device 50 may be included in component elements of control system 10.

In the above exemplary embodiment, the first direction and the second direction are directions (left-right direction) along the pan direction of projector 30, but the first direction and the second direction may be directions (up-down direction) along the tilt direction of projector 30.

In this case, second image generation unit 12 generates, as the second image, first adjustment image Im21 in which first object Ob5 is positioned in the first direction (for example, an upper side) along the tilt direction with respect to image center CT1. Projection controller 13 causes projector 30 to project second object Ob6 onto first projection position PT1 in real space A1 based on first adjustment image Im21. In addition, second image generation unit 12 generates, as the second image, second adjustment image Im22 in which first object Ob5 is positioned in the second direction (for example, a lower side) opposite to the first direction with respect to image center CT1. Projection controller 13 causes projector 30 to project second object Ob6 onto second projection position PT2 in real space A1 based on second adjustment image Im22. At this time, adjustment unit 14 performs at least one of the zoom adjustment of projector 30 and the size adjustment of rendering region Ra1 when second image Im2 is rendered to reduce the positional deviation between first projection position PT1 and second projection position PT2. As a result, the positional deviation between first projection position PT1 and second projection position PT2 can be reduced, and the deviation between the projection position of the image projected onto real space A1 by projector 30 and the position in real space A1 corresponding to the display position in virtual space A2 can be reduced.

In addition, the first direction and the second direction are not limited to the pan direction or the tilt direction, and may be directions intersecting with the pan direction and the tilt direction.

In addition, projector 30 is not limited to the floor-mounted type, and may be attached to, for example, a ceiling, a wall, or the like. Further, the fact that a height of projector 30 is adjustable is not essential for the installation information acquisition method and the image adjustment method, and the height of projector 30 from a floor surface may be fixed.

In addition, projector 30 is not limited to the moving mirror type projection system, and for example, may have a configuration in which projection unit 31 moves (including rotation), or may have a configuration in which entire projector 30 moves (including rotation). In either case, projection position P1 can be moved by changing the illumination direction of the light from projector 30 (that is, the projection direction of the image).

Further, projector 30 is not limited to a movable projection system in which projection position P1 in real space A1 is variable, and may be a fixed projection system in which projection position P1 is fixed. In this case, the installation information acquisition method, the correction method, the program, and installation information acquisition system 15 according to the present exemplary embodiment are also useful. When projector 30 is the fixed projection system, virtual camera V30 may also be a fixed camera system.

In addition, it is not essential for control system 10 to record (write) generated image content D1 in data storage 23. For example, control system 10 may transmit generated image content D1 to projector 30 in real time.

In the above exemplary embodiment, virtual camera V30 includes virtual image-capturing unit V31 and virtual mirror unit V32, and an arrival direction of light incident on virtual image-capturing unit V31 is changed by virtual mirror unit V32, and an incident direction of the light on virtual camera V30 is changed. However, virtual image-capturing unit V31 may be arranged in a position and direction of a mirror image with respect to the virtual mirror. In this case, a position and direction of virtual image-capturing unit V31 are changed in accordance with the position and direction of the mirror image that changes in accordance with the projection direction. At this time, virtual mirror portion V32 may be removed, or only a peripheral edge may be left, and an inside of the edge may be an object that transmits light.

CONCLUSION

As described above, an installation information acquisition method of a first aspect is the installation information acquisition method of projector (30). Projector (30) is installed at installation position (P4) in real space (A1), and the projection direction can be changed with respect to the reference direction. Projector (30) projects, onto projection position (P1) in real space (A1), the projection image based on the virtual image in a case where the image arranged at display position (P3) in virtual space (A2) corresponding to real space (A1) is viewed from virtual installation position (P2) in virtual space (A2) corresponding to installation position (P4). The installation information acquisition method includes first acquisition processing, projection processing, second acquisition processing, and third acquisition processing. In the first acquisition processing, the positional information regarding the positions of three or more first adjustment points (AP1) in virtual space (A2) is acquired. In the projection processing, projector (30) projects the index image onto real space (A1). In the second acquisition processing, the angle information regarding the angle of the projection direction of projector (30) with respect to the reference direction in a state where the position of the index image matches three or more second adjustment points (AP2) is acquired. In the third acquisition processing, the installation information regarding the installation state of projector (30) is acquired based on the positional information and the angle information.

According to this aspect, since the installation information regarding the installation state of projector (30) can be acquired in the third acquisition processing, it is not necessary to strictly install projector (30) in accordance with the installation state assumed during the generation of the virtual image. Accordingly, the degree of freedom of the installation state of projector (30) can be increased.

In the first aspect, an installation information acquisition method of a second aspect further includes arrangement processing. In the arrangement processing, virtual camera (V30) is arranged at virtual installation position (P2) in virtual space (A2). The virtual image is an image when the image arranged at display position (P3) is viewed from virtual camera (V30).

According to this aspect, the image viewed from virtual camera (V30) virtually arranged at virtual installation position (P2) can be a virtual image.

According to an installation information acquisition method of a third aspect, in the first or second aspect, in the projection processing, projector (30) is caused to project the index image onto three or more initial projection positions respectively corresponding to three or more first adjustment points (AP1) in real space (A1). In the second acquisition processing, the angle information is acquired based on an adjustment angle obtained by adjusting the projection direction of projector (30) in order to adjust the position of the index image projected onto the initial projection positions with the positions of second adjustment points (AP2).

According to this aspect, when the index image is projected onto the initial projection positions, the index image is projected onto positions close to second adjustment points (AP2). Accordingly, it is possible to reduce time and effort required for the user to adjust the projection direction of projector (30) in order to adjust the index image with the positions of second adjustment points (AP2).

In an installation information acquisition method of a fourth aspect, in any one of the first to third aspects, the number of first adjustment points (AP1) and the number of second adjustment points (AP2) are each four or more.

According to this aspect, the installation state of projector (30) can be obtained more accurately.

In an installation information acquisition method according to a fifth aspect, in any one of the first to fourth aspects, three or more second adjustment points (AP2) include points on a contour of article (200) present in real space (A1).

According to this aspect, there is an advantage that it is easy to perform a work of adjusting the index image with the positions of second adjustment points (AP2).

In an installation information acquisition method of a sixth aspect, in any one of the first to fifth aspects, real space (A1) includes a plurality of discontinuous surfaces (A11) discontinuous from each other. Three or more second adjustment points (AP2) include points on at least two discontinuous surfaces (A11) among the plurality of discontinuous surfaces (A11).

According to this aspect, the installation state of projector (30) can be obtained more accurately, and the image can be projected more correctly by projector (30).

According to an installation information acquisition method of a seventh aspect, in any one of the first to sixth aspects, projector (30) includes projection unit (31), mirror unit (32), and drive unit (33). Projection unit (31) emits light for projecting an image onto real space (A1). Mirror unit (32) reflects the light emitted from projection unit (31). Drive unit (33) changes a projection direction of the image by driving mirror unit (32) to change an orientation of mirror unit (32).

According to this aspect, projector (30) can change the projection direction of the image.

A correction method of an eighth aspect is a correction method for correcting the projection image by using installation information acquired by the installation information acquisition method according to any one of the first to seventh aspects. The correction method includes correction processing of correcting virtual installation position (P2) based on the installation information, and generating the projection image based on the virtual image in a case of being viewed from corrected virtual installation position (P2).

According to this aspect, the image can be projected more correctly.

A correction method of a ninth aspect is a correction method for correcting a projection direction in which the projection image is projected by projector (30) by using angle information acquired by the installation information acquisition method according to any one of the first to seventh aspects. The correction method includes correction processing of obtaining the projection direction at any display position (P3) other than three or more second adjustment points (AP2) by interpolation by using the angle information obtained for each of three or more second adjustment points (AP2) in the second acquisition processing.

According to this aspect, the image can be projected more correctly.

A program of a tenth aspect is a program causing one or more processors to execute the installation information acquisition method of any one of the first to seventh aspects.

According to this aspect, the degree of freedom of the installation state of projector (30) can be increased.

A program of an eleventh aspect is a program causing one or more processors to execute the correction method of the eighth or ninth aspect.

According to this aspect, the image can be projected more correctly.

Installation information acquisition system (15) of a twelfth aspect is an installation information acquisition system of projector (30). Projector (30) is installed at installation position (P4) in real space (A1), and the projection direction can be changed with respect to the reference direction. Projector (30) projects, onto projection position (P1) in real space (A1), the projection image based on the virtual image in a case where an image arranged at display position (P3) in virtual space (A2) corresponding to real space (A1) is viewed from virtual installation position (P2) in virtual space (A2) corresponding to installation position (P4). An installation information acquisition system includes first acquisition unit (11), projection processor (14), second acquisition unit (12), and third acquisition unit (13). First acquisition unit (11) acquires positional information regarding positions of three or more first adjustment points (AP1) in virtual space (A2). Projection processor (14) causes projector (30) to project an index image onto real space (A1). The second acquisition unit acquires angle information regarding an angle of the projection direction of projector (30) with respect to the reference direction in a state where a position of the index image matches each of three or more second adjustment points (AP2). Third acquisition unit (13) acquires installation information on an installation state of projector (30) based on the positional information and the angle information.

According to this aspect, since the installation information regarding the installation state of projector (30) can be acquired in the third acquisition processing, it is not necessary to strictly install projector (30) in accordance with the installation state assumed during the generation of the virtual image. Accordingly, the degree of freedom of the installation state of projector (30) can be increased.

Various configurations (including variations) of installation information acquisition system (15) according to the above exemplary embodiment are not limited to the above aspects and can be embodied by an installation information acquisition method by installation information acquisition system (15), a (computer) program, a non-transitory recording medium recording the program, or the like.

The configurations according to the second to seventh aspects are not essential configurations for the installation information acquisition method, and can be omitted as appropriate.

In addition, the eighth and ninth aspects are aspects that can be solely implemented, in which any one of the first to seventh aspects is not essential as a prerequisite. For example, in the eighth aspect, the correction processing may be performed based on the angle information acquired by an appropriate method. In addition, in the ninth aspect, the correction processing may be performed based on the installation information acquired by an appropriate method.

In addition, an image adjustment method of a thirteenth aspect is an image adjustment method of image projection system (100). Projector (30) is installed at installation position (P4) in real space (A1), and can change at least a projection direction. First image (Im1) is an image including first object (Ob5) displayed in virtual space (A2) corresponding to real space (A1). Second image (Im2) is an image obtained by rendering first image (Im1) in predetermined rendering region (Ra1) with virtual installation position (P2) in virtual space (A2) corresponding to installation position (P4) as a viewpoint. An image projection system (100) causes a projector (30) to project, based on a second image (Im2), a second object (Ob6) corresponding to a first object (Ob5) onto a projection position in a real space (A1) corresponding to a display position of the first object (Ob5) in a virtual space (A2). The image adjustment method includes a first image generation step, a first adjustment image generation step, a first adjustment image projection step, a second adjustment image generation step, a second adjustment image projection step, and an adjustment step. In the first image generation step, first image (Im1) in which first object (Ob5) is displayed at second position (P6) in virtual space (A2) corresponding to first position (P5) in real space (A1) is generated. In the first adjustment image generation step, first adjustment image (Im21) in which first object (Ob5) is positioned in a first direction with respect to image center (CT1) is rendered from first image (Im1) to second image (Im2). In the first adjustment image projection step, projector (30) projects second object (Ob6) onto first projection position (PT1) in real space (A1) based on first adjustment image (Im21). In the second adjustment image generation step, second adjustment image (Im22) in which first object (Ob5) is positioned in a second direction opposite to the first direction with respect to image center (CT1) is rendered from first image (Im1) to second image (Im2). In the second adjustment image projection step, projector (30) projects second object (Ob6) onto second projection position (PT2) in real space (A1) based on second adjustment image (Im22). In the adjustment step, a projection size of second object (Ob6) in real space (A1) is adjusted to reduce positional deviation between first projection position (PT1) and second projection position (PT2).

According to this aspect, adjustment is performed to reduce the positional deviation between first projection position (PT1) and second projection position (PT2), and thus, it is possible to reduce a difference between an image size when a display size of first object (Ob5) in virtual space (A2) is converted into a scale of real space (A1) and a projection size of second object (Ob6) projected in real space (A1). As a result, it is possible to reduce the deviation between a position in real space (A1) corresponding to a display position of first object (Ob5) in virtual space (A2) and a projection position of second object (Ob6) projected in real space (A1) by projector (30).

An image adjustment method of a fourteenth aspect is the image adjustment method of the thirteenth aspect in which, in the adjustment step, size adjustment of an image size of third image (Im3) is performed by performing at least one of zoom adjustment of projector (30) and size adjustment of the image size of second image (Im2).

An image adjustment method of a fifteenth aspect is the image adjustment method of the fourteenth aspect, in which, in the adjustment step, at least one of zoom adjustment of decreasing the projection size of second object (Ob6) projected by projector (30) and size adjustment of increasing rendering region (Ra1) is performed in a case where second projection position (PT2) is deviated in the second direction with respect to first projection position (PT1), and at least one of zoom adjustment of increasing the projection size of second object (Ob6) projected by projector (30) and size adjustment of decreasing rendering region (Ra1) is performed in a case where second projection position (PT2) is deviated in the first direction with respect to first projection position (PT1).

In an image adjustment method of a sixteenth aspect, in the thirteenth or fourteenth aspect, first distance (Ln1) between image center (CT1) in first adjustment image (Im21) and first object (Ob5) is equal to second distance (Ln2) between image center (CT1) in second adjustment image (Im22) and first object (Ob5). In the adjustment step, the projection size of second object (Ob6) in real space (A1) is adjusted such that second object (Ob6) is projected onto an intermediate position between first projection position (PT1) and second projection position (PT2).

In the thirteenth or fourteenth aspect, an image adjustment method of a seventeenth aspect further includes a first coordinate acquisition step and a second coordinate acquisition step. In the first coordinate acquisition step, first coordinates of first projection position (PT1) are acquired from an image obtained by capturing second object (Ob6) projected onto first projection position (PT1) by camera (60) installed in real space (A1) and having a fixed imaging direction. In the second coordinate acquisition step, second coordinates of second projection position (PT2) are acquired from the image obtained by capturing second object (Ob6) projected onto second projection position (PT2) by camera (60). In the adjustment step, the projection size of second object (Ob6) in real space (A1) is adjusted to reduce a difference between the first coordinates and the second coordinates in a direction along the first direction and the second direction.

In an image adjustment method of an eighteenth aspect, in the seventeenth aspect, first distance (Ln1) between image center (CT1) in first adjustment image (Im21) and first object (Ob5) is equal to second distance (Ln2) between image center (CT1) in second adjustment image (Im22) and first object (Ob5). In the adjustment step, the projection size of second object (Ob6) in real space (A1) is adjusted such that second object (Ob6) is projected onto an intermediate position between the first coordinates and the second coordinates in the direction along the first direction and the second direction.

In an image adjustment method of a nineteenth aspect, in any one of the thirteenth to eighteenth aspects, the first direction and the second direction are directions along a pan direction or a tilt direction of projector (30).

A program of a twentieth aspect is a program causing a computer system to execute the image adjustment method of any one of the thirteenth to nineteenth aspects.

According to the fourteenth to twentieth aspects, it is possible to reduce the deviation between position in real space (A1) corresponding to the display position of first object (Ob5) in virtual space (A2) and the projection position of second object (Ob6) projected in real space (A1) by projector (30).

Control system (10) of a twenty-first aspect is control system (10) that controls projector (30) of image projection system (100). Projector (30) is installed at installation position (P4) in real space (A1), and can change at least a projection direction. First image (Im1) is an image including first object (Ob5) displayed in virtual space (A2) corresponding to real space (A1). Second image (Im2) is an image obtained by rendering first image (Im1) in predetermined rendering region (Ra1) with virtual installation position (P2) in virtual space (A2) corresponding to installation position (P4) as a viewpoint. An image projection system (100) causes a projector (30) to project, based on a second image (Im2), a second object (Ob6) corresponding to a first object (Ob5) onto a projection position in a real space (A1) corresponding to a display position of the first object (Ob5) in a virtual space (A2). Control system (10) includes first image generation unit (11), second image generation unit (12), projection controller (13), and adjustment unit (14). First image generation unit (11) generates first image (Im1) in which first object (Ob5) is displayed at second position (P6) in virtual space (A2) corresponding to first position (P5) in real space (A1). Second image generation unit (12) renders second image (Im2) from first image (Im1). Projection controller (13) causes projector (30) to project second object (Ob6) corresponding to first object (Ob5) based on second image (Im2). Second image generation unit (12) renders first adjustment image (Im21) in which first object (Ob5) is positioned in the first direction with respect to image center (CT1) from first image (Im1) to second image (Im2). In addition, second image generation unit (12) renders second adjustment image (Im22) in which first object (Ob5) is positioned in the second direction opposite to the first direction with respect to image center (CT1) from first image (Im1) to second image (Im2). Projection controller (13) performs first projection processing of causing projector (30) to project first object (Ob5) and second object (Ob6) onto first projection position (PT1) in real space (A1) based on first adjustment image (Im21). Projection controller (13) causes projector (30) to perform second projection processing of projecting second object (Ob6) onto second projection position (PT2) in real space (A1) based on second adjustment image (Im22). Adjustment unit (14) adjusts the projection size of second object (Ob6) in real space (A1) to reduce positional deviation between first projection position (PT1) and second projection position (PT2).

According to this aspect, adjustment is performed to reduce the positional deviation between first projection position (PT1) and second projection position (PT2), and thus, it is possible to reduce a difference between an image size when a display size of first object (Ob5) in virtual space (A2) is converted into a scale of real space (A1) and a projection size of second object (Ob6) projected in real space (A1). As a result, it is possible to reduce the deviation between the position in real space (A1) corresponding to the display position of first object (Ob5) in virtual space (A2) and the projection position of second object (Ob6) projected in real space (A1) by projector (30).

In control system (10) of a twenty-second aspect, in the twenty-first aspect, adjustment unit (14) adjusts the projection size of second object (Ob6) in real space (A1) by performing at least one of zoom adjustment of projector (30) and size adjustment of rendering region (Ra1).

According to this aspect, it is possible to reduce the deviation between the projection position of the image projected onto real space (A1) by projector (30) and the position on real space (A1) corresponding to the display position in virtual space (A2).

Image projection system (100) of a twenty-third aspect includes control system (10) of the twenty-second aspect and projector (30) controlled by control system (10).

According to the twenty-second and twenty-third aspects, it is possible to reduce the deviation between the position in real space (A1) corresponding to the display position of first object (Ob5) in virtual space (A2) and the projection position of second object (Ob6) projected onto real space (A1) by projector (30).

Various configurations (including variations) of control system (10) and image projection system (100) according to the above exemplary embodiment are not limited to the above aspects and can be embodied by an image adjustment method performed by control system (10), a (computer) program, a non-transitory recording medium recording the program, or the like.

The configurations according to the fourteenth to nineteenth aspects are not essential configurations for the image adjustment method, and can be appropriately omitted. The configurations according to the twenty-second aspect are not essential configurations for control system (10), and can be omitted as appropriate.

What is claimed is:

1. An installation information acquisition method of a projector that is installed at an installation position in a real space, has a projection direction changeable with respect to a reference direction, and projects a projection image based on a virtual image onto a projection position in the real space, the virtual image being an image in a case where an image arranged at a display position in a virtual space corresponding to the real space is viewed from a virtual installation position in the virtual space corresponding to the installation position, the method comprising:
    first acquisition processing for acquiring positional information regarding positions of three or more first adjustment points in the virtual space;
    projection processing for projecting, by the projector, an index image onto the real space;
    second acquisition processing for acquiring angle information regarding an angle of the projection direction of the projector with respect to the reference direction in a state where a position of the index image matches each of three or more second adjustment points respectively corresponding to the three or more first adjustment points in the virtual space; and
    third acquisition processing for acquiring installation information regarding an installation state of the projector based on the positional information and the angle information.

2. The installation information acquisition method according to claim 1, further comprising arrangement processing for arranging a virtual camera at the virtual installation position in the virtual space, wherein the virtual image is an image when the image arranged at the display position is viewed from the virtual camera.

3. The installation information acquisition method according to claim 1, wherein
in the projection processing, the projector projects the index image onto three or more initial projection positions respectively corresponding to the three or more first adjustment points in the real space, and
in the second acquisition processing, the angle information is acquired based on an adjustment angle obtained by adjusting the projection direction of the projector, and the position of the index image projected onto the initial projection positions are adjusted to positions of the second adjustment points.

4. The installation information acquisition method according to claim 1, wherein a number of first adjustment points and a number of second adjustment points are each four or more.

5. The installation information acquisition method according to claim 1, wherein the three or more second adjustment points include points on a contour of an article present in the real space.

6. The installation information acquisition method according to claim 1, wherein
a plurality of discontinuous surfaces discontinuous with each other are present in the real space, and
the three or more second adjustment points include points on at least two discontinuous surfaces of the plurality of discontinuous surfaces.

7. The installation information acquisition method according to claim 1, wherein the projector includes
a projection unit that emits light for projecting an image onto the real space,
a mirror unit that reflects the light emitted from the projection unit, and
a drive unit that drives the mirror unit to change an orientation of the mirror unit, and changes a projection direction of the image.

8. A correction method for correcting the projection image by using the installation information acquired by the installation information acquisition method according to claim 1, the method comprising correction processing for correcting the virtual installation position based on the installation information and generating the projection image based on the virtual image in a case of being viewed from the corrected virtual installation position.

9. A correction method for correcting a projection direction in which the projection image is projected by the projector by using the angle information acquired by the installation information acquisition method according to claim 1, the method comprising correction processing for obtaining the projection direction at any display position other than the three or more second adjustment points by interpolation by using the angle information obtained for each of the three or more second adjustment points in the second acquisition processing.

10. A non-transitory recording medium recording a program causing one or more processors to execute the installation information acquisition method according to claim 1.

11. A non-transitory recording medium recording a program causing one or more processors to execute the correction method according to claim 8.

12. A non-transitory recording medium recording a program causing one or more processors to execute the correction method according to claim 9.

13. An installation information acquisition system of a projector that is installed at an installation position in a real space, has a projection direction changeable with respect to a reference direction, and projects a projection image based on a virtual image onto a projection position in the real space, the virtual image being an image in a case where an image arranged at a display position in a virtual space corresponding to the real space is viewed from a virtual installation position in the virtual space corresponding to the installation position, the system comprising:
a first acquisition unit that acquires positional information regarding positions of three or more first adjustment points in the virtual space;
a projection processor that causes the projector to project an index image onto the real space;
a second acquisition unit that acquires angle information regarding an angle of the projection direction of the projector with respect to the reference direction in a state where a position of the index image matches each of three or more second adjustment points respectively corresponding to the three or more first adjustment points in the virtual space; and
a third acquisition unit that acquires installation information regarding an installation state of the projector based on the positional information and the angle information.

* * * * *